United States Patent
Xu et al.

(10) Patent No.: US 11,405,964 B2
(45) Date of Patent: Aug. 2, 2022

(54) RADIO BEARER CONFIGURATION METHOD, APPARATUS, AND SYSTEM

(71) Applicant: Huawei Technologies Co., Ltd., Shenzhen (CN)

(72) Inventors: Haibo Xu, Beijing (CN); Xiao Xiao, Shenzhen (CN); Chuting Yao, Beijing (CN); Jian Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/486,234

(22) Filed: Sep. 27, 2021

(65) Prior Publication Data

US 2022/0015160 A1    Jan. 13, 2022

Related U.S. Application Data

(63) Continuation of application No. PCT/CN2020/082010, filed on Mar. 30, 2020.

(30) Foreign Application Priority Data

Mar. 28, 2019    (CN) .......................... 201910245793.6

(51) Int. Cl.
    *H04L 12/26*       (2006.01)
    *H04W 76/10*      (2018.01)
    (Continued)

(52) U.S. Cl.
    CPC ....... *H04W 76/10* (2018.02); *H04W 28/0268* (2013.01); *H04W 72/0406* (2013.01)

(58) Field of Classification Search
    USPC .... 370/229, 230, 230.1, 236, 252, 328, 329, 370/330, 431, 437, 465, 468
    See application file for complete search history.

(56) References Cited

U.S. PATENT DOCUMENTS 6,668,175 B1 * 12/2003 Almgren ............... H04L 47/808
                                                           455/516
11,012,194 B2     5/2021    Zhang et al.
(Continued)

FOREIGN PATENT DOCUMENTS

CN       108391285 A     8/2018
CN       108923894 A     11/2018
(Continued)

OTHER PUBLICATIONS

Huawei (Rapporteur), "Summary of Email Discussion [104#58][NR V2X]—QoS support for NR V2X", 3GPP TSG-RAN WG2 Meeting #105, R2-1900370, Feb. 25-Mar. 1, 2019, 57 pages, Athens, Greece.
(Continued)

*Primary Examiner* — Nguyen H Ngo
(74) *Attorney, Agent, or Firm* — Slater Matsil, LLP

(57) ABSTRACT

A radio bearer configuration method, an apparatus, and a system. The method includes: determining that a first sidelink radio bearer and a second sidelink radio bearer that are used during communication between the second terminal and a first terminal are associated with each other; and sending a first message to the first terminal, where the first message includes first indication information, and the first indication information is used to indicate that the first sidelink radio bearer is associated with the second sidelink radio bearer, where the first sidelink radio bearer is used by the first terminal to send first sidelink service data to the second terminal, and the second sidelink radio bearer is used by the second terminal to send a first radio link control RLC status report for the first sidelink service data to the first terminal.

20 Claims, 17 Drawing Sheets

(51) Int. Cl.
*H04W 28/02* (2009.01)
*H04W 72/04* (2009.01)

(56) References Cited

U.S. PATENT DOCUMENTS

| | | | | |
|---|---|---|---|---|
| 2014/0335906 | A1* | 11/2014 | Kim | H04W 12/06 |
| | | | | 455/509 |
| 2014/0341112 | A1* | 11/2014 | Agiwal | H04L 61/2007 |
| | | | | 370/328 |
| 2020/0092692 | A1 | 3/2020 | Wang et al. | |
| 2020/0146094 | A1* | 5/2020 | Wu | H04W 80/08 |
| 2020/0296619 | A1* | 9/2020 | Pan | H04W 76/27 |

FOREIGN PATENT DOCUMENTS

| | | |
|---|---|---|
| CN | 110536262 A | 12/2019 |
| RU | 2580440 C2 | 4/2016 |
| WO | 2019029375 A1 | 2/2019 |
| WO | 2019031862 A1 | 2/2019 |

OTHER PUBLICATIONS

3GPP TS 38.322 V15.4.0 (Dec. 2018), 3rd Generation Partnership Project, Technical Specification Group Radio Access Network, NR, Radio Link Control (RLC) protocol specification (Release 15), 33 pages.

3GPP TS 38.331 V15.3.0 (Sep. 2018), 3rd Generation Partnership Project, Technical Specification Group Radio Access Network, NR, Radio Resource Control (RRC) protocol specification (Release 15), 445 pages.

Ericsson et al.,"Running CR for introduction of Ultra Reliable Low Latency Communication for LTE", 3GPP TSG-RAN2 Meeting #102, R2-1807228, May 21-25, 2018, 15 pages, Busan, South Korea.

Lenovo, Motorola Mobility, "Discussion on QoS management for NR V2X", 3GPP TSG-RAN WG2 Meeting #104, R2-1817118, Nov. 12-16, 2018, 5 pages, Spokane, USA.

Huawei, HiSilicon et al.,"Discussion on RLC mode for NR sidelink", 3GPP TSG-RAN WG2 # 104, R2-1818199, 12th 16th, 2018, 4 pages, Spokane, USA.

Huawei, HiSilicon et al., "Discussion on reliability enhancements for NR sidelink", 3GPP TSG RAN WG2 Meeting #105 R2-1902050, Feb. 25-Mar. 1, 2019, 3 pages, Athens, Greece.

Oppo et al., "Summary of [104#55][NR/V2X] Unicast (OPPO)", 3GPP TSG RAN WG2 Meeting #105 R2-1900180, Feb. 25-Mar. 1, 2019, 28 pages, Athens, Greece.

* cited by examiner

CONT.
FROM
FIG. 11A

CONT.
FROM
FIG. 11A

CONT.
FROM
FIG. 11A

Step 110: Send, to the network device, at least one of the following information: source address information of the second sidelink radio bearer, destination address information of the second sidelink radio bearer, and indication information indicating that an RLC layer working mode of the second sidelink radio bearer is an AM mode Step 111: Receive, from the second terminal, the at least one of the following information: the source address information of the second sidelink radio bearer, the destination address information of the second sidelink radio bearer, and the indication information indicating that the RLC layer working mode of the second sidelink radio bearer is the AM mode Step 112: Receive, from the network device, at least one of the following information: the source address information of the second sidelink radio bearer and the destination address information of the second sidelink radio bearer Step 113: Send, to the first terminal, at least one of the following information: the source address information of the second sidelink radio bearer, the destination address information of the second sidelink radio bearer, and third configuration information of the second sidelink radio bearer

FIG. 11B

RADIO BEARER CONFIGURATION METHOD, APPARATUS, AND SYSTEM

CROSS-REFERENCE TO RELATED APPLICATIONS

This application is a continuation of International Application No. PCT/CN2020/082010, filed on Mar. 20, 2020, which claims priority to Chinese Patent Application No. 201910245793.6, filed on Mar. 28, 2019. The disclosures of the aforementioned applications are hereby incorporated by reference in their entireties.

TECHNICAL FIELD

Embodiments of this application relate to the field of communications technologies, and in particular, to a radio bearer configuration method, an apparatus, and a system.

BACKGROUND

In a long term evolution (LTE) system or a new radio (NR) system, a communications interface between a terminal and a base station may be referred to as a Uu interface, and a communications interface between terminals may be referred to as a PC5 interface. The PC5 interface is usually used in a scenario in which direct communication can be performed between devices, such as V2X or D2D. A link between the terminals connected to the PC5 interface is referred to as a sidelink. Through the PC5 interface, data and radio resource control (RRC) signaling can be transmitted between the terminals by using a sidelink radio bearer (SL RB).

When the terminal communicates with the base station through the Uu interface, a radio link control (RLC) entity supports an acknowledged mode (AM). The acknowledged mode requires a data receiver to feed back an RLC layer status report to a data sender. The status report is used to indicate, to the data sender, which data has been successfully received and which data has not been successfully received.

Currently, in the LTE system, a V2X service supports broadcast transmission. In other words, a sender terminal may send a service to a receiver terminal on a sidelink in a broadcast manner. In this case, the receiver terminal does not need to feed back an RLC status report to the sender terminal. Therefore, an RLC AM is not supported in the LTE system. However, the NR PC5 interface supports a V2X service transmitted in a unicast manner, and a V2X service in NR requires higher reliability than a V2X service in LTE. Therefore, how to improve high-reliability communication of the V2X service is an urgent problem that needs to be resolved.

SUMMARY

Embodiments of this application provide a radio bearer configuration method, an apparatus, and a system, to improve reliability of a sidelink service.

To achieve the foregoing objective, the embodiments of this application provide the following technical solutions:

According to a first aspect, an embodiment of this application provides a radio bearer configuration method, including: A second terminal determines that a first sidelink radio bearer and a second sidelink radio bearer that are used during communication between the second terminal and a first terminal are associated with each other. The second terminal sends, to the first terminal, a first message that carries first indication information. The first indication information is used to indicate that the first sidelink radio bearer is associated with the second sidelink radio bearer. The first sidelink radio bearer is used by the first terminal to send first sidelink service data to the second terminal. The second sidelink radio bearer is used by the second terminal to send a first radio link control RLC status report for the first sidelink service data to the first terminal.

This embodiment of this application provides a radio bearer configuration method. In the prior art, the first terminal does not know that the first sidelink radio bearer is associated with the second sidelink radio bearer. Therefore, the first terminal cannot determine sidelink service data on a sidelink radio bearer to which the RLC status report received by the first terminal corresponds, and RLC status reports for different sidelink service data sent by the first terminal may conflict with each other or may be incorrectly received. As sidelink service data of the first terminal increases, reliability of sidelink communication cannot be ensured. In this embodiment of this application, the second terminal determines that the first sidelink radio bearer and the second sidelink radio bearer that are used during communication between the second terminal and the first terminal are associated with each other, and sends the first indication information to the first terminal, to indicate that the first sidelink radio bearer is associated with the second sidelink radio bearer, so that the first terminal determines to use the first sidelink radio bearer to send the first sidelink service data to the second terminal, and if the first terminal receives the first RLC status report over the second sidelink radio bearer, the first terminal can determine, based on the foregoing association, that the first RLC status report is for the first sidelink service data on the first sidelink radio bearer, to ensure that the sidelink radio bearer between the first terminal and the second terminal can support an RLC layer AM transmission manner. In addition, the method in this embodiment helps the first terminal and the second terminal determine, based on the first RLC status report, whether to retransmit the first sidelink service data, thereby ensuring reliability of transmitting the sidelink service data.

In a possible implementation, the second sidelink radio bearer is further used by the second terminal to send second sidelink service data to the first terminal. The first sidelink radio bearer is further used by the first terminal to send a second RLC status report for the second sidelink service data to the second terminal. In this way, an association relationship between the second sidelink radio bearer and the first sidelink radio bearer can be fully used.

In a possible implementation, the first sidelink radio bearer and the second sidelink radio bearer are unidirectional bearers.

In a possible implementation, the first sidelink radio bearer includes a first packet data convergence protocol PDCP entity, at least one first RLC entity, and at least one first logical channel. A radio link control RLC layer working mode of the first sidelink radio bearer is an acknowledged mode AM, and at least one first RLC entity is associated with at least one first logical channel. The second sidelink radio bearer includes a second PDCP entity, at least one second RLC entity, and at least one second logical channel. An RLC layer working mode of the second sidelink radio bearer is an AM, and at least one second RLC entity is associated with at least one second logical channel.

In a possible implementation, the method provided in this embodiment of this application further includes: The second terminal receives a second message from the first terminal. The second message includes any one or more of the following information: an identifier of the first sidelink radio bearer, an identifier of the at least one first logical channel, or quality of service QoS information mapped to the first sidelink radio bearer. It should be understood that the second message is used to indicate to establish, configure, or update the second sidelink radio bearer. In this way, the second terminal can clearly determine QoS information associated with the established, configured, or updated second sidelink radio bearer.

In a possible implementation, the method provided in this embodiment of this application further includes: The second terminal sends, to a network device, a third message used to request to configure the second sidelink radio bearer, where the third message includes at least the QoS information. The second terminal receives a fourth message from the network device. The fourth message includes the QoS information and first configuration information that is associated with the QoS information and that is used to configure the second sidelink radio bearer. It should be understood that the first configuration information is configuration information that is of the second sidelink radio bearer and that is obtained by the second terminal from the network device. In this way, the network device can determine the QoS information for establishing the second sidelink radio bearer.

In a possible implementation, the fourth message further includes at least one of the following information: an identifier of the second sidelink radio bearer, an identifier of at least one second logical channel, and a first mapping relationship. The first mapping relationship includes a mapping relationship between the QoS information and the identifier of the second sidelink radio bearer, and/or a mapping relationship between the QoS information and the identifier of the at least one second logical channel. That a second terminal determines that a first sidelink radio bearer and a second sidelink radio bearer that are used during communication between the second terminal and a first terminal are associated with each other includes: The second terminal determines, based on the fourth message, that the first sidelink radio bearer is associated with the second sidelink radio bearer. In this way, the second terminal can determine that the first sidelink radio bearer is associated with the second sidelink radio bearer.

In a possible implementation, the third message further includes any one or more of the following information: the identifier of the first sidelink radio bearer or the identifier of the at least one first logical channel. The fourth message further includes a second mapping relationship. The second mapping relationship includes a mapping relationship between information about the first sidelink radio bearer and information about the second sidelink radio bearer. That a second terminal determines that a first sidelink radio bearer and a second sidelink radio bearer that are used during communication between the second terminal and a first terminal are associated with each other includes: The second terminal determines, based on the second mapping relationship, that the first sidelink radio bearer is associated with the second sidelink radio bearer. In this way, a manner in which the second terminal determines that the first sidelink radio bearer is associated with the second sidelink radio bearer is flexible.

In a possible implementation, that a second terminal determines that a first sidelink radio bearer and a second sidelink radio bearer that are used during communication between the second terminal and a first terminal are associated with each other includes: The second terminal determines, based on the second message and preconfiguration information, that the first sidelink radio bearer is associated with the second sidelink radio bearer. The preconfiguration information includes at least the QoS information and second configuration information associated with the QoS information. The second configuration information is used to configure the second sidelink radio bearer. It should be understood that the second configuration information is configuration information of the second sidelink radio bearer.

In a possible implementation, the preconfiguration information further includes at least one of the following information: the identifier of the second sidelink radio bearer, the identifier of the at least one second logical channel, and a third mapping relationship. The third mapping relationship includes the mapping relationship between the QoS information and the identifier of the second sidelink radio bearer, and/or the mapping relationship between the QoS information and the identifier of the at least one second logical channel. That the second terminal determines, based on the second message and preconfiguration information, that the first sidelink radio bearer is associated with the second sidelink radio bearer includes: The second terminal determines, based on the third mapping relationship, that the first sidelink radio bearer is associated with the second sidelink radio bearer.

In a possible implementation, the preconfiguration information further includes a fourth mapping relationship. The fourth mapping relationship includes the mapping relationship between the information about the first sidelink radio bearer and the information about the second sidelink radio bearer. That the second terminal determines, based on the second message and preconfiguration information, that the first sidelink radio bearer is associated with the second sidelink radio bearer includes: The second terminal determines, based on the fourth mapping relationship, that the first sidelink radio bearer is associated with the second sidelink radio bearer.

In a possible implementation, the method provided in this embodiment of this application further includes: The second terminal autonomously determines the identifier of the second sidelink radio bearer and/or the identifier of the at least one second logical channel. It should be understood that if the second terminal autonomously determines the identifier of the second sidelink radio bearer and/or the identifier of the at least one second logical channel, the second terminal may obtain QoS information of the second sidelink radio bearer from the network device, in other words, the network device may not send the identifier of the second sidelink radio bearer and/or the identifier of the at least one second logical channel to the second terminal. In this way, if the second terminal determines that the QoS information of the second sidelink radio bearer is the same as the QoS information of the first sidelink radio bearer, the second terminal may determine that the first sidelink radio bearer is associated with the second sidelink radio bearer.

In a possible implementation, that the first indication information is used to indicate that the first sidelink radio bearer is associated with the second sidelink radio bearer specifically includes any one or more of the following information: the mapping relationship between the information about the first sidelink radio bearer and the information about the second sidelink radio bearer. The information about the first sidelink radio bearer includes the identifier of the first sidelink radio bearer and/or the identifier of the at least one first logical channel in the first sidelink radio bearer. The information about the second sidelink radio bearer includes the identifier of the at least one second logical channel in the second sidelink radio bearer and/or the identifier of the second sidelink radio bearer. In this way, a manner of determining that the first sidelink radio bearer is associated with the second sidelink radio bearer is enriched.

In a possible implementation, that the first indication information is used to indicate that the first sidelink radio bearer is associated with the second sidelink radio bearer specifically includes: the first indication information includes the identifier of the second sidelink radio bearer and/or the identifier of the at least one second logical channel. In this way, the first terminal can determine that the first sidelink radio bearer is associated with the second sidelink radio bearer.

In a possible implementation, that a second terminal determines that a first sidelink radio bearer and a second sidelink radio bearer that are used during communication between the second terminal and a first terminal are associated with each other includes: When the identifier of the second sidelink radio bearer is the same as the identifier of the first sidelink radio bearer, and/or the identifier of the at least one second logical channel is the same as the identifier of the at least one first logical channel, the second terminal determines that the first sidelink radio bearer is associated with the second sidelink radio bearer. The third message further includes the identifier of the second sidelink radio bearer and/or the identifier of the at least one second logical channel in the second sidelink radio bearer.

In a possible implementation, the identifier of the second sidelink radio bearer is the same as the identifier of the first sidelink radio bearer, and/or the identifier of the at least one second logical channel is the same as the identifier of the at least one first logical channel. The preconfiguration information further includes at least one of the following information: the identifier of the second sidelink radio bearer, the identifier of the at least one second logical channel, and a fifth mapping relationship. The fifth mapping relationship includes the mapping relationship between the QoS information and the identifier of the second sidelink radio bearer, and/or the mapping relationship between the QoS information and the identifier of the at least one second logical channel. That a second terminal determines that a first sidelink radio bearer and a second sidelink radio bearer that are used during communication between the second terminal and a first terminal are associated with each other includes: The second terminal determines, based on the fifth mapping relationship, that the first sidelink radio bearer is associated with the second sidelink radio bearer.

In a possible implementation, the method provided in this embodiment of this application further includes: The second terminal sends, to the network device, at least one of the following information: source address information of the second sidelink radio bearer, destination address information of the second sidelink radio bearer, and indication information indicating that an RLC layer working mode of the second sidelink radio bearer is an AM mode. The second terminal receives, from the network device, at least one of the following information: the source address information of the second sidelink radio bearer and the destination address information of the second sidelink radio bearer. In this way, the network device can determine a source address and a destination address that are of the established second sidelink radio bearer, and the RLC layer working mode of the established second sidelink radio bearer.

In a possible implementation, the method provided in this embodiment of this application further includes: The second terminal sends, to the first terminal, at least one of the following information: the source address information of the second sidelink radio bearer, the destination address information of the second sidelink radio bearer, and third configuration information of the second sidelink radio bearer. The third configuration information belongs to the first configuration information or the second configuration information.

In a possible implementation, the method provided in this embodiment of this application further includes: The second terminal configures at least one first RLC entity in the first sidelink radio bearer of the second terminal and at least one second RLC entity in the second sidelink radio bearer of the second terminal to be associated with each other.

In a possible implementation, the method provided in this embodiment of this application further includes: The at least one first RLC entity in the first sidelink radio bearer sends the first RLC status report and second indication information to the at least one second RLC entity in the second sidelink radio bearer. The second indication information is used to indicate that the first RLC status report is an RLC status report for the first sidelink service data received by the second terminal. Alternatively, the at least one first RLC entity in the first sidelink radio bearer sends the second RLC status report and third indication information to the at least one second RLC entity in the second sidelink radio bearer. The third indication information is used to indicate that the second RLC status report is an RLC status report that is for the second sidelink service data and that is sent by the first terminal.

In a possible implementation, the method provided in this embodiment of this application further includes: The second terminal determines that a QoS flow mapped to the first sidelink radio bearer or the second sidelink radio bearer changes. The second terminal sends a fifth message to the first terminal or the network device. The fifth message is used to indicate a change of the QoS flow mapped to the first sidelink radio bearer or the second sidelink radio bearer. Because the second sidelink radio bearer is associated with the first sidelink radio bearer, when the QoS flow mapped to the second sidelink radio bearer changes, the QoS flow over the first sidelink radio bearer also needs to be updated, so that the first terminal or the network device can update the QoS flow over the first sidelink radio bearer or the second sidelink radio bearer in a timely manner.

In a possible implementation, that the second terminal determines that a QoS flow mapped to the first sidelink radio bearer or the second sidelink radio bearer changes includes: The second terminal receives a sixth message from the first terminal. The sixth message is used to indicate that the QoS flow mapped to the first sidelink radio bearer changes. The second terminal can autonomously increase or decrease a quantity of QoS flows mapped to the first sidelink radio bearer. In addition, the first terminal can also autonomously increase or decrease a quantity of QoS flows mapped to the first sidelink radio bearer. When the first terminal autonomously increases or decreases the quantity of QoS flows mapped to the first sidelink radio bearer, the first terminal needs to notify the second terminal in a timely manner, so that the second terminal can adjust, in a timely manner, a quantity of QoS flows mapped to the second sidelink radio bearer.

According to a second aspect, an embodiment of this application provides a radio bearer configuration method, including: A first terminal receives a first message from a second terminal. The first message includes first indication information used to indicate that a first sidelink radio bearer and a second sidelink radio bearer that are used during communication between the first terminal and the second terminal are associated with each other. The first sidelink radio bearer is used by the first terminal to send first sidelink service data to the second terminal, and the second sidelink radio bearer is used by the second terminal to send a first radio link control RLC status report for the first sidelink service data to the first terminal. The first terminal determines, based on the first indication information, that the first RLC status report is an RLC status report for the first sidelink service data.

In a possible implementation, the method further includes: the second sidelink radio bearer is further used by the second terminal to send second sidelink service data to the first terminal, and the first sidelink radio bearer is further used by the first terminal to send a second RLC status report for the second sidelink service data to the second terminal. The first terminal determines, based on the first indication information, to send the second RLC status report for the second sidelink service data by using the first sidelink radio bearer.

In a possible implementation, the method provided in this embodiment of this application further includes: The first terminal configures at least one first RLC entity in the first sidelink radio bearer of the first terminal and at least one second RLC entity in the second sidelink radio bearer of the first terminal to be associated with each other.

In a possible implementation, the method provided in this embodiment of this application further includes: The first terminal sends, to the second terminal, a second message including any one or more of the following information: an identifier of the first sidelink radio bearer, an identifier of at least one first logical channel in the first sidelink radio bearer, or quality of service QoS information mapped to the first sidelink radio bearer.

In a possible implementation, that the first indication information is used to indicate that the first sidelink radio bearer is associated with the second sidelink radio bearer specifically includes any one or more of the following information: a mapping relationship between information about the first sidelink radio bearer and information about the second sidelink radio bearer. The information about the first sidelink radio bearer includes any one or more of the following information: the identifier of the first sidelink radio bearer or the identifier of the at least one first logical channel. The information about the second sidelink radio bearer includes any one or more of the following information: an identifier of at least one second logical channel or an identifier of the second sidelink radio bearer.

In a possible implementation, that the first indication information is used to indicate that the first sidelink radio bearer is associated with the second sidelink radio bearer specifically includes: the first indication information includes the identifier of the second sidelink radio bearer and/or the identifier of the at least one second logical channel.

In a possible implementation, the identifier of the second sidelink radio bearer is the same as the identifier of the first sidelink radio bearer, and/or the identifier of the at least one second logical channel is the same as the identifier of the at least one first logical channel.

In a possible implementation, the method provided in this embodiment of this application further includes: The first terminal receives, from the second terminal, at least one of the following information: source address information of the second sidelink radio bearer, destination address information of the second sidelink radio bearer, and third configuration information of the second sidelink radio bearer. It should be understood that the third configuration information belongs to first configuration information or second configuration information. For specific content of the first configuration information or the second configuration information herein, refer to the related descriptions in the first aspect. Details are not described herein again. The third configuration information may be the same as the first configuration information or the second configuration information. Certainly, the third configuration information may include information that is in the first configuration information or the second configuration information and that is required when the first terminal configures the second sidelink radio bearer.

In a possible implementation, the method provided in this embodiment of this application further includes: The first terminal sends, to the second terminal, a sixth message used to indicate that QoS mapped to the first sidelink radio bearer changes.

In a possible implementation, the method provided in this embodiment of this application further includes: The first terminal sends a seventh message to a network device. The seventh message includes QoS information of a first sidelink service and any one or more of the following information: source address information and destination address information that correspond to the QoS information of the first sidelink service, and an identifier of a sidelink radio bearer that is established between the first terminal and the second terminal and/or an identifier of a logical channel in the sidelink radio bearer that is established between the first terminal and the second terminal. The first terminal receives an eighth message from the network device. The eighth message includes source address information of the first sidelink radio bearer, destination address information of the first sidelink radio bearer, or configuration information of the first sidelink radio bearer. When determining that there is sidelink service data that needs to be transmitted, the first terminal may send the identifier of the established sidelink radio bearer and/or the identifier of the logical channel in the established sidelink radio bearer to the network device, so that the network device can allocate a same identifier to the first sidelink radio bearer and the second sidelink radio bearer.

According to a third aspect, an embodiment of this application provides a radio bearer configuration method, including: A second terminal receives a first message from a first terminal. The first message includes any one or more of the following information: quality of service QoS information mapped to a sidelink radio bearer between the second terminal and the first terminal, and first configuration information of the sidelink radio bearer. The first configuration information includes at least one of the following information: first indication information and a bearer type indication. The first indication information is used to indicate a radio link control RLC layer working mode of the sidelink radio bearer, and the bearer type indication is used to indicate that the sidelink radio bearer is a bidirectional bearer. The second terminal establishes or configures the sidelink radio bearer based on the first message.

According to the radio bearer configuration method provided in this embodiment of this application, in the method, the first terminal sends the first message to the second terminal, so that the second terminal can establish, based on the first message, a sidelink radio bearer that meets a QoS requirement, to ensure that sidelink service data transmitted over the sidelink radio bearer can meet the QoS requirement, so as to reliably transmit the sidelink service data. In addition, if the sidelink radio bearer is a bidirectional bearer, the second terminal may determine that the sidelink service bearer may be used to send the sidelink service data to the first terminal, and the sidelink service bearer may be further used to receive an RLC status report for the sidelink service data from the first terminal. Alternatively, the second terminal may determine that the sidelink service bearer may be used to receive the sidelink service data from the first terminal, and the sidelink service bearer may be further used to send an RLC status report for the sidelink service data to the first terminal.

In a possible implementation, the sidelink radio bearer includes at least one RLC entity or at least two RLC entities. When the RLC layer working mode is an acknowledged mode AM, the at least one RLC entity is associated with one logical channel. When the RLC layer working mode is an unacknowledged mode UM, the at least two RLC entities are associated with one logical channel. It should be understood that when the RLC layer working mode is the acknowledged mode AM, the sidelink radio bearer includes at least one RLC entity, and the at least one RLC entity is associated with one logical channel. When the RLC layer working mode is the UM, the sidelink radio bearer includes at least two RLC entities, and the at least two RLC entities are associated with one logical channel.

It should be understood that if the sidelink radio bearer includes one logical channel, the sidelink radio bearer between the first terminal and the second terminal needs to be identified by using an identifier corresponding to a connection established between the first terminal and the second terminal.

In a possible implementation, an identifier of the sidelink radio bearer and/or an identifier of a logical channel in the sidelink radio bearer are/is unique in a connection between the second terminal and the first terminal. The connection between the second terminal and the first terminal is identified by using a first identifier. In this way, the sidelink radio bearer and the logical channel can be accurately identified, to avoid incorrect mapping between the sent sidelink service data and the received RLC status report.

In a possible implementation, the first identifier is a combination of a layer 2 identifier of the first terminal and a layer 2 identifier of the second terminal. In this way, it can be determined that the sidelink radio bearer is used to transmit the sidelink service data or the RLC status report between the first terminal and the second terminal.

In a possible implementation, the sidelink radio bearer includes at least one RLC entity or at least two RLC entities, and the at least one RLC entity or the at least two RLC entities are associated with two logical channels. When the RLC layer working mode is an AM, the at least one RLC entity is associated with the two logical channels. When the RLC layer working mode is a UM, any one of the at least two RLC entities is associated with one of the two logical channels. It should be understood that when the RLC layer working mode is the AM, the sidelink radio bearer includes the at least one RLC entity. When the RLC layer working mode is the UM, the sidelink radio bearer includes the at least two RLC entities. If the sidelink radio bearer includes two logical channels, one of the two logical channels corresponds to a direction from the first terminal to the second terminal. The other logical channel corresponds to a direction from the second terminal to the first terminal.

In a possible implementation, an identifier of the sidelink radio bearer and/or an identifier of either of the two logical channels are/is unique in a combination of source information and destination information.

In a possible implementation, an identifier of one of the two logical channels is unique in a combination of first source information and first destination information, the first source information is a source layer 2 identifier of the first terminal, and the first destination information is a source layer 2 identifier of the second terminal. An identifier of the other one of the two logical channels is unique in a combination of second source information and second destination information, the second source information is a source layer 2 identifier of the second terminal, and the second destination information is a source layer 2 identifier of the first terminal.

In a possible implementation, the first configuration information includes an identifier of either of the two logical channels or an identifier of the sidelink radio bearer.

In a possible implementation, the first configuration information is used by the first terminal to send sidelink service data and/or control signaling by using the sidelink radio bearer, and is used by the second terminal to receive sidelink service data and/or control signaling by using the sidelink radio bearer.

In a possible implementation, the method provided in this embodiment of this application further includes: The second terminal obtains second configuration information of the sidelink radio bearer. The second terminal configures the sidelink radio bearer based on the second configuration information of the sidelink radio bearer. The second configuration information includes at least one of the following information: an identifier of the sidelink radio bearer, configuration information of a PDCP entity in the sidelink radio bearer, configuration information of at least one RLC entity or at least two RLC entities in the sidelink radio bearer, configuration information of one logical channel associated with the at least one RLC entity or the at least two RLC entities in the sidelink radio bearer, and an identifier of the logical channel.

In a possible implementation, the method provided in this embodiment of this application further includes: The second terminal obtains second configuration information of the sidelink radio bearer. The second terminal configures the sidelink radio bearer based on the second configuration information of the sidelink radio bearer. The second configuration information includes at least one of the following information: an identifier of the sidelink radio bearer, configuration information of a PDCP entity in the sidelink radio bearer, configuration information of at least one RLC entity or at least two RLC entities in the sidelink radio bearer, configuration information of either of two logical channels associated with the at least one RLC entity or the at least two RLC entities in the sidelink radio bearer, and an identifier of the logical channel.

In a possible implementation, the second configuration information is used by the second terminal to send sidelink service data and/or control signaling by using the sidelink radio bearer, and is used by the first terminal to receive sidelink service data and/or control signaling by using the sidelink radio bearer.

In a possible implementation, that the second terminal obtains second configuration information of the sidelink radio bearer includes: The second terminal receives a second message from a network device, where the second message includes the second configuration information that is of the sidelink radio bearer and that is configured for the second terminal. Alternatively, the second terminal obtains the second configuration information of the sidelink radio bearer from preconfiguration information.

In a possible implementation, before the second terminal receives the second message from the network device, the method provided in this embodiment of this application further includes: The second terminal sends a third message to the network device. The third message includes at least one of the following information: an identifier of the sidelink radio bearer, an identifier of at least one of two logical channels associated with at least one RLC entity or at least two RLC entities in the sidelink radio bearer, an identifier of one logical channel associated with the at least one RLC entity or the at least two RLC entities in the sidelink radio bearer, the QoS information mapped to the sidelink radio bearer, and the first indication information.

In a possible implementation, the method further includes: the second message and the third message each further include the first identifier.

In a possible implementation, the method provided in this embodiment of this application further includes: The second terminal sends a fourth message to the first terminal, where the fourth message includes third configuration information of the sidelink radio bearer.

In a possible implementation, the method provided in this embodiment of this application further includes: The second terminal receives a first media access control (MAC) protocol data unit (PDU) and first combination information that are sent by the first terminal. The first combination information includes the first identifier and identifiers of one group of logical channels in the sidelink radio bearer, and the first combination information indicates that a first MAC SDU is a MAC SDU in the sidelink radio bearer. The first MAC SDU is a MAC SDU that is included in the first MAC PDU and that corresponds to the identifier of the logical channel associated with the at least one RLC entity or the at least two RLC entities in the sidelink radio bearer.

In a possible implementation, the method provided in this embodiment of this application further includes: The second terminal sends a second MAC PDU and second combination information to the first terminal. The second combination information includes the first identifier and identifiers of one group of logical channels, and the second combination information indicates that a second MAC SDU is a MAC SDU in the sidelink radio bearer. The second MAC SDU is a MAC SDU that is included in the second MAC PDU and that corresponds to the identifier of the logical channel associated with the at least one RLC entity or the at least two RLC entities in the sidelink radio bearer.

In a possible implementation, the method provided in this embodiment of this application further includes: The second terminal receives a first MAC PDU and a third combination information that are sent by the first terminal. The third information combination includes source information, destination information, and identifiers of a first group of logical channels in two groups of logical channels in the sidelink radio bearer, and the third information combination indicates that a first MAC SDU is a MAC SDU in the sidelink radio bearer. The first MAC SDU is a MAC SDU that is included in the first MAC PDU and that corresponds to an identifier of a first logical channel in the two logical channels associated with the at least one RLC entity or the at least two RLC entities in the sidelink radio bearer. The source information is a source layer 2 identifier of the first terminal, and the destination information is a source layer 2 identifier of the second terminal.

In a possible implementation, the method provided in this embodiment of this application further includes: The second terminal sends a second MAC PDU and a fourth information combination to the first terminal. The fourth information combination indicates that a second media access control service data unit MAC SDU is a MAC SDU in the sidelink radio bearer. The second MAC SDU is a MAC SDU that is included in the second MAC PDU and that corresponds to an identifier of a second logical channel in the two logical channels associated with the at least one RLC entity or the at least two RLC entities in the sidelink radio bearer. The source information is a source layer 2 identifier of the second terminal, and the destination information is a source layer 2 identifier of the first terminal.

In a possible implementation, the method provided in this embodiment of this application further includes: The second terminal determines that a QoS flow mapped to the sidelink radio bearer changes. The second terminal sends a fifth message to the first terminal or the network device. The fifth message is used to indicate a change of the QoS flow mapped to the sidelink radio bearer.

In a possible implementation, the method further includes: That the second terminal determines that a QoS flow mapped to the sidelink radio bearer changes includes: The second terminal receives a sixth message from the first terminal. The sixth message is used to indicate that a QoS flow mapped to a first sidelink radio bearer changes.

According to a fourth aspect, an embodiment of this application provides a radio bearer configuration method, including: A first terminal determines to establish or configure a sidelink radio bearer. The first terminal sends a first message to a second terminal. The first message includes at least one of the following information: quality of service QoS information mapped to the sidelink radio bearer between the second terminal and the first terminal, and first configuration information of the sidelink radio bearer. The first configuration information includes at least one of the following information: first indication information and a bearer type indication. The first indication information is used to indicate a radio link control RLC layer working mode of the sidelink radio bearer, and the bearer type indication is used to indicate that the sidelink radio bearer is a bidirectional bearer.

In a possible implementation, the method provided in this embodiment of this application further includes: The first terminal sends a sixth message to the second terminal. The sixth message is used to indicate that a QoS flow mapped to a first sidelink radio bearer changes.

In a possible implementation, the method provided in this embodiment of this application further includes: The first terminal receives a fifth message from the second terminal. The fifth message is used to indicate a change of a QoS flow mapped to the sidelink radio bearer.

In a possible implementation, the method provided in this embodiment of this application further includes: The first terminal increases or decreases, based on the fifth message, a quantity of the QoS flow mapped to the sidelink radio bearer.

It should be understood that for descriptions that the sidelink radio bearer includes two logical channels or one logical channel in the sixth aspect, refer to the same descriptions in the third aspect. Details are not described herein again.

In a possible implementation, the method provided in this embodiment of this application further includes: The first terminal receives, from the second terminal, a fourth message that includes third configuration information. Content of the third configuration information belongs to the first configuration information or second configuration information. For specific content of the first configuration information and the second configuration information, refer to the same descriptions in the third aspect. Details are not described herein again.

In a possible implementation, the method provided in this embodiment of this application further includes: The first terminal sends a first MAC PDU and first combination information to the second terminal. For specific content of the first MAC PDU and the first combination information, refer to the same descriptions in the third aspect. Details are not described herein again.

In a possible implementation, the method provided in this embodiment of this application further includes: The first terminal receives a second MAC PDU and second combination information from the second terminal. For specific content of the second MAC PDU and the second combination information, refer to the descriptions in the third aspect. Details are not described herein again.

In a possible implementation, the method provided in this embodiment of this application further includes: The first terminal sends the first MAC PDU and a third information combination to the second terminal. For specific content of the first MAC PDU and the third combination information, refer to the same descriptions in the third aspect. Details are not described herein again.

In a possible implementation, the method provided in this embodiment of this application further includes: The first terminal receives the second MAC PDU and a fourth information combination from the second terminal. For specific content of the second MAC PDU and the fourth combination information, refer to the same descriptions in the third aspect. Details are not described herein again.

According to a fifth aspect, this application provides a radio bearer configuration apparatus. The radio bearer configuration apparatus may implement the method according to any one of the first aspect or the possible implementations of the first aspect, and therefore may also implement beneficial effects according to any one of the first aspect or the possible implementations of the first aspect. The radio bearer configuration apparatus may be a second terminal, or may be an apparatus that can support a second terminal in implementing the method according to any one of the first aspect or the possible implementations of the first aspect, for example, a chip applied to the second terminal. The apparatus may implement the foregoing method by using software, hardware, or hardware executing corresponding software.

In an example, an embodiment of this application provides a radio bearer configuration apparatus. The apparatus includes a processing unit and a communications unit. The processing unit is configured to determine that a first sidelink radio bearer and a second sidelink radio bearer that are used during communication between a second terminal and a first terminal are associated with each other. The communications unit is configured to send, to the first terminal, a first message that carries first indication information. The first indication information is used to indicate that the first sidelink radio bearer is associated with the second sidelink radio bearer. The first sidelink radio bearer is used by the first terminal to send first sidelink service data to the second terminal. The second sidelink radio bearer is used by the second terminal to send a first radio link control RLC status report for the first sidelink service data to the first terminal.

In a possible implementation, the second sidelink radio bearer is further used by the second terminal to send second sidelink service data to the first terminal. The first sidelink radio bearer is further used by the first terminal to send a second RLC status report for the second sidelink service data to the second terminal.

In a possible implementation, the first sidelink radio bearer and the second sidelink radio bearer are unidirectional bearers.

For specific content of the first sidelink radio bearer and the second sidelink radio bearer, refer to the descriptions in the first aspect. Details are not described herein again.

In a possible implementation, the communications unit is configured to receive a second message from the first terminal. The second message includes any one or more of the following information: an identifier of the first sidelink radio bearer, an identifier of at least one first logical channel, or quality of service QoS information mapped to the first sidelink radio bearer.

In a possible implementation, the communications unit is configured to send, to a network device, a third message used to request to configure the second sidelink radio bearer, where the third message includes at least the QoS information. The second terminal receives a fourth message from the network device. The fourth message includes the QoS information and first configuration information that is associated with the QoS information and that is used to configure the second sidelink radio bearer.

In a possible implementation, the fourth message further includes at least one of the following information: an identifier of the second sidelink radio bearer, an identifier of at least one second logical channel, and a first mapping relationship. The first mapping relationship includes a mapping relationship between the QoS information and the identifier of the second sidelink radio bearer, and/or a mapping relationship between the QoS information and the identifier of the at least one second logical channel. The processing unit is specifically configured to determine, based on the fourth message, that the first sidelink radio bearer is associated with the second sidelink radio bearer.

In a possible implementation, the third message further includes any one or more of the following information: the identifier of the first sidelink radio bearer or the identifier of the at least one first logical channel. The fourth message further includes a second mapping relationship. The second mapping relationship includes a mapping relationship between information about the first sidelink radio bearer and information about the second sidelink radio bearer. The processing unit is specifically configured to determine, based on the second mapping relationship, that the first sidelink radio bearer is associated with the second sidelink radio bearer.

In a possible implementation, the processing unit is specifically configured to determine, based on the second message and preconfiguration information, that the first sidelink radio bearer is associated with the second sidelink radio bearer. The preconfiguration information includes at least the QoS information and second configuration information associated with the QoS information. The second configuration information is used to configure the second sidelink radio bearer.

In a possible implementation, the preconfiguration information further includes at least one of the following information: the identifier of the second sidelink radio bearer, the identifier of the at least one second logical channel, and a third mapping relationship. The third mapping relationship includes the mapping relationship between the QoS information and the identifier of the second sidelink radio bearer, and/or the mapping relationship between the QoS information and the identifier of the at least one second logical channel. The processing unit is specifically configured to determine, based on the third mapping relationship, that the first sidelink radio bearer is associated with the second sidelink radio bearer.

In a possible implementation, the preconfiguration information further includes a fourth mapping relationship. The fourth mapping relationship includes the mapping relationship between the information about the first sidelink radio bearer and the information about the second sidelink radio bearer. The processing unit is specifically configured to determine, based on the fourth mapping relationship, that the first sidelink radio bearer is associated with the second sidelink radio bearer.

In a possible implementation, the processing unit is specifically configured to autonomously determine the identifier of the second sidelink radio bearer and/or the identifier of the at least one second logical channel.

In a possible implementation, that the first indication information is used to indicate that the first sidelink radio bearer is associated with the second sidelink radio bearer specifically includes any one or more of the following information: the mapping relationship between the information about the first sidelink radio bearer and the information about the second sidelink radio bearer. The information about the first sidelink radio bearer includes the identifier of the first sidelink radio bearer and/or the identifier of the at least one first logical channel in the first sidelink radio bearer. The information about the second sidelink radio bearer includes the identifier of the at least one second logical channel in the second sidelink radio bearer and/or the identifier of the second sidelink radio bearer.

In a possible implementation, that the first indication information is used to indicate that the first sidelink radio bearer is associated with the second sidelink radio bearer specifically includes: the first indication information includes the identifier of the second sidelink radio bearer and/or the identifier of the at least one second logical channel.

In a possible implementation, when the identifier of the second sidelink radio bearer is the same as the identifier of the first sidelink radio bearer, and/or the identifier of the at least one second logical channel is the same as the identifier of the at least one first logical channel, the processing unit is specifically configured to determine that the first sidelink radio bearer is associated with the second sidelink radio bearer. The third message further includes the identifier of the second sidelink radio bearer and/or the identifier of the at least one second logical channel in the second sidelink radio bearer.

In a possible implementation, the identifier of the second sidelink radio bearer is the same as the identifier of the first sidelink radio bearer, and/or the identifier of the at least one second logical channel is the same as the identifier of the at least one first logical channel. The preconfiguration information further includes at least one of the following information: the identifier of the second sidelink radio bearer, the identifier of the at least one second logical channel, and a fifth mapping relationship. The fifth mapping relationship includes the mapping relationship between the QoS information and the identifier of the second sidelink radio bearer, and/or the mapping relationship between the QoS information and the identifier of the at least one second logical channel. In this case, the processing unit is specifically configured to determine that the first sidelink radio bearer is associated with the second sidelink radio bearer.

In a possible implementation, the communications unit is further configured to send, to the network device, at least one of the following information: source address information of the second sidelink radio bearer, destination address information of the second sidelink radio bearer, and indication information indicating that an RLC layer working mode of the second sidelink radio bearer is an AM mode. The communications unit is further configured to receive, from the network device, at least one of the following information: the source address information of the second sidelink radio bearer and the destination address information of the second sidelink radio bearer.

In a possible implementation, the communications unit is further configured to send, to the first terminal, at least one of the following information: the source address information of the second sidelink radio bearer, the destination address information of the second sidelink radio bearer, and third configuration information of the second sidelink radio bearer.

In a possible implementation, the processing unit is further configured to configure at least one first RLC entity in the first sidelink radio bearer of the second terminal and at least one second RLC entity in the second sidelink radio bearer of the second terminal to be associated with each other.

In a possible implementation, the processing unit is further configured to send the first RLC status report and second indication information to the at least one second RLC entity in the second sidelink radio bearer by using the at least one first RLC entity in the first sidelink radio bearer. The second indication information is used to indicate that the first RLC status report is an RLC status report for the first sidelink service data received by the second terminal. Alternatively, the at least one first RLC entity in the first sidelink radio bearer sends the second RLC status report and third indication information to the at least one second RLC entity in the second sidelink radio bearer. The third indication information is used to indicate that the second RLC status report is an RLC status report that is for the second sidelink service data and that is sent by the first terminal.

In a possible implementation, the processing unit is further configured to determine that a QoS flow mapped to the first sidelink radio bearer or the second sidelink radio bearer changes. The communications unit is further configured to send a fifth message to the first terminal or the network device. The fifth message is used to indicate a change of the QoS flow mapped to the first sidelink radio bearer or the second sidelink radio bearer.

In a possible implementation, the communications unit is further configured to receive a sixth message from the first terminal. The sixth message is used to indicate that the QoS flow mapped to the first sidelink radio bearer changes. In this way, the processing unit determines, based on the sixth message, that the QoS flow mapped to the first sidelink radio bearer or the second sidelink radio bearer changes.

In another example, an embodiment of this application provides a radio bearer configuration apparatus. The radio bearer configuration apparatus may be a second terminal, or may be a chip in a second terminal. When the radio bearer configuration apparatus is the second terminal, a communications unit may be a transceiver, and the processing unit may be a processor. The radio bearer configuration apparatus may further include a storage unit. The storage unit may be a memory. The storage unit is configured to store computer program code, where the computer program code includes an instruction. The processing unit executes the instruction stored in the storage unit, so that the second terminal implements the radio bearer configuration method according to any one of the first aspect or the possible implementations of the first aspect. When the radio bearer configuration apparatus is the chip in the second terminal, the processing unit may be a processor, and the communications unit may be collectively referred to as a communications interface. For example, the communications interface may be an input/output interface, a pin, a circuit, or the like. The processing unit executes computer program code stored in a storage unit, so that the second terminal implements the radio bearer configuration method according to any one of the first aspect or the possible implementations of the first aspect. The storage unit may be a storage unit (for example, a register or a cache) in the chip, or may be a storage unit (for example, a read-only memory or a random access memory) that is in the second terminal and that is located outside the chip.

Optionally, the processor, the communications interface, and the memory are coupled to each other.

In an example, the radio bearer configuration apparatus includes a communications unit and a processing unit. The communications unit is configured to receive a first message from a second terminal. The first message includes first indication information used to indicate that a first sidelink radio bearer and a second sidelink radio bearer that are used when a first terminal communicates with the second terminal are associated with each other. The first sidelink radio bearer is used by the first terminal to send the first sidelink service data to the second terminal, and the second sidelink radio bearer is used by the second terminal to send a first radio link control RLC status report for the first sidelink service data to the first terminal. The processing unit is configured to determine, based on the first indication information, that the first RLC status report is an RLC status report for the first sidelink service data.

In a possible implementation, the second sidelink radio bearer is further used by the second terminal to send second sidelink service data to the first terminal, and the first sidelink radio bearer is further used by the first terminal to send a second RLC status report for the second sidelink service data to the second terminal. The processing unit is further configured to determine, based on the first indication information, to send the second RLC status report for the second sidelink service data by using the first sidelink radio bearer.

In a possible implementation, the processing unit is further configured to configure at least one first RLC entity in the first sidelink radio bearer of the first terminal and at least one second RLC entity in the second sidelink radio bearer of the first terminal to be associated with each other.

In a possible implementation, the communications unit is further configured to send, to the second terminal, a second message including any one or more of the following information: an identifier of the first sidelink radio bearer, an identifier of at least one first logical channel in the first sidelink radio bearer, or quality of service QoS information mapped to the first sidelink radio bearer.

In a possible implementation, that the first indication information is used to indicate that the first sidelink radio bearer is associated with the second sidelink radio bearer specifically includes any one or more of the following information: a mapping relationship between information about the first sidelink radio bearer and information about the second sidelink radio bearer. The information about the first sidelink radio bearer includes any one or more of the following information: the identifier of the first sidelink radio bearer or the identifier of the at least one first logical channel. The information about the second sidelink radio bearer includes any one or more of the following information: an identifier of at least one second logical channel or an identifier of the second sidelink radio bearer.

In a possible implementation, that the first indication information is used to indicate that the first sidelink radio bearer is associated with the second sidelink radio bearer specifically includes: the first indication information includes the identifier of the second sidelink radio bearer and/or the identifier of the at least one second logical channel.

In a possible implementation, the identifier of the second sidelink radio bearer is the same as the identifier of the first sidelink radio bearer, and/or the identifier of the at least one second logical channel is the same as the identifier of the at least one first logical channel.

In a possible implementation, the communications unit is further configured to receive, from the second terminal, at least one of the following information: source address information of the second sidelink radio bearer, destination address information of the second sidelink radio bearer, and third configuration information of the second sidelink radio bearer.

In a possible implementation, the communications unit is further configured to send, to the second terminal, a sixth message used to indicate that QoS mapped to the first sidelink radio bearer changes.

In a possible implementation, the communications unit is further configured to send a seventh message to a network device. The seventh message includes QoS information of a first sidelink service and any one or more of the following information: source address information and destination address information that correspond to the QoS information of the first sidelink service, and an identifier of a sidelink radio bearer that is established between the first terminal and the second terminal and/or an identifier of a logical channel in the sidelink radio bearer that is established between the first terminal and the second terminal. The communications unit is further configured to receive an eighth message from the network device. The eighth message includes source address information of the first sidelink radio bearer, destination address information of the first sidelink radio bearer, or configuration information of the first sidelink radio bearer.

In another example, an embodiment of this application provides a radio bearer configuration apparatus. The radio bearer configuration apparatus may be a first terminal, or may be a chip in a first terminal. When the radio bearer configuration apparatus is the first terminal, the communications unit may be a transceiver, and the processing unit may be a processor. The radio bearer configuration apparatus may further include a storage unit. The storage unit may be a memory. The storage unit is configured to store computer program code, where the computer program code includes an instruction. The processing unit executes the instruction stored in the storage unit, so that the first terminal implements the radio bearer configuration method according to any one of the second aspect or the possible implementations of the second aspect. When the radio bearer configuration apparatus is the chip in the first terminal, the processing unit may be a processor, and the communications unit may be collectively referred to as a communications interface. For example, the communications interface may be an input/output interface, a pin, a circuit, or the like. The processing unit executes computer program code stored in a storage unit, so that the first terminal implements the radio bearer configuration method according to any one of the second aspect or the possible implementations of the second aspect. The storage unit may be a storage unit (for example, a register or a cache) in the chip, or may be a storage unit (for example, a read-only memory or a random access memory) that is in the first terminal and that is located outside the chip.

Optionally, the processor, the communications interface, and the memory are coupled to each other.

According to a seventh aspect, this application provides a radio bearer configuration apparatus. The radio bearer configuration apparatus may implement the method according to any one of the third aspect or the possible implementations of the third aspect, and therefore may also implement beneficial effects according to any one of the third aspect or the possible implementations of the third aspect. The radio bearer configuration apparatus may be a second terminal, or may be an apparatus that can support a second terminal in implementing the method according to any one of the third aspect or the possible implementations of the third aspect, for example, a chip applied to the second terminal. The apparatus may implement the foregoing method by using software, hardware, or hardware executing corresponding software.

In an example, an embodiment of this application provides a radio bearer configuration apparatus, including a communications unit and a processing unit. The communications unit is configured to receive a first message from a first terminal. The first message includes any one or more of the following information: quality of service QoS information mapped to a sidelink radio bearer between a second terminal and the first terminal, and first configuration information of the sidelink radio bearer. The first configuration information includes at least one of the following information: first indication information and a bearer type indication. The first indication information is used to indicate a radio link control RLC layer working mode of the sidelink radio bearer, and the bearer type indication is used to indicate that the sidelink radio bearer is a bidirectional bearer. The processing unit is configured to: establish or configure the sidelink radio bearer based on the first message.

In a possible implementation, the sidelink radio bearer includes at least one RLC entity or at least two RLC entities. When the RLC layer working mode is an acknowledged mode AM, the at least one RLC entity is associated with one logical channel. When the RLC layer working mode is an unacknowledged mode UM, the at least two RLC entities are associated with one logical channel.

In a possible implementation, an identifier of the sidelink radio bearer and/or an identifier of a logical channel in the sidelink radio bearer are/is unique in a connection between the second terminal and the first terminal. The connection between the second terminal and the first terminal is identified by using a first identifier.

In a possible implementation, the first identifier is a combination of a layer 2 identifier of the first terminal and a layer 2 identifier of the second terminal.

In a possible implementation, the sidelink radio bearer includes at least one RLC entity or at least two RLC entities, and the at least one RLC entity or the at least two RLC entities are associated with two logical channels. When the RLC layer working mode is an AM, the at least one RLC entity is associated with the two logical channels. When the RLC layer working mode is a UM, any one of the at least two RLC entities is associated with one of the two logical channels.

In a possible implementation, an identifier of the sidelink radio bearer and/or an identifier of either of the two logical channels are/is unique in a combination of source information and destination information.

In a possible implementation, an identifier of one of the two logical channels is unique in a combination of first source information and first destination information, the first source information is a source layer 2 identifier of the first terminal, and the first destination information is a source layer 2 identifier of the second terminal. An identifier of the other one of the two logical channels is unique in a combination of second source information and second destination information, the second source information is a source layer 2 identifier of the second terminal, and the second destination information is a source layer 2 identifier of the first terminal.

In a possible implementation, the first configuration information includes an identifier of either of the two logical channels or an identifier of the sidelink radio bearer.

In a possible implementation, the first configuration information is used by the first terminal to send sidelink service data and/or control signaling by using the sidelink radio bearer, and is used by the second terminal to receive sidelink service data and/or control signaling by using the sidelink radio bearer.

In a possible implementation, the communications unit is further configured to obtain second configuration information of the sidelink radio bearer. The second terminal configures the sidelink radio bearer based on the second configuration information of the sidelink radio bearer. The second configuration information includes at least one of the following information: an identifier of the sidelink radio bearer, configuration information of a PDCP entity in the sidelink radio bearer, configuration information of at least one RLC entity or at least two RLC entities in the sidelink radio bearer, configuration information of one logical channel associated with the at least one RLC entity or the at least two RLC entities in the sidelink radio bearer, and an identifier of the logical channel.

In a possible implementation, the communications unit is further configured to obtain second configuration information of the sidelink radio bearer. The second terminal configures the sidelink radio bearer based on the second configuration information of the sidelink radio bearer. The second configuration information includes at least one of the following information: an identifier of the sidelink radio bearer, configuration information of a PDCP entity in the sidelink radio bearer, configuration information of at least one RLC entity or at least two RLC entities in the sidelink radio bearer, configuration information of either of two logical channels associated with the at least one RLC entity or the at least two RLC entities in the sidelink radio bearer, and an identifier of the logical channel.

In a possible implementation, the second configuration information is used by the second terminal to send sidelink service data and/or control signaling by using the sidelink radio bearer, and is used by the first terminal to receive sidelink service data and/or control signaling by using the sidelink radio bearer.

In a possible implementation, the communications unit is specifically configured to receive a second message from a network device, where the second message includes the second configuration information that is of the sidelink radio bearer and that is configured for the second terminal. Alternatively, the communications unit is specifically configured to obtain the second configuration information of the sidelink radio bearer from preconfiguration information.

In a possible implementation, the communications unit is further configured to send a third message to the network device. The third message includes at least one of the following information: an identifier of the sidelink radio bearer, an identifier of at least one of two logical channels associated with at least one RLC entity or at least two RLC entities in the sidelink radio bearer, the QoS information mapped to the sidelink radio bearer, and the first indication information.

In a possible implementation, the second message and the third message each further include the first identifier.

In a possible implementation, the communications unit is specifically configured to send a fourth message to the first terminal, where the fourth message includes third configuration information of the sidelink radio bearer.

In a possible implementation, the communications unit is further configured to receive a first MAC PDU and first combination information that are sent by the first terminal. The first combination information includes the first identifier and identifiers of one group of logical channels in the sidelink radio bearer, and the first combination information indicates that a first MAC SDU is a MAC SDU in the sidelink radio bearer. The first MAC SDU is a MAC SDU that is included in the first MAC PDU and that corresponds to the identifiers of the group of logical channels in the sidelink radio bearer.

In a possible implementation, the communications unit is further configured to send a second MAC PDU and second combination information to the first terminal. The second combination information includes the first identifier and identifiers of one group of logical channels, and the second combination information indicates that a second MAC SDU is a MAC SDU in the sidelink radio bearer. The second MAC SDU is a MAC SDU that is included in the second MAC PDU and that corresponds to the identifiers of the group of logical channels.

In a possible implementation, the communications unit is further configured to receive a first MAC PDU and a third information combination that are sent by the first terminal. The third information combination includes source information, destination information, and identifiers of a first group of logical channels in two groups of logical channels in the sidelink radio bearer, and the third information combination indicates that a first MAC SDU is a MAC SDU in the sidelink radio bearer. The first MAC SDU is a MAC SDU that is included in the first MAC PDU and that corresponds to the identifiers of the first group of logical channels in the sidelink radio bearer, the source information is a source layer 2 identifier of the first terminal, and the destination information is a source layer 2 identifier of the second terminal.

In a possible implementation, the communications unit is further configured to send a second MAC PDU and a fourth information combination to the first terminal. The fourth information combination includes source information, destination information, and identifiers of a second group of logical channels in two groups of logical channels in the sidelink radio bearer, and the fourth information combination indicates that a second MAC SDU is a MAC SDU in the sidelink radio bearer. The second MAC SDU is a MAC SDU that is included in the second MAC PDU and that corresponds to an identifier of a second logical channel in the sidelink radio bearer, the source information is a source layer 2 identifier of the second terminal, and the destination information is a source layer 2 identifier of the first terminal.

In a possible implementation, the processing unit is further configured to determine that a QoS flow mapped to the sidelink radio bearer changes. The second terminal sends a fifth message to the first terminal or the network device. The fifth message is used to indicate a change of the QoS flow mapped to the sidelink radio bearer.

In a possible implementation, the communications unit is further configured to receive a sixth message from the first terminal. The sixth message is used to indicate that a QoS flow mapped to a first sidelink radio bearer changes. The processing unit is specifically configured to determine, based on the sixth message, that the QoS flow mapped to the first sidelink radio bearer changes.

In another example, an embodiment of this application provides a radio bearer configuration apparatus. The radio bearer configuration apparatus may be a second terminal, or may be a chip in a second terminal. When the radio bearer configuration apparatus is the second terminal, the communications unit may be a transceiver, and the processing unit may be a processor. The radio bearer configuration apparatus may further include a storage unit. The storage unit may be a memory. The storage unit is configured to store computer program code, where the computer program code includes an instruction. The processing unit executes the instruction stored in the storage unit, so that the second terminal implements the radio bearer configuration method according to any one of the first aspect or the possible implementations of the first aspect. When the radio bearer configuration apparatus is the chip in the second terminal, the processing unit may be a processor, and the communications unit may be collectively referred to as a communications interface. For example, the communications interface may be an input/output interface, a pin, a circuit, or the like. The processing unit executes computer program code stored in a storage unit, so that the second terminal implements the radio bearer configuration method according to any one of the first aspect or the possible implementations of the first aspect. The storage unit may be a storage unit (for example, a register or a cache) in the chip, or may be a storage unit (for example, a read-only memory or a random access memory) that is in the second terminal and that is located outside the chip.

Optionally, the processor, the communications interface, and the memory are coupled to each other.

According to an eighth aspect, this application provides a radio bearer configuration apparatus. The radio bearer configuration apparatus may implement the method according to any one of the fourth aspect or the possible implementations of the fourth aspect, and therefore may also implement beneficial effects according to any one of the fourth aspect or the possible implementations of the fourth aspect. The radio bearer configuration apparatus may be a first terminal, or may be an apparatus that can support a first terminal in implementing the method according to any one of the fourth aspect or the possible implementations of the fourth aspect, for example, a chip applied to the first terminal. The apparatus may implement the foregoing method by using software, hardware, or hardware executing corresponding software.

In an example, an embodiment of this application provides a radio bearer configuration apparatus. The radio bearer configuration apparatus includes: a processing unit, configured to determine to establish or configure a sidelink radio bearer; and a communications unit, configured to send a first message to a second terminal. The first message includes at least one of the following information: quality of service QoS information mapped to the sidelink radio bearer between the second terminal and a first terminal, and first configuration information of the sidelink radio bearer. The first configuration information includes at least one of the following information: first indication information and a bearer type indication. The first indication information is used to indicate a radio link control RLC layer working mode of the sidelink radio bearer, and the bearer type indication is used to indicate that the sidelink radio bearer is a bidirectional bearer.

In a possible implementation, the communications unit is further configured to send a sixth message to the second terminal. The sixth message is used to indicate that a QoS flow mapped to a first sidelink radio bearer changes.

In a possible implementation, the communications unit is further configured to receive a fifth message from the second terminal. The fifth message is used to indicate a change of a QoS flow mapped to the sidelink radio bearer.

In a possible implementation, the processing unit is further configured to increase or decrease, based on the fifth message, a change of the QoS flow mapped to the sidelink radio bearer.

It should be understood that for descriptions that the sidelink radio bearer includes two logical channels or one logical channel in the eighth aspect, refer to the same descriptions in the third aspect. Details are not described herein again.

In a possible implementation, the communications unit is further configured to receive, from the second terminal, a fourth message that includes third configuration information.

In a possible implementation, the communications unit is further configured to send a first MAC PDU and first combination information to the second terminal. For specific content of the first MAC PDU and the first combination information, refer to the same descriptions in the third aspect. Details are not described herein again.

In a possible implementation, the communications unit is further configured to receive a second MAC PDU and second combination information from the second terminal. For specific content of the second MAC PDU and the second combination information, refer to the descriptions in the third aspect. Details are not described herein again.

In a possible implementation, the communications unit is further configured to send the first MAC PDU and a third information combination to the second terminal. For specific content of the first MAC PDU and the third combination information, refer to the same descriptions in the third aspect. Details are not described herein again.

In a possible implementation, the communications unit is further configured to receive the second MAC PDU and a fourth information combination from the second terminal. For specific content of the second MAC PDU and the fourth combination information, refer to the same descriptions in the third aspect. Details are not described herein again.

According to a ninth aspect, an embodiment of this application provides a radio bearer configuration method. The method includes: A network device receives, from a second terminal, a third message used to request to configure a second sidelink radio bearer. The third message includes at least QoS information. The network device sends a fourth message to the second terminal. The fourth message includes the QoS information and first configuration information that is associated with the QoS information and that is used to configure the second sidelink radio bearer.

In a possible implementation, the fourth message further includes at least one of the following information: an identifier of the second sidelink radio bearer, an identifier of at least one second logical channel, and a first mapping relationship. The first mapping relationship includes a mapping relationship between the QoS information and the identifier of the second sidelink radio bearer, and/or a mapping relationship between the QoS information and the identifier of the at least one second logical channel.

In a possible implementation, the third message further includes any one or more of the following information: an identifier of a first sidelink radio bearer or an identifier of at least one first logical channel. The fourth message further includes a second mapping relationship. The second mapping relationship includes a mapping relationship between information about the first sidelink radio bearer and information about the second sidelink radio bearer.

It should be understood that in an embodiment in which the second terminal autonomously allocates the identifier of the second sidelink radio bearer and the identifier of the at least one second logical channel, the fourth message sent by the network device to the terminal may not carry the information about the second sidelink radio bearer. However, if the second terminal autonomously allocates one of the identifier of the second sidelink radio bearer and the identifier of the at least one second logical channel, the fourth message sent by the network device carries the other one of the identifier of the second sidelink radio bearer and the identifier of the at least one second logical channel.

In a possible implementation, the method provided in this embodiment of this application further includes: The network device receives, from the second terminal, at least one of the following information: source address information of the second sidelink radio bearer, destination address information of the second sidelink radio bearer, and indication information indicating that an RLC layer working mode of the second sidelink radio bearer is an AM mode.

In a possible implementation, the method provided in this embodiment of this application further includes: The network device receives a fifth message from the second terminal. The fifth message is used to indicate a change of a QoS flow mapped to the first sidelink radio bearer or the second sidelink radio bearer.

In a possible implementation, the method provided in this embodiment of this application further includes: The network device increases or decreases, based on the fifth message, a quantity of QoS flows mapped to the first sidelink radio bearer or the second sidelink radio bearer.

According to a tenth aspect, this application provides a radio bearer configuration apparatus. The radio bearer configuration apparatus may implement the method according to any one of the ninth aspect or the possible implementations of the ninth aspect, and therefore may also implement beneficial effects according to any one of the ninth aspect or the possible implementations of the ninth aspect. The radio bearer configuration apparatus may be a network device, or may be an apparatus that can support a network device in implementing the method according to any one of the ninth aspect or the possible implementations of the ninth aspect, for example, a chip applied to the network device. The apparatus may implement the foregoing method by using software, hardware, or hardware executing corresponding software.

In an example, an embodiment of this application provides a radio bearer configuration apparatus, including a communications unit and a processing unit. The communications unit is configured to receive, from a second terminal, a third message used to request to configure a second sidelink radio bearer. The third message includes at least QoS information. The communications unit is further configured to send a fourth message to the second terminal. The fourth message includes the QoS information and first configuration information that is associated with the QoS information and that is used to configure the second sidelink radio bearer.

In a possible implementation, the fourth message further includes at least one of the following information: an identifier of the second sidelink radio bearer, an identifier of at least one second logical channel, and a first mapping relationship. The first mapping relationship includes a mapping relationship between the QoS information and the identifier of the second sidelink radio bearer, and/or a mapping relationship between the QoS information and the identifier of the at least one second logical channel.

In a possible implementation, the third message further includes any one or more of the following information: an identifier of a first sidelink radio bearer or an identifier of at least one first logical channel. The fourth message further includes a second mapping relationship. The second mapping relationship includes a mapping relationship between information about the first sidelink radio bearer and information about the second sidelink radio bearer.

In a possible implementation, the communications unit is further configured to receive, from the second terminal, at least one of the following information: source address information of the second sidelink radio bearer, destination address information of the second sidelink radio bearer, and indication information indicating that an RLC layer working mode of the second sidelink radio bearer is an AM mode.

In a possible implementation, the communications unit is further configured to receive a fifth message from the second terminal. The fifth message is used to indicate a change of a QoS flow mapped to the first sidelink radio bearer or the second sidelink radio bearer.

In a possible implementation, the processing unit is further configured to increase or decrease, based on the fifth message, a quantity of QoS flows mapped to the first sidelink radio bearer or the second sidelink radio bearer.

In another example, an embodiment of this application provides a radio bearer configuration apparatus. The radio bearer configuration apparatus may be a network device, or may be a chip in a network device. When the radio bearer configuration apparatus is the network device, the communications unit may be a transceiver, and the processing unit may be a processor. The radio bearer configuration apparatus may further include a storage unit. The storage unit may be a memory. The storage unit is configured to store computer program code, where the computer program code includes an instruction. The processing unit executes the instruction stored in the storage unit, so that the network device implements the radio bearer configuration method according to any one of the ninth aspect or the possible implementations of the ninth aspect. When the radio bearer configuration apparatus is the chip in the network device, the processing unit may be a processor, and the communications unit may be collectively referred to as a communications interface. For example, the communications interface may be an input/output interface, a pin, a circuit, or the like. The processing unit executes computer program code stored in a storage unit, so that the network device implements the radio bearer configuration method according to any one of the ninth aspect or the possible implementations of the ninth aspect. The storage unit may be a storage unit (for example, a register or a cache) in the chip, or may be a storage unit (for example, a read-only memory or a random access memory) that is in the network device and that is located outside the chip.

Optionally, the processor, the communications interface, and the memory are coupled to each other.

According to an eleventh aspect, an embodiment of this application provides a computer readable storage medium. The computer readable storage medium stores a computer program or an instruction. When the computer program or the instruction is run on a computer, the computer is enabled to perform the radio bearer configuration method according to any one of the first aspect or the possible implementations of the first aspect.

According to a twelfth aspect, an embodiment of this application provides a computer readable storage medium. The computer readable storage medium stores a computer program or an instruction. When the computer program or the instruction is run on a computer, the computer is enabled to perform the radio bearer configuration method according to any one of the second aspect or the possible implementations of the second aspect.

According to a thirteenth aspect, an embodiment of this application provides a computer readable storage medium. The computer readable storage medium stores a computer program or an instruction. When the computer program or the instruction is run on a computer, the computer is enabled to perform the radio bearer configuration method according to any one of the third aspect or the possible implementations of the third aspect.

According to a fourteenth aspect, an embodiment of this application provides a computer readable storage medium. The computer readable storage medium stores a computer program or an instruction. When the computer program or the instruction is run on a computer, the computer is enabled to perform the radio bearer configuration method according to any one of the fourth aspect or the possible implementations of the fourth aspect.

According to a fifteenth aspect, an embodiment of this application provides a computer readable storage medium. The computer readable storage medium stores a computer program or an instruction. When the computer program or the instruction is run on a computer, the computer is enabled to perform the radio bearer configuration method according to any one of the ninth aspect or the possible implementations of the ninth aspect.

According to a sixteenth aspect, an embodiment of this application provides a computer program product including an instruction. When the instruction is run on a computer, the computer is enabled to perform the radio bearer configuration method according to the first aspect or the possible implementations of the first aspect.

According to a seventeenth aspect, this application provides a computer program product including an instruction. When the instruction is run on a computer, the computer is enabled to perform the radio bearer configuration method according to the second aspect or the possible implementations of the second aspect.

According to an eighteenth aspect, this application provides a computer program product including an instruction. When the instruction is run on a computer, the computer is enabled to perform the radio bearer configuration method according to the third aspect or the possible implementations of the third aspect.

According to a nineteenth aspect, this application provides a computer program product including an instruction. When the instruction is run on a computer, the computer is enabled to perform the radio bearer configuration method according to the fourth aspect or the possible implementations of the fourth aspect.

According to a twentieth aspect, this application provides a computer program product including an instruction. When the instruction is run on a computer, the computer is enabled to perform the radio bearer configuration method according to the ninth aspect or the possible implementations of the ninth aspect.

According to a twenty-first aspect, an embodiment of this application provides a communications system. The communications system includes a first terminal and a second terminal. The second terminal is configured to perform the radio bearer configuration method according to the first aspect or the possible implementations of the first aspect, and the first terminal is configured to perform the radio bearer configuration method according to the second aspect or the possible implementations of the second aspect.

In an optional implementation, the communications system may further include a network device. The network device is configured to perform the radio bearer configuration method according to the ninth aspect or the possible implementations of the ninth aspect.

According to a twenty-second aspect, an embodiment of this application provides a communications system. The communications system includes a first terminal and a second terminal. The second terminal is configured to perform the radio bearer configuration method according to the third aspect or the possible implementations of the third aspect, and the first terminal is configured to perform the radio bearer configuration method according to the fourth aspect or the possible implementations of the fourth aspect.

According to a twenty-third aspect, an embodiment of this application provides a communications apparatus. The communications apparatus includes a processor and a storage medium, and the storage medium stores an instruction. When the instruction is run by the processor, the radio bearer configuration method according to the first aspect or the possible implementations of the first aspect is implemented.

According to a twenty-fourth aspect, an embodiment of this application provides a communications apparatus. The communications apparatus includes a processor and a storage medium, and the storage medium stores an instruction. When the instruction is run by the processor, the radio bearer configuration method according to the second aspect or the possible implementations of the second aspect is implemented.

According to a twenty-fifth aspect, an embodiment of this application provides a communications apparatus. The communications apparatus includes a processor and a storage medium, and the storage medium stores an instruction. When the instruction is run by the processor, the radio bearer configuration method according to the third aspect or the possible implementations of the third aspect is implemented.

According to a twenty-sixth aspect, an embodiment of this application provides a communications apparatus. The communications apparatus includes a processor and a storage medium, and the storage medium stores an instruction. When the instruction is run by the processor, the radio bearer configuration method according to the fourth aspect or the possible implementations of the fourth aspect is implemented.

According to a twenty-seventh aspect, an embodiment of this application provides a communications apparatus. The communications apparatus includes a processor and a storage medium, and the storage medium stores an instruction. When the instruction is run by the processor, the radio bearer configuration method according to the ninth aspect or the possible implementations of the ninth aspect is implemented.

According to a twenty-eighth aspect, an embodiment of this application provides a communications apparatus. The communications apparatus includes one or more modules, configured to implement the methods according to the first aspect, the second aspect, the third aspect, the fourth aspect, and the ninth aspect, and the one or more modules may correspond to the steps in the methods according to the first aspect, the second aspect, the third aspect, the fourth aspect, and the ninth aspect.

According to a twenty-ninth aspect, an embodiment of this application provides a chip. The chip includes a processor and a communications interface. The communications interface is coupled to the processor. The processor is configured to run a computer program or an instruction, to implement the radio bearer configuration method according to the first aspect or the possible implementations of the first aspect. The communications interface is configured to communicate with a module other than the chip.

According to a thirtieth aspect, an embodiment of this application provides a chip. The chip includes a processor and a communications interface. The communications interface is coupled to the processor. The processor is configured to run a computer program or an instruction, to implement the radio bearer configuration method according to the second aspect or the possible implementations of the second aspect. The communications interface is configured to communicate with a module other than the chip.

According to a thirty-first aspect, an embodiment of this application provides a chip. The chip includes a processor and a communications interface. The communications interface is coupled to the processor. The processor is configured to run a computer program or an instruction, to implement the radio bearer configuration method according to the third aspect or the possible implementations of the third aspect. The communications interface is configured to communicate with a module other than the chip.

According to a thirty-second aspect, an embodiment of this application provides a chip. The chip includes a processor and a communications interface. The communications interface is coupled to the processor. The processor is configured to run a computer program or an instruction, to implement the radio bearer configuration method according to the fourth aspect or the possible implementations of the fourth aspect. The communications interface is configured to communicate with a module other than the chip.

According to a thirty-third aspect, an embodiment of this application provides a chip. The chip includes a processor and a communications interface. The communications interface is coupled to the processor. The processor is configured to run a computer program or an instruction, to implement the radio bearer configuration method according to the ninth aspect or the possible implementations of the ninth aspect. The communications interface is configured to communicate with a module other than the chip.

Specifically, the chip provided in this embodiment of this application further includes a memory, configured to store the computer program or the instruction.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system, refer to beneficial effects of a corresponding solution in the corresponding method provided above. Details are not described herein again.

BRIEF DESCRIPTION OF THE DRAWINGS

FIG. 11A and FIG. 11B are a schematic flowchart 6 of a radio bearer configuration method according to an embodiment of this application;

DETAILED DESCRIPTION OF ILLUSTRATIVE EMBODIMENTS

Figure 1:
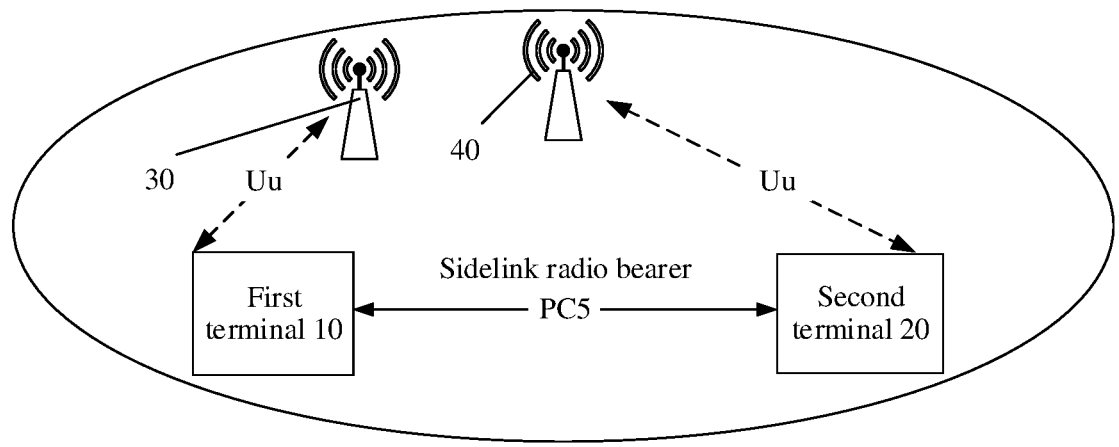
FIG. 1 is a schematic structural diagram of a communications system according to an embodiment of this application.

To clearly describe the technical solutions in the embodiments of this application, terms such as "first" and "second" are used in the embodiments of this application to distinguish between same items or similar items that have basically same functions and purposes. For example, a first terminal and a second terminal are merely intended to distinguish between different terminals, and are not intended to limit a sequence thereof. A person skilled in the art may understand that the terms such as "first" and "second" do not limit a quantity or an execution sequence, and the terms such as "first" and "second" do not indicate a definite difference.

It should be noted that in this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

The technical solutions in this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a public land mobile network (PLMN) system, a device-to-device (device to device, D2D) network system, a machine-to-machine (machine to machine, M2M) network system, a 5G communications system, and an internet of vehicles system.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems. In the embodiments of this application, an example in which a provided method is applied to an NR system or a 5G network is used for description.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural. In this specification, mapping and an association may have a same meaning.

Before the embodiments of this application are described, terms in the embodiments of this application are first described.

(1) Sidelink (SL): The sidelink is defined for direct communication between terminals, namely, a link on which direct communication is performed between the terminals without forwarding by a base station.

(2) Sidelink resource: The sidelink resource is a resource used to transmit sidelink service data and control information on the sidelink between the terminals.

(3) Sidelink service data: The sidelink service data is service data or control information transmitted by any two terminals on the sidelink.

FIG. 1 is a schematic structural diagram of a communications system according to an embodiment of this application. The communications system includes one or more first terminals 10 and one or more second terminals 20. It should be understood that FIG. 1 shows one first terminal 10 and one second terminal 20.

There is a first interface used for direct communication between the first terminal 10 and the second terminal 20, and the first interface may be referred to as a PC5 interface. A transmission link that is on the PC5 interface and that is used for communication between the first terminal 10 and the second terminal 20 may be referred to as a sidelink.

The PC5 interface may use a dedicated frequency band (for example, 5.9 GHz). A link used when the first terminal 10 communicates with the second terminal 20 through the PC5 interface may be referred to as a sidelink. One or more radio bearers (RB) may be established between the first terminal 10 and the second terminal 20. The one or more radio bearers may be separately used to transmit data and control information (for example, radio resource control (RRC) signaling) between the first terminal 10 and the second terminal 20. In this embodiment of this application, a radio bearer on the PC5 interface may be referred to as a sidelink radio bearer (SL RB). The SL RB includes an SL signaling radio bearer (SRB) and a data radio bearer (DRB). The SRB is a channel on which a system signaling message is actually transmitted, for example, is used to transmit RRC signaling. The DRB is a channel on which user data is actually transmitted.

In this embodiment of this application, the sidelink radio bearer is identified by using a source address, a destination address, and information about the sidelink radio bearer. The source address is information about a sender of a sidelink service transmitted on the sidelink radio bearer. The destination address is information about a receiver of the sidelink service transmitted on the sidelink radio bearer. The information about the sidelink radio bearer may be either or both of an identifier of the sidelink radio bearer and an identifier of a logical channel corresponding to the sidelink radio bearer.

For example, if the sidelink radio bearer is used by the first terminal 10 to send sidelink service data to the second terminal 20, the source address is a layer 2 identifier of the first terminal 10, and the destination address is a layer 2 identifier of the second terminal 20.

In an optional implementation, the communications system shown in FIG. 1 further includes a network device 30 providing a service for the first terminal 10 and a network device 40 providing a service for the second terminal 20.

Figure 2:
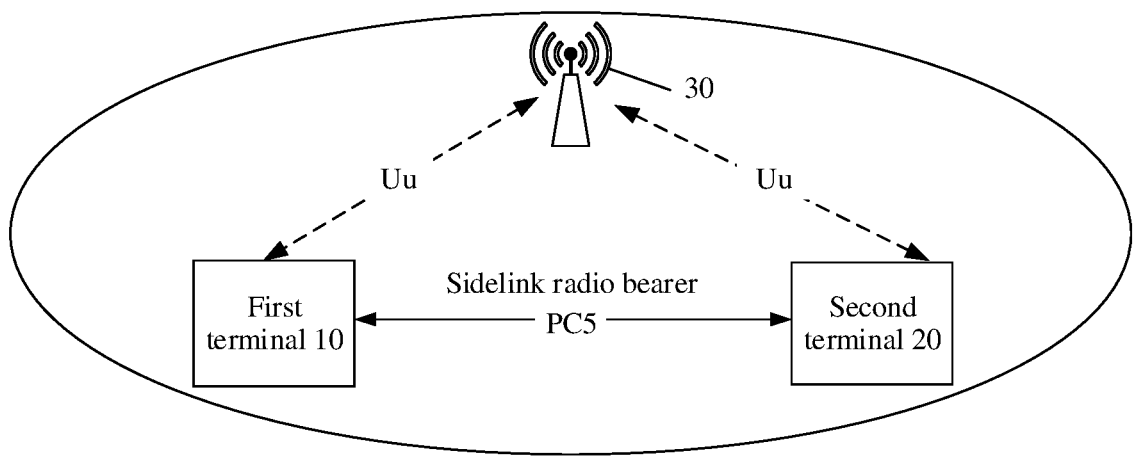
FIG. 2 is a schematic structural diagram of another communications system according to an embodiment of this application.

It should be understood that as shown in FIG. 2, the network device 30 providing a service for the first terminal 10 and the network device 40 providing a service for the second terminal 20 may be a same network device 30.

An interface between the first terminal 10 and the network device 30, and an interface between the second terminal 20 and the network device 40 each may be referred to as a second interface. For example, the second interface may be a Uu interface, and use a cellular network frequency band (for example, 1.8 GHz).

Names of the first interface and the second interface are merely examples. The names of the first interface and the second interface are not limited in this embodiment of this application.

Because the sidelink radio bearer is identified by using the source address, the destination address, and the information about the sidelink radio bearer, sidelink radio bearers may be classified into a bidirectional bearer and a unidirectional bearer in this embodiment of this application.

The bidirectional bearer, as the name implies, is a sidelink radio bearer that may be used by a sender to send sidelink service data over the sidelink radio bearer, and may further be used by the sender to receive an RLC status report for the sidelink service data over the sidelink radio bearer. It should be understood that if the sender sends the sidelink service data over the sidelink radio bearer, a receiver may receive the sidelink service data over the sidelink radio bearer. If the sender receives the RLC status report for the sidelink service data over the sidelink radio bearer, the receiver may send the RLC status report for the sidelink service data over the sidelink radio bearer.

Alternatively, the sidelink radio bearer may be used by the sender to receive sidelink service data over the sidelink radio bearer, and may further be used by the sender to send an RLC status report for the sidelink service data over the sidelink radio bearer. It should be understood that if the sender receives the sidelink service data over the sidelink radio bearer, it means that the receiver may send the sidelink service data over the sidelink radio bearer. If the sender sends the RLC status report for the sidelink service data over the sidelink radio bearer, it means that the receiver may receive the RLC status report for the sidelink service data over the sidelink radio bearer.

For example, if a sidelink radio bearer A is a bidirectional bearer, the sidelink radio bearer A may be used by the first terminal 10 to send sidelink service data A to the second terminal 20, and may further be used by the first terminal 10 to receive an RLC status report that is for the sidelink service data A and that is sent by the second terminal 20 over the sidelink radio bearer A. Alternatively, the sidelink radio bearer A is used by the second terminal 20 to send sidelink service data B to the first terminal 10, and may further be used by the second terminal 20 to receive an RLC status report that is for the sidelink service data B and that is sent by the first terminal 10 over the sidelink radio bearer A.

The unidirectional bearer, as the name implies, is a sidelink radio bearer that may be used by a sender to send sidelink service data over the sidelink radio bearer (it means that a receiver may receive the sidelink service data over the sidelink radio bearer), or is used by the sender to send, over the sidelink radio bearer, an RLC status report for sidelink service data received over another sidelink radio bearer (it means that the receiver may receive, over the sidelink radio bearer, the RLC status report for the sidelink service data sent over the another sidelink radio bearer).

Figure 3:
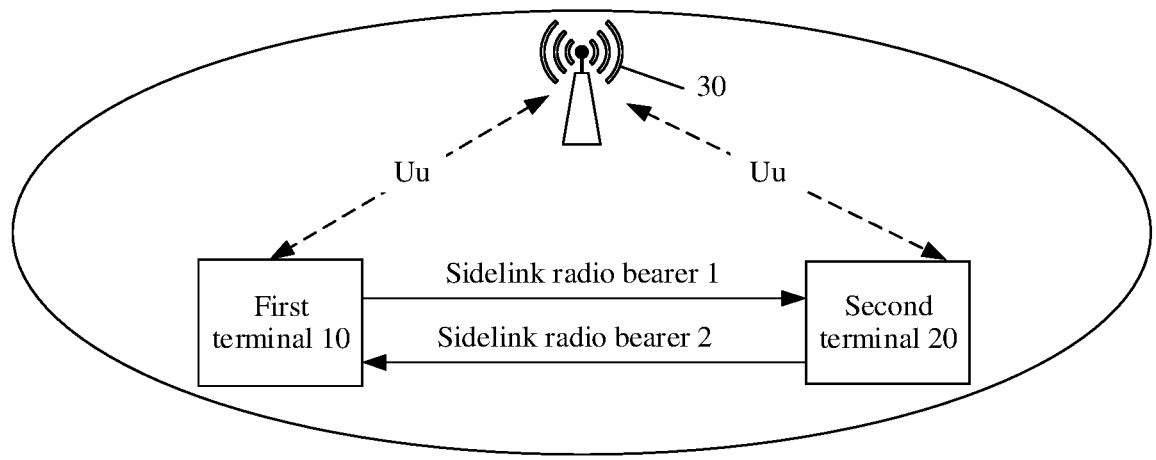
FIG. 3 is a schematic diagram of a unidirectional bearer between a first terminal and a second terminal according to an embodiment of this application.

FIG. 3 is a schematic diagram in which a sidelink radio bearer between the first terminal 10 and the second terminal 20 is a unidirectional bearer. In this case, at least two sidelink radio bearers may be configured between the first terminal 10 and the second terminal 20, for example, a sidelink radio bearer 1 and a sidelink radio bearer 2. The sidelink radio bearer 1 is used by the first terminal 10 to send sidelink service data A to the second terminal 20. The sidelink radio bearer 2 is used by the second terminal 20 to send an RLC status report for the sidelink service data A to the first terminal 10.

Figure 4:
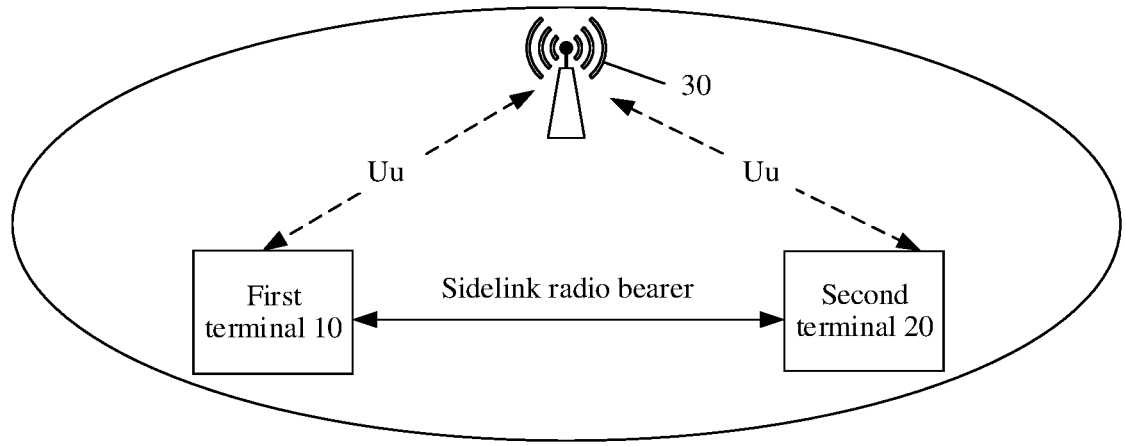
FIG. 4 is a schematic diagram of a bidirectional bearer between a first terminal and a second terminal according to an embodiment of this application.

FIG. 4 shows a bidirectional sidelink radio bearer between the first terminal 10 and the second terminal 20.

It should be noted that the communications system shown in FIG. 1 may further include a core network. The network device 30 and the network device 40 may be connected to the core network. The core network may be a 4G core network (for example, an evolved packet core (EPC) network), a 5G core network (5G Core, 5GC), or a core network in various future communications systems. It should be understood that the network device 30 and the network device 40 may be connected to a same core network. Certainly, the network device 30 and the network device 40 may alternatively be connected to different core networks.

For example, the core network may be the 4G core network. The network device 30 or the network device 40 may be an evolved NodeB (eNB or eNodeB) in a 4G system. The first terminal 10 and the second terminal 20 are terminals that can perform information transmission with the eNB. The eNB accesses the EPC network through an Si interface.

For example, the core network may be the 5G core network. The network device 30 or the network device 40 may be a next generation NodeB (The Next Generation NodeB, gNB) in an NR system. The first terminal 10 and the second terminal 20 are terminals that can perform information transmission with the gNB. The gNB accesses the 5GC through an NG interface.

Certainly, the network device 30 or the network device 40 may alternatively be a 3rd generation partnership project (3GPP) protocol base station, or may be a non-3GPP protocol base station.

There is a first transmission link between the network device 30 and the first terminal 10 or between the network device 40 and the second terminal 30. For example, the first transmission link may be a Uu link. The first terminal 10 and the second terminal 30 may transmit sidelink services to each other on a sidelink. The first terminal 10 may transmit an uplink (UL) Uu service to the network device 30 on the Uu link, or may receive, on the Uu link, a downlink (DL) Uu service sent by the network device 30.

The terminal 20 is a device with a wireless communication function. The terminal 20 may be deployed on land, and includes an indoor or outdoor device, a handheld device, or a vehicle-mounted device. Alternatively, the terminal 20 may be deployed on water (for example, on a ship), or may be deployed in the air (for example, on an airplane, a balloon, or a satellite). The terminal, also referred to as user equipment (UE), a mobile station (MS), a mobile terminal (MT), a terminal device, and the like, is a device that provides voice and/or data connectivity for a user. For example, the terminal includes a handheld device or a vehicle-mounted device having a wireless connection function. Currently, the terminal may be a mobile phone, a tablet computer, a notebook computer, a palmtop computer, a mobile internet device (MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like. In a possible application scenario of this application, the terminal device is a terminal device that often operates on land, for example, a vehicle-mounted device. In this application, for ease of description, a chip deployed in the foregoing device, for example, a system-on-a-chip (SOC), a baseband chip, or another chip having a communication function, may also be referred to as a terminal.

The terminal may be a vehicle having a corresponding communication function, a vehicle-mounted communications apparatus, or another embedded communications apparatus, or may be a handheld communications device of a user, including a mobile phone, a tablet computer, or the like.

For example, in the embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is a hardware device, and implements a powerful function based on software support, data interaction, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

The network device is an entity that is used in combination with the terminal and that may be configured to transmit or receive a signal. For example, the network device may be an access point (AP) in a WLAN, or may be an eNB or an eNodeB in LTE, a relay station or an access point, a vehicle-mounted device, a wearable device, a network device in a future 5G network, or a network device in a future evolved PLMN network.

In addition, in the embodiments of the present invention, the network device provides a service for a cell, and the terminal communicates with the network device by using a transmission resource (for example, a time domain resource, a frequency domain resource, or a time-frequency resource) used in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

Figure 5:
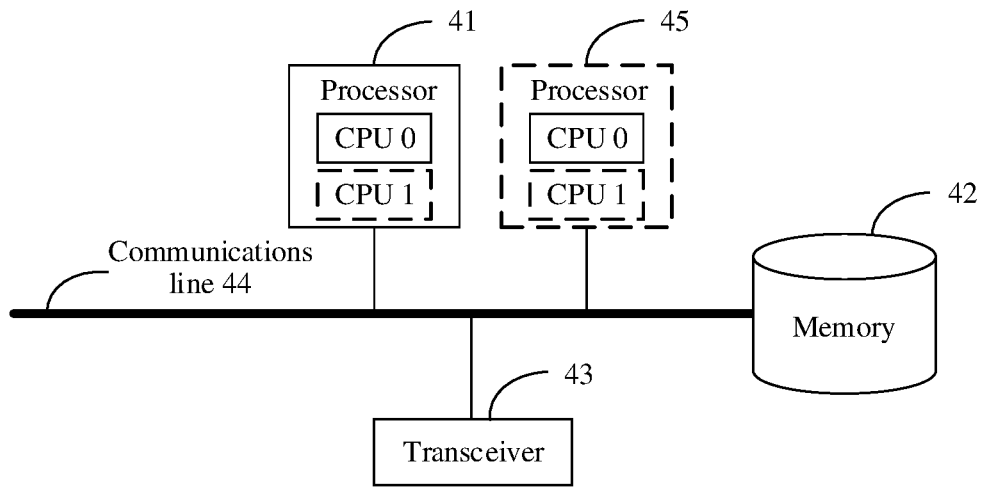
FIG. 5 is a schematic structural diagram of a communications device according to an embodiment of this application.

FIG. 5 is a schematic diagram of a hardware structure of a communications device according to an embodiment of this application. For hardware structures of the first terminal 10, the second terminal 20, the network device 30, and the network device 40 in this embodiment of this application, refer to the structure shown in FIG. 5. The communications device includes a processor 41, a communications line 44, and at least one transceiver 43.

The processor 41 may be a general-purpose central processing unit (CPU), a microprocessor, an application-specific integrated circuit (ASIC), or one or more integrated circuits for controlling program execution of the solutions of this application.

The communications line 44 may include a channel for transmitting information between the foregoing components.

The transceiver 43 is any apparatus such as a transceiver, and is configured to communicate with another device or a communications network such as the Ethernet, a radio access network (RAN), or a wireless local area network (WLAN).

Optionally, the communications device may further include a memory 42.

The memory 42 may be a read-only memory (ROM) or another type of static storage device that can store static information and an instruction, or a random access memory (RAM) or another type of dynamic storage device that can store information and an instruction. The memory 42 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 42 is not limited thereto. The memory may exist independently, and is connected to the processor through the communications line 44. The memory may alternatively be integrated into the processor.

The memory 42 is configured to store a computer execution instruction for performing the solutions in this application, and the processor 41 controls execution of the computer execution instruction. The processor 41 is configured to execute the computer execution instruction stored in the memory 42, to implement the radio bearer configuration method provided in the following embodiments of this application.

Optionally, the computer execution instruction in this embodiment of this application may also be referred to as application program code. This is not specifically limited in this embodiment of this application.

In a specific implementation, in an embodiment, the processor 41 may include one or more CPUs, for example, a CPU 0 and a CPU 1 in FIG. 5.

In a specific implementation, in an embodiment, the communications device may include a plurality of processors, for example, the processor 41 and a processor 45 in FIG. 5. Each of the processors may be a single-core processor (single-CPU), or may be a multi-core processor (multi-CPU). The processor herein may be one or more devices, circuits, and/or processing cores configured to process data (for example, a computer program instruction).

The following describes, in detail with reference to FIG. 6 to FIG. 17A and FIG. 17B, the radio bearer configuration method provided in the embodiments of this application.

It should be noted that in the following embodiments of this application, names of messages between network elements, names of parameters in messages, or the like are merely examples, and there may be other names in a specific implementation. This is not specifically limited in this embodiment of this application.

It should be noted that mutual reference may be made between the embodiments of this application. For example, for same or similar steps, mutual reference may be made between the method embodiments, the communications system embodiments, and the apparatus embodiments. This is not limited.

It should be noted that in the radio bearer configuration method in the embodiments of this application, steps performed by the second terminal may also be performed by a chip applied to the second terminal, and steps performed by the first terminal may also be performed by a chip applied to the first terminal. An example in which the radio bearer configuration method is performed by the first terminal and the second terminal is used in the following embodiments.

Embodiment 1

Figure 6:
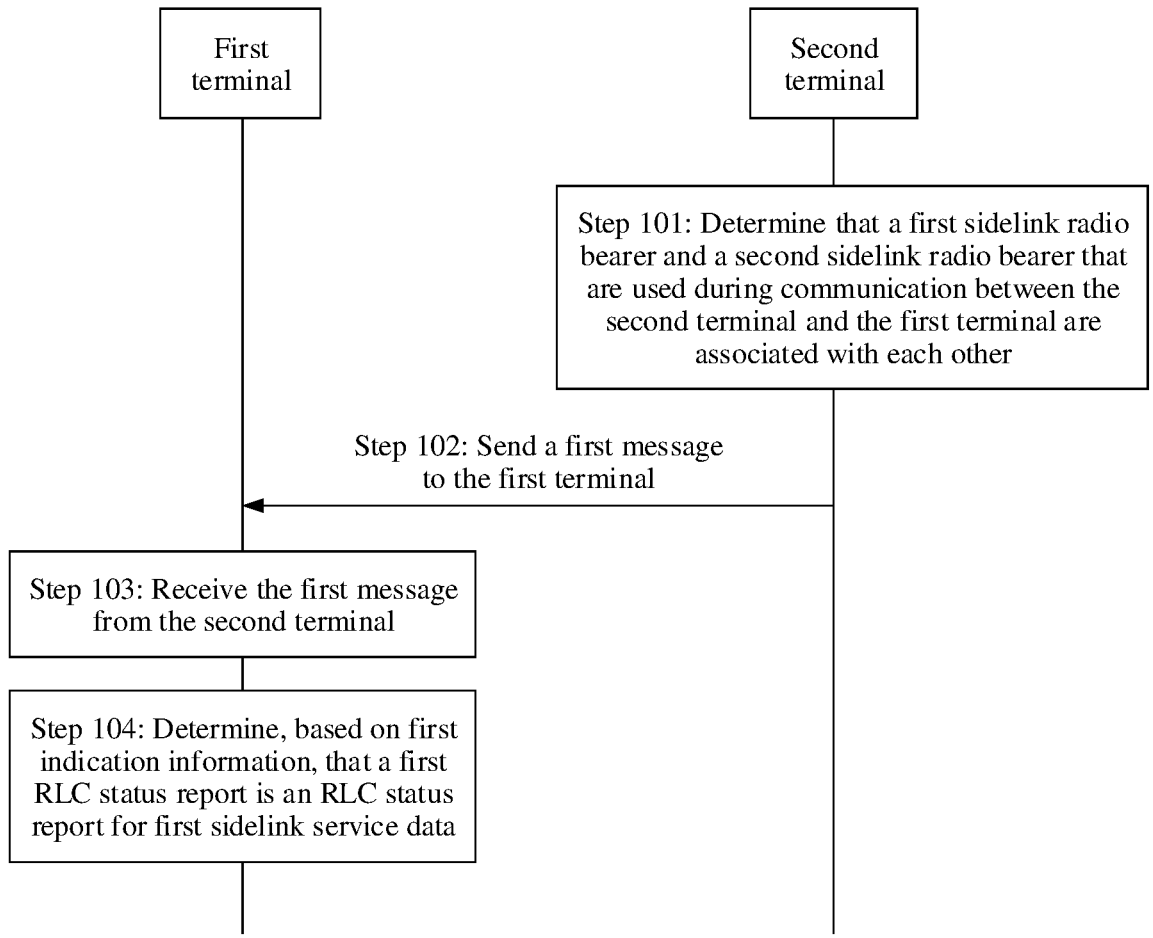
FIG. 6 is a schematic flowchart 1 of a radio bearer configuration method according to an embodiment of this application.

FIG. 6 is a schematic flowchart of interaction in a radio bearer configuration method according to an embodiment of this application. The method includes the following steps.

Step 101: A second terminal determines that a first sidelink radio bearer and a second sidelink radio bearer that are used during communication between the second terminal and a first terminal are associated with each other. The first sidelink radio bearer is used by the first terminal to send first sidelink service data to the second terminal, and the second sidelink radio bearer is used by the second terminal to send a first radio link control (RLC) status report for the first sidelink service data to the first terminal.

It should be understood that RLC layer working modes of the first sidelink radio bearer and the second sidelink radio bearer each are an acknowledged mode (AM), and the first sidelink radio bearer and the second sidelink radio bearer are unidirectional bearers.

The acknowledged mode indicates that a receiver needs to feed back an RLC status report for a received RLC protocol data unit PDU to a sender.

For example, in this embodiment of this application, the first sidelink radio bearer includes at least one first RLC entity and at least one first logical channel. The second sidelink radio bearer includes at least one second RLC entity and at least one second logical channel.

In a possible example, the first sidelink radio bearer may further include a first packet data convergence protocol (PDCP) entity, and the second sidelink radio bearer may further include a second PDCP entity.

It should be noted that in this embodiment of this application, that one sidelink radio bearer includes at least one RLC entity has the following meaning: The sidelink radio bearer may include only one RLC entity, and the RLC entity is configured to send sidelink service data or an RLC status report. To ensure reliable transmission of sidelink service data, a data packet duplication function may be configured for a sidelink radio bearer. In this case, one sidelink radio bearer needs to have at least two RLC entities, one of the at least two RLC entities is used to transmit sidelink service data, and an RLC entity other than the RLC entity in the at least two RLC entities is configured to transmit sidelink service data obtained by duplicating the sidelink service data.

In an optional implementation, the second sidelink radio bearer is further used by the second terminal to send second sidelink service data to the first terminal. The first sidelink radio bearer is used by the first terminal to send a second RLC status report for the second sidelink service data to the second terminal.

In this embodiment of this application, the RLC status report is used to acknowledge a receiving status of the sidelink service data. To be specific, the RLC status report is used by the receiver to indicate, to the sender, whether the sidelink service data is correctly received, in other words, which sidelink service data is successfully received and which sidelink service data is not successfully received. For example, the first RLC status report sent over the second sidelink radio bearer is used to indicate whether the first sidelink service data is correctly received. The second RLC status report sent over the first sidelink radio bearer is used to indicate whether the second sidelink service data is correctly received.

Step 102: The second terminal sends a first message to the first terminal. The first message includes first indication information, and the first indication information is used to indicate that the first sidelink radio bearer is associated with the second sidelink radio bearer.

In a specific implementation, the first indication information is specifically used to indicate the first terminal to determine that the first sidelink radio bearer is associated with the second sidelink radio bearer.

It should be understood that the first message may be a sidelink RRC reconfiguration message or a sidelink RRC reconfiguration complete message.

Step 103: The first terminal receives the first message from the second terminal.

Step 104: The first terminal determines, based on the first indication information, that the first RLC status report is an RLC status report for the first sidelink service data.

This embodiment of this application provides a radio bearer configuration method. In the prior art, the first terminal does not know that the first sidelink radio bearer is associated with the second sidelink radio bearer. Therefore, the first terminal cannot determine sidelink service data on a sidelink radio bearer to which the RLC status report received by the first terminal corresponds, and RLC status reports for different sidelink service data sent by the first terminal may conflict with each other or may be incorrectly received. As sidelink service data of the first terminal increases, reliability of sidelink communication cannot be ensured. In this embodiment of this application, the second terminal determines that the first sidelink radio bearer and the second sidelink radio bearer that are used during communication between the second terminal and the first terminal are associated with each other, and sends the first indication information to the first terminal, to indicate that the first sidelink radio bearer is associated with the second sidelink radio bearer, so that the first terminal determines to use the first sidelink radio bearer to send the first sidelink service data to the second terminal, and if the first terminal receives the first RLC status report over the second sidelink radio bearer, the first terminal can determine, based on the foregoing association, that the first RLC status report is for the first sidelink service data on the first sidelink radio bearer, to ensure that the sidelink radio bearer between the first terminal and the second terminal can support an RLC layer AM transmission manner. In addition, the method in this embodiment helps the first terminal and the second terminal determine, based on the first RLC status report, whether to retransmit the first sidelink service data, thereby ensuring reliability of transmitting the sidelink service data.

Figure 7:
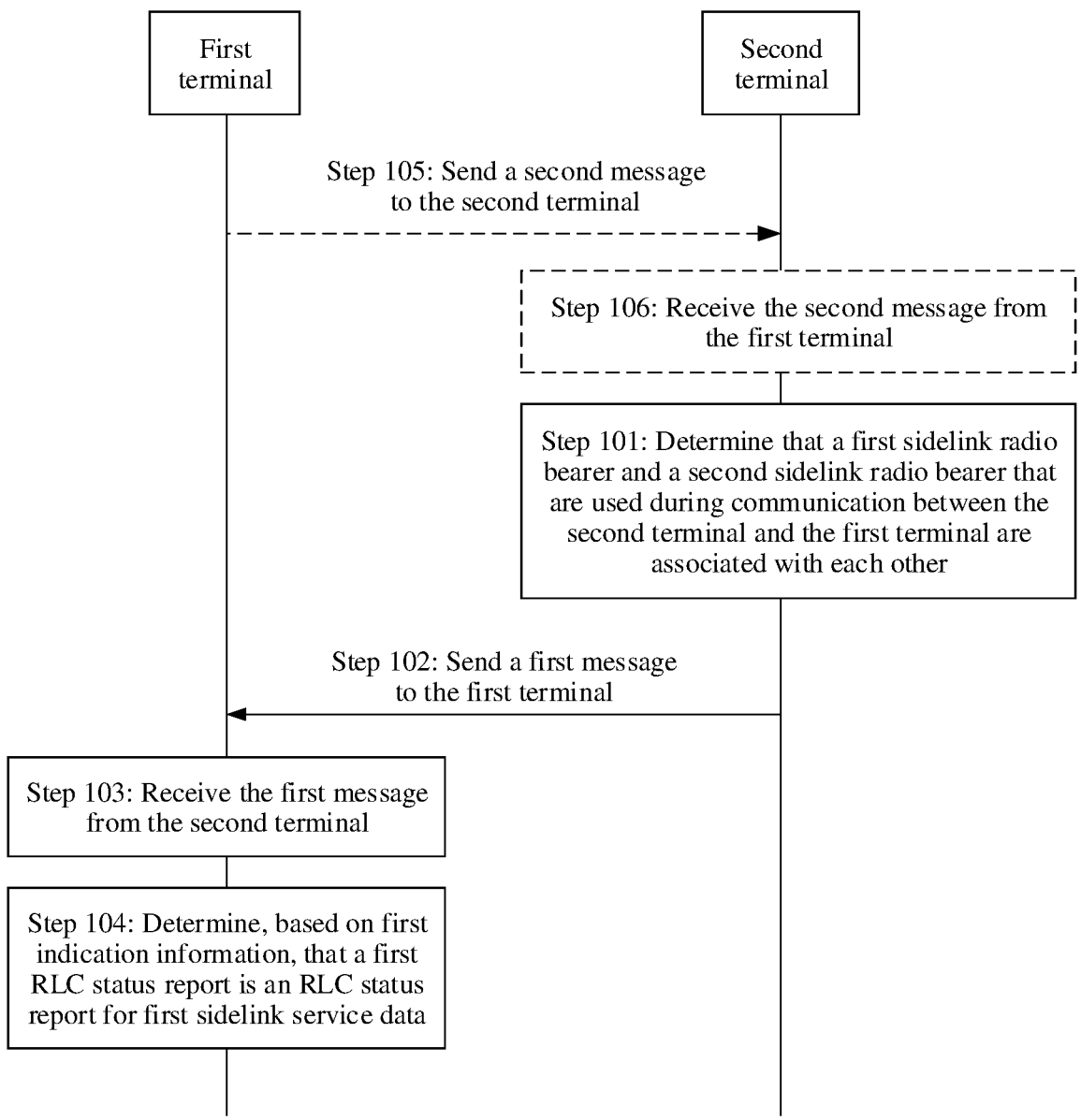
FIG. 7 is a schematic flowchart 2 of a radio bearer configuration method according to an embodiment of this application.

In an optional embodiment, as shown in FIG. 7, before step 101, the method provided in this embodiment of this application further includes the following steps.

Step 105: The first terminal sends a second message to the second terminal. The second message includes any one or more of the following information: an identifier of the first sidelink radio bearer, an identifier of the at least one first logical channel in the first sidelink radio bearer, or quality of service (QoS) information mapped to the first sidelink radio bearer.

For example, the second message may be a sidelink RRC reconfiguration message.

In this embodiment of this application, the QoS information may be a specific QoS parameter set, or may be an index of a QoS parameter set. A QoS parameter in the QoS parameter set includes but is not limited to a guaranteed transmission rate, a maximum transmission rate, a delay requirement, a reliability requirement, a priority, and a communication distance. The index of the QoS parameter set includes a 5G quality of service identifier (5G QoS identification, 5QI), a PC5 quality of service identifier (PC5 QoS identification, PQI), and a quality of service flow identifier (QoS Flow Identification, QFI).

It should be noted that in this embodiment of this application, QoS information mapped to a same sidelink radio bearer includes a group of QoS parameters. If QoS information mapped to one sidelink radio bearer includes a group of QoS parameters, when the first terminal sends, to the second terminal, the QoS information mapped to the first sidelink radio bearer, the first terminal needs to indicate that the QoS information mapped to the first sidelink radio bearer includes a group of QoS parameters. For example, the QoS information mapped to the first sidelink radio bearer includes at least a QFI 1, a QFI 2, and a QFI 3. When sending, to the second terminal, the QoS information mapped to the first sidelink radio bearer, the first terminal needs to indicate that the QFI 1, the QFI 2, and the QFI 3 belong to a same group, or that the three QFIs need to be mapped to a same first sidelink radio bearer. In addition, when subsequently requesting a network device to establish the second sidelink radio bearer, the second terminal also needs to indicate, to the network device, that the QFI 1, the QFI 2, and the QFI 3 belong to a same group, or that the three QFIs need to be mapped to a same first sidelink radio bearer.

It should be understood that the QFI 1, the QFI 2, and the QFI 3 may alternatively be a QoS parameter set 1, a QoS parameter set 2, and a QoS parameter set 3.

The identifier of the first sidelink radio bearer is used to determine the first sidelink radio bearer.

In an optional implementation, before step 105, the method provided in this embodiment of this application further includes: The first terminal and the second terminal establish the first sidelink radio bearer.

For example, a process of establishing the first sidelink radio bearer between the first terminal and the second terminal may be implemented in the following manner: The first terminal sends, to the second terminal, a request message used to configure the first sidelink radio bearer. The request message used to configure the first sidelink radio bearer includes at least one of the following information: the QoS information mapped to the first sidelink radio bearer and configuration information of the first sidelink radio bearer. The second terminal establishes and/or configures the first sidelink radio bearer based on the request message used to configure the first sidelink radio bearer.

The configuration information of the first sidelink radio bearer includes at least configuration information required when the second terminal side configures the first sidelink radio bearer.

The configuration information of the first sidelink radio bearer includes at least one of the following information: the identifier of the first sidelink radio bearer, a configuration of the first PDCP entity in the first sidelink radio bearer, a configuration of the at least one first RLC entity in the first sidelink radio bearer, the identifier of the at least one first logical channel in the first sidelink radio bearer, and the first indication information. The first indication information is used to indicate a radio link control RLC layer working mode of the first sidelink radio bearer. It should be understood that the RLC layer working mode of the first sidelink radio bearer may be an AM mode.

For example, the configuration of the first PDCP entity includes information used to configure the first PDCP entity. For example, the configuration of the first PDCP entity may include a sending-related parameter and a receiving-related parameter of the PDCP entity, or may include a receiving-related parameter of the PDCP entity. The configuration of the first RLC entity includes information used to configure the first RLC entity. For example, the configuration of the first RLC entity may include a sending-related parameter and a receiving-related parameter of the RLC entity, or may include only a receiving-related parameter of the RLC entity.

In this embodiment of this application, the QoS information mapped to the first sidelink radio bearer and the configuration information of the first sidelink radio bearer may be configured for the first terminal by a network device accessed by the first terminal. Certainly, the first terminal may alternatively obtain, from preconfiguration information of the first terminal, the QoS information mapped to the first sidelink radio bearer and the configuration information of the first sidelink radio bearer. This is not limited in this embodiment of this application. It should be understood that the identifier of the first sidelink radio bearer or the identifier of the at least one first logical channel may be autonomously allocated by the first terminal, or may be allocated by the network device accessed by the first terminal, or may be configured by using the preconfiguration information.

Step 106: The second terminal receives the second message from the first terminal.

It should be understood that after receiving the second message, the second terminal may configure the second sidelink radio bearer based on the second message.

How the second terminal configures the second sidelink radio bearer based on the second message is described in the following embodiments.

Example 1: The second terminal establishes the second sidelink radio bearer by interacting with the network device.

Figure 8:
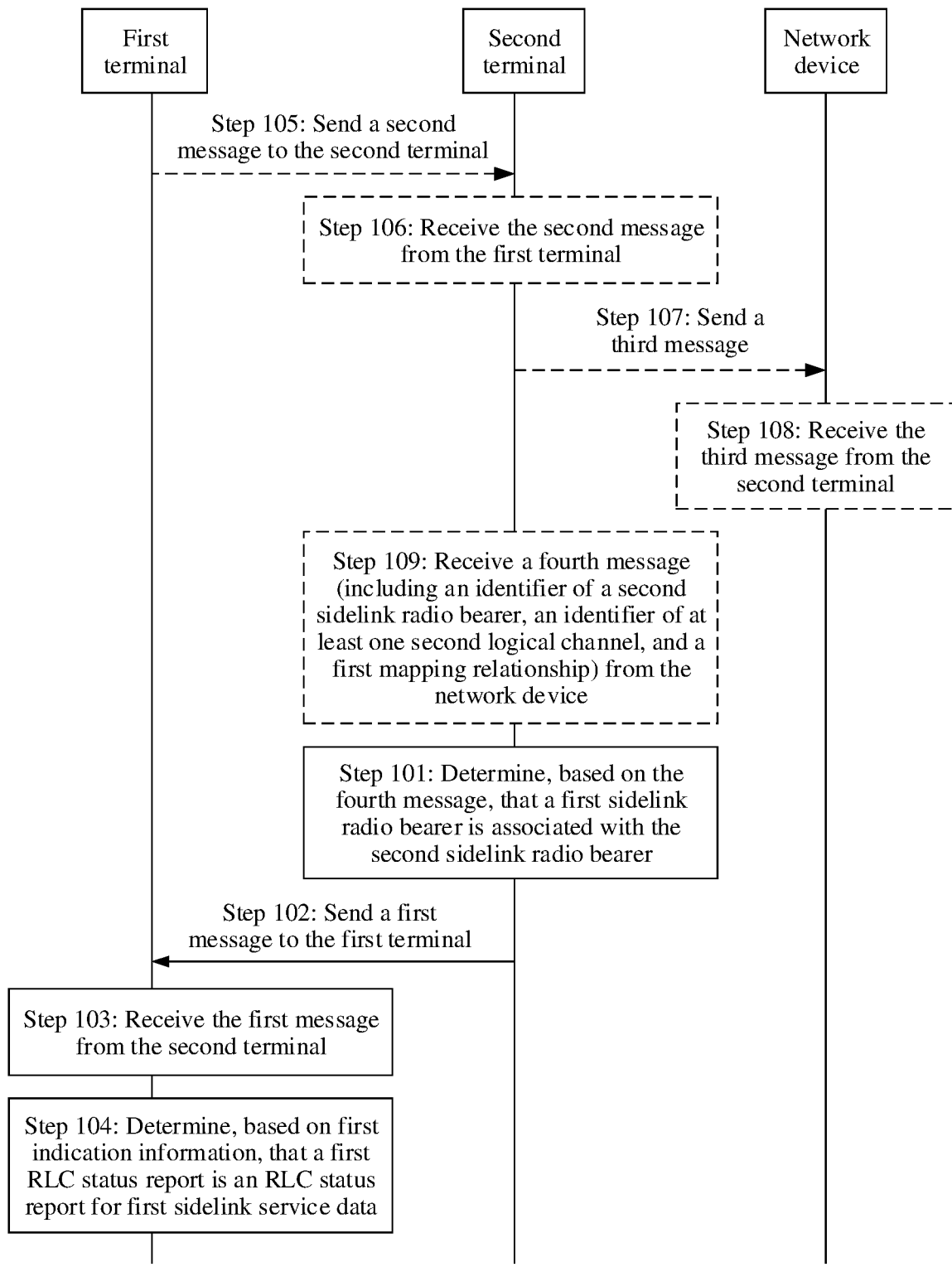
FIG. 8 is a schematic flowchart 3 of a radio bearer configuration method according to an embodiment of this application.

Still with reference to FIG. 7, as shown in FIG. 8, after step 106, the method provided in this embodiment of this application further includes the following steps.

Step 107: The second terminal sends a third message to the network device, where the third message is used to request the network device to configure the second sidelink radio bearer, and the third message includes at least the QoS information.

It should be understood that the network device in step 107 and step 108 is a network device accessed by the second terminal, and the network device accessed by the second terminal may be the same as or different from the network device accessed by the first terminal. This is not limited in this embodiment of this application.

For example, the second terminal may send the third message to the network device on a Uu link.

Step 108: The network device receives the third message from the second terminal. It should be understood that after step 108, the network device sends a fourth message to the second terminal.

Step 109: The second terminal receives the fourth message from the network device. The fourth message includes the QoS information and first configuration information that is of the second sidelink radio bearer and that is associated with the QoS information. The first configuration information is used to configure the second sidelink radio bearer.

For example, the first configuration information includes at least one of the following information: configuration information of the second PDCP entity in the second sidelink radio bearer, configuration information of the second RLC entity in the second sidelink radio bearer, and configuration information of the at least one second logical channel in the second sidelink radio bearer.

In a first optional implementation, the fourth message further includes at least one of the following information: an identifier of the second sidelink radio bearer, an identifier of the at least one second logical channel, and a first mapping relationship. The first mapping relationship includes a mapping relationship between the QoS information and the identifier of the second sidelink radio bearer, and/or a mapping relationship between the QoS information and the identifier of the at least one second logical channel.

Correspondingly, in a possible implementation, as shown in FIG. 8, step 101 provided in this embodiment of this application may be specifically implemented in the following manner: The second terminal determines, based on the fourth message, that the first sidelink radio bearer is associated with the second sidelink radio bearer.

It should be understood that if the second terminal requests the network device to establish a second sidelink radio bearer, the fourth message carries the identifier of the second sidelink radio bearer and/or the identifier of the at least one second logical channel. In this case, the second terminal may determine that the first sidelink radio bearer is associated with the second sidelink radio bearer. If the fourth message includes the first mapping relationship, the second terminal determines, based on the first mapping relationship, that the first sidelink radio bearer is associated with the second sidelink radio bearer.

It may be understood that because the first mapping relationship includes the mapping relationship between the QoS information and the identifier of the second sidelink radio bearer, and/or the mapping relationship between the QoS information and the identifier of the at least one second logical channel, it indicates that the identifier of the at least one second logical channel or the second sidelink radio bearer has same QoS information as the first sidelink radio bearer. In this case, the second terminal may determine that the first sidelink radio bearer is associated with the second sidelink radio bearer.

Figure 9:
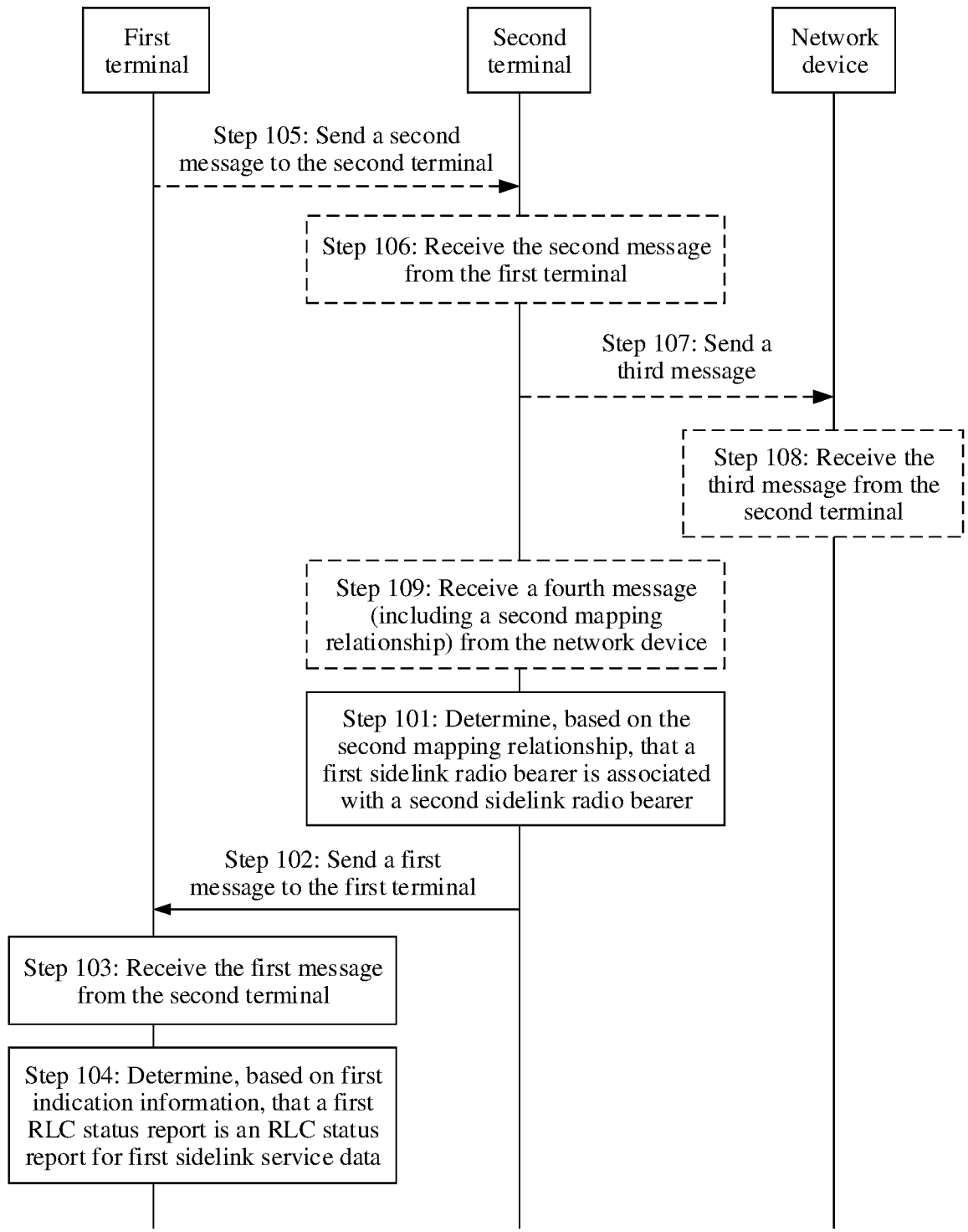
FIG. 9 is a schematic flowchart 4 of a radio bearer configuration method according to an embodiment of this application.

In a second possible implementation, if the third message further includes the identifier of the first sidelink radio bearer and/or the identifier of the at least one first logical channel, the fourth message further includes a second mapping relationship. The second mapping relationship includes a mapping relationship between information about the first sidelink radio bearer and information about the second sidelink radio bearer. As shown in FIG. 9, step 101 in this embodiment of this application may be specifically implemented in the following manner: The second terminal determines, based on the second mapping relationship, that the first sidelink radio bearer is associated with the second sidelink radio bearer. The information about the first sidelink radio bearer includes the identifier of the first sidelink radio bearer and/or the identifier of the at least one first logical channel in the first sidelink radio bearer. The information about the second sidelink radio bearer includes the identifier of the at least one second logical channel in the second sidelink radio bearer and/or the identifier of the second sidelink radio bearer.

It may be understood that the second mapping relationship includes any one or more of the following information: a mapping relationship between the identifier of the first sidelink radio bearer and the identifier of the second sidelink radio bearer, a mapping relationship between the identifier of the first sidelink radio bearer and the identifier of the at least one second logical channel in the second sidelink radio bearer, a mapping relationship between the identifier of the second sidelink radio bearer and the identifier of the at least one second logical channel in the first sidelink radio bearer, and a mapping relationship between the identifier of the at least one second logical channel and the identifier of the at least one second logical channel.

Example 2: The second terminal establishes the second sidelink radio bearer by using the preconfiguration information.

Figure 10:
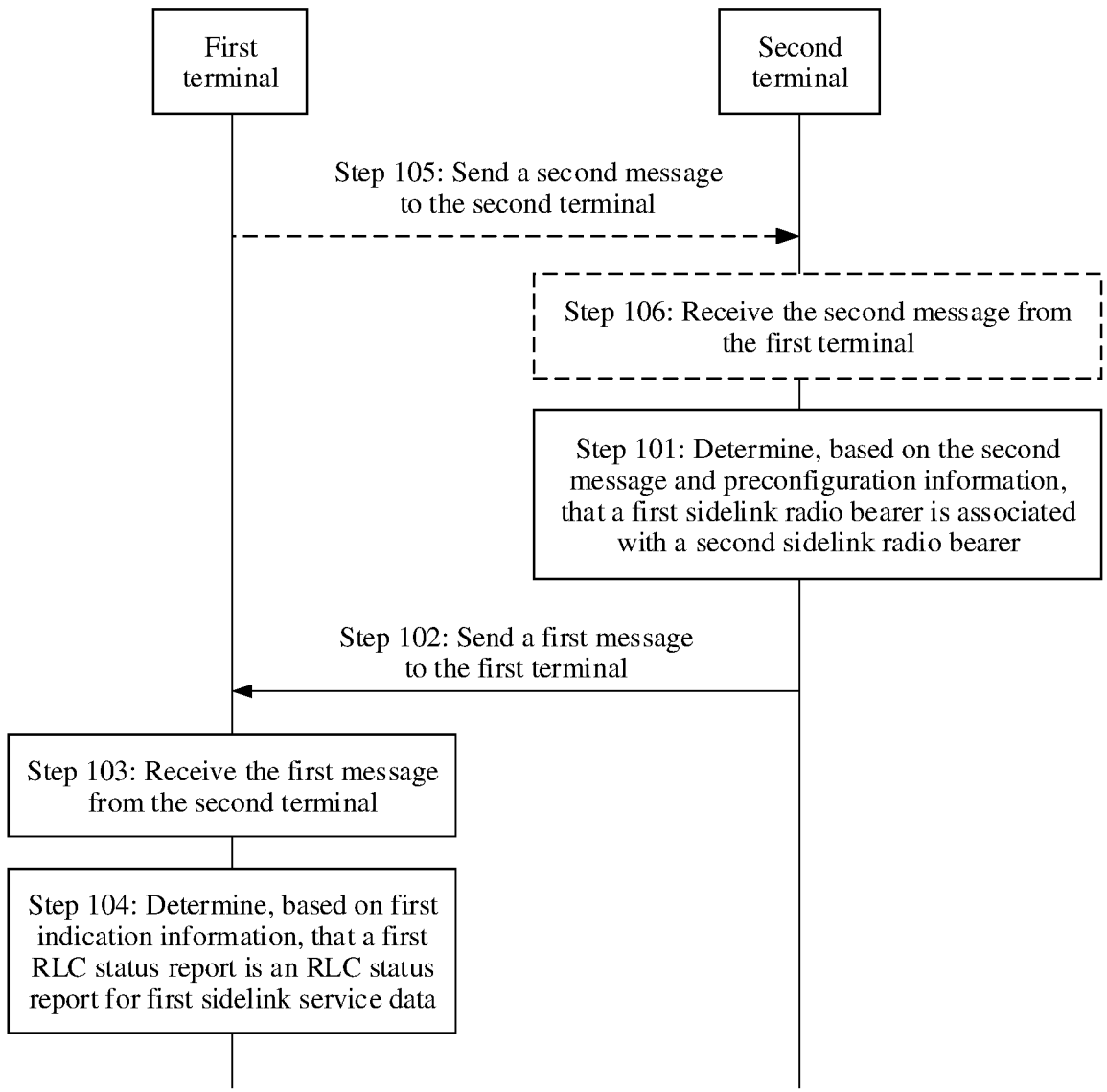
FIG. 10 is a schematic flowchart 5 of a radio bearer configuration method according to an embodiment of this application.

Still with reference to FIG. 7, as shown in FIG. 10, step 101 provided in this embodiment of this application may be specifically implemented in the following manner: The second terminal determines, based on the second message and the preconfiguration information, that the first sidelink radio bearer is associated with the second sidelink radio bearer. The preconfiguration information includes at least the QoS information and second configuration information that is of the second sidelink radio bearer and that is associated with the QoS information. The second configuration information is used to configure the second sidelink radio bearer. It should be understood that the preconfiguration information herein is preconfiguration information in the second terminal.

For example, the second configuration information includes at least one of the following information: configuration information of the second PDCP entity in the second sidelink radio bearer, configuration information of the second RLC entity in the second sidelink radio bearer, and configuration information of the at least one second logical channel in the second sidelink radio bearer. In this embodiment of this application, information elements in the second configuration information and the first configuration information are completely the same. However, values of the same elements in the second configuration information and the first configuration information may be the same or different. For example, a value of a timer in the configuration about the second PDCP entity in the first configuration information is different from a value of a timer in the configuration about the second PDCP entity in the second configuration information.

For example, the configuration information of the PDCP entity may include one or more of the following information: a length of a PDCP sequence number (SN), a length of a discard timer, a header compression algorithm, a length of a reordering timer, indication information indicating whether integrity protection is performed on the sidelink radio bearer, indication information indicating whether the radio bearer is encrypted, and indication information indicating whether the sidelink radio bearer allows out-of-order delivery. The configuration information of the RLC bearer may include one or more of the following information: indication information indicating whether the configuration of the RLC entity is an RLCAM or an RLCUM, a length of an RLCSN, and a length of a reassembly timer. If the configuration of the RLC entity is the RLCAM, a length of a status report prohibit timer, a length of a polling retransmission timer, a quantity of polling protocol data units (PDU), a quantity of polling bytes, and a maximum quantity of retransmissions are further included. The configuration information of the logical channel may include one or more of the following information: a priority of the logical channel, a prioritized bit rate (PBR) of the logical channel, a token bucket size (bucket Size Duration) of the logical channel, and a logical channel group to which the logical channel belongs.

In a possible implementation, the preconfiguration information further includes at least one of the following information: the identifier of the second sidelink radio bearer, the identifier of the at least one second logical channel, and a third mapping relationship. The third mapping relationship includes the mapping relationship between the QoS information and the identifier of the second sidelink radio bearer, and/or the mapping relationship between the QoS information and the identifier of the at least one second logical channel. In this embodiment of this application, that the second terminal determines, based on the second message and the preconfiguration information, that the first sidelink radio bearer is associated with the second sidelink radio bearer includes: The second terminal determines, based on the third mapping relationship, that the first sidelink radio bearer is associated with the second sidelink radio bearer.

In another possible implementation, the preconfiguration information further includes at least one of the following information: a fourth mapping relationship. The fourth mapping relationship includes the mapping relationship between the information about the first sidelink radio bearer and the information about the second sidelink radio bearer. That the second terminal determines, based on the second message and the preconfiguration information, that the first sidelink radio bearer is associated with the second sidelink radio bearer includes: The second terminal determines, based on the fourth mapping relationship, that the first sidelink radio bearer is associated with the second sidelink radio bearer.

For example, in this embodiment of this application, that the first indication information is used to indicate that the first sidelink radio bearer is associated with the second sidelink radio bearer specifically includes: there is the mapping relationship between the information about the first sidelink radio bearer and the information about the second sidelink radio bearer.

It should be noted that in this embodiment of this application, that the first sidelink radio bearer is associated with the second sidelink radio bearer means that the identifier of the first sidelink radio bearer is the same as the identifier of the second sidelink radio bearer. Alternatively, third configuration information of the second sidelink radio bearer may further carry the identifier of the first sidelink radio bearer or the identifier of the at least one first logical channel. In this way, the first terminal and the second terminal can determine that the first sidelink radio bearer is associated with the second sidelink radio bearer. The third configuration information of the second sidelink radio bearer is sent by the second terminal to the first terminal by using the first message. The third configuration information of the second sidelink radio bearer includes at least one of the following information: configuration information of the second PDCP entity in the second sidelink radio bearer and configuration information of the second RLC entity in the second sidelink radio bearer. The configuration information of the second PDCP entity that is included in the third configuration information may include only configuration information of a receive parameter of the PDCP entity, and the configuration information of the second RLC entity that is included in the third configuration information may include only configuration information of a receive parameter of the RLC entity.

It should be understood that the foregoing example describes that the network device accessed by the second terminal allocates the identifier of the second sidelink radio bearer and/or the identifier of the at least one second logical channel to the second terminal. Certainly, in this embodiment of this application, the identifier of the second sidelink radio bearer and/or the identifier of the at least one second logical channel may alternatively be autonomously allocated by the second terminal. In other words, the second terminal autonomously determines the identifier of the second sidelink radio bearer and/or the identifier of the at least one second logical channel.

It should be noted that in the embodiment in which the second terminal autonomously determines the identifier of the second sidelink radio bearer and/or the identifier of the at least one second logical channel, the fourth message or the preconfiguration information of the second terminal may not carry the identifier of the second sidelink radio bearer and the identifier of the at least one second logical channel. In addition, if the fourth message carries only the identifier of the second sidelink radio bearer, the second terminal may autonomously determine the identifier of the at least one second logical channel. If the fourth message carries only the identifier of the at least one second logical channel, the second terminal may autonomously determine the identifier of the second sidelink radio bearer.

In a possible implementation, that the first indication information is used to indicate that the first sidelink radio bearer is associated with the second sidelink radio bearer specifically includes: the first indication information includes the identifier of the second sidelink radio bearer and/or the identifier of the at least one second logical channel. The first terminal may determine, based on a fact that the identifier of the second sidelink radio bearer is the same as the identifier of the first sidelink radio bearer, that the second sidelink radio bearer is associated with the first sidelink radio bearer. Alternatively, the first terminal may determine, based on a fact that the identifier of the second logical channel in the second sidelink radio bearer is the same as the identifier of the first logical channel in the first sidelink radio bearer, that the second sidelink radio bearer is associated with the first sidelink radio bearer.

It should be understood that in the foregoing example, when the first terminal requests the second terminal to configure the second sidelink radio bearer, the first terminal and the second terminal have established the first sidelink radio bearer. In another example, the first terminal and the second terminal have established two sidelink radio bearers, namely, a sidelink radio bearer 1 and a sidelink radio bearer 2. If the first terminal needs to transmit new sidelink service data to the second terminal, the first terminal may first request the network device to send configuration information used to establish the first sidelink radio bearer, so that the first terminal first establishes the first sidelink radio bearer with the second terminal, and after establishing the first sidelink radio bearer, the first terminal can request the second terminal to re-establish the second sidelink radio bearer. In this case, if the first configuration information of the second sidelink radio bearer is sent by the network device of the second terminal, the network device may allocate same identification information to the second sidelink radio bearer and the first sidelink radio bearer, or the network device may allocate a same identifier to the at least one first logical channel and the at least one second logical channel.

In a possible implementation, when the identifier of the second sidelink radio bearer is the same as the identifier of the first sidelink radio bearer, and/or the identifier of the at least one second logical channel is the same as the identifier of the at least one first logical channel, step 101 may be specifically implemented in the following manner: The second terminal determines that the first sidelink radio bearer is associated with the second sidelink radio bearer. The third message further includes the identifier of the second sidelink radio bearer and/or the identifier of the at least one second logical channel in the second sidelink radio bearer.

In another possible implementation, the identifier of the second sidelink radio bearer is the same as the identifier of the first sidelink radio bearer, and/or the identifier of the at least one second logical channel is the same as the identifier of the at least one first logical channel. The preconfiguration information further includes at least one of the following information: the identifier of the second sidelink radio bearer, the identifier of the at least one second logical channel, and a fifth mapping relationship. The fifth mapping relationship includes the mapping relationship between the QoS information and the identifier of the second sidelink radio bearer, and/or the mapping relationship between the QoS information and the identifier of the at least one second logical channel. Correspondingly, step 101 may be implemented in the following manner: The second terminal determines, based on the fifth mapping relationship, that the first sidelink radio bearer is associated with the second sidelink radio bearer.

Figure 11A:
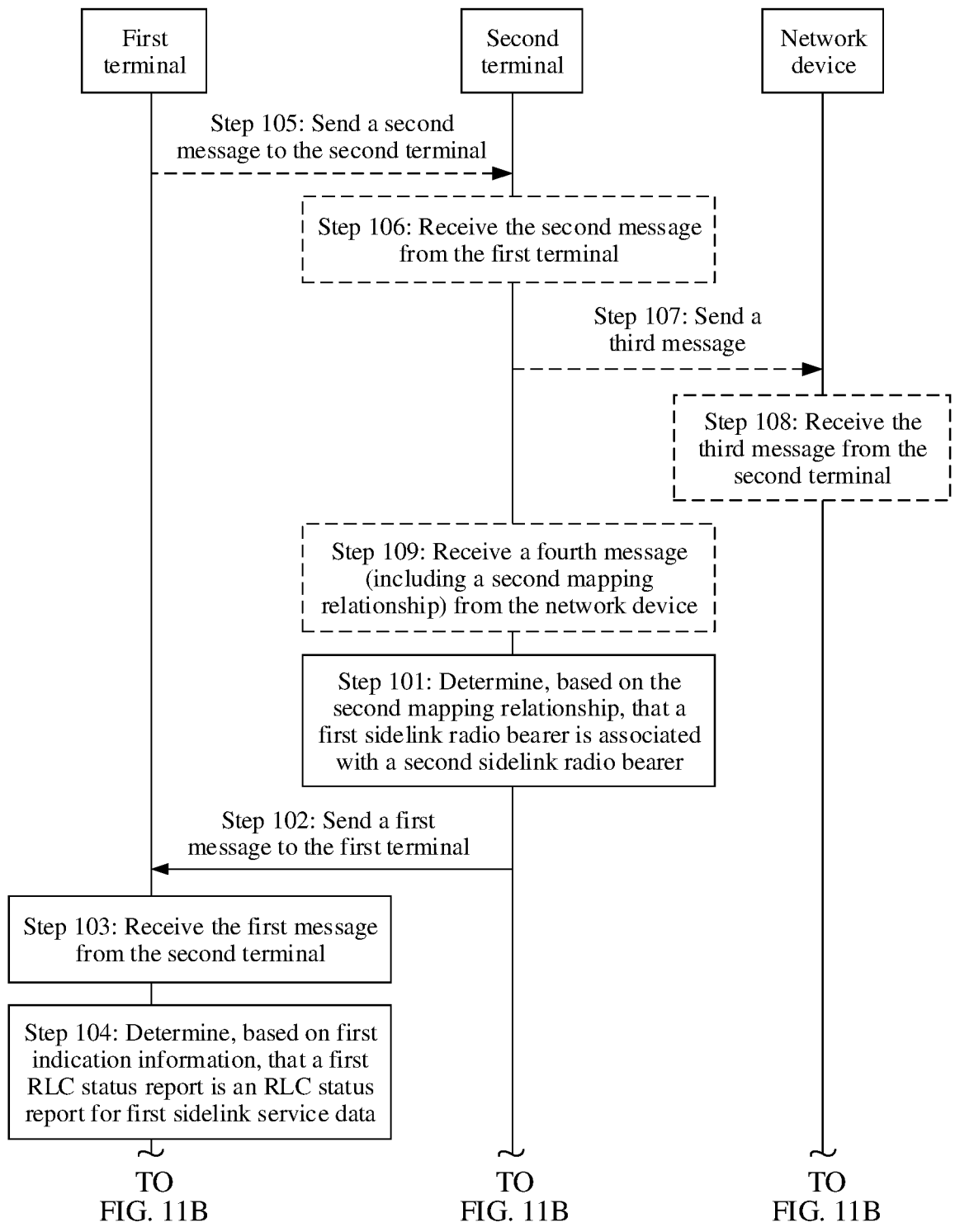

In a possible embodiment, with reference to FIG. 8 or FIG. 9, as shown in FIG. 11A and FIG. 11B, the method provided in this embodiment of this application further includes the following steps.

Step 110: The second terminal sends, to the network device, at least one of the following information: source address information of the second sidelink radio bearer, destination address information of the second sidelink radio bearer, and indication information indicating that an RLC layer working mode of the second sidelink radio bearer is an AM mode.

The source address information of the second sidelink radio bearer is used to determine a sender that sends the first RLC status report or the second sidelink service data over the second sidelink radio bearer. The destination address information of the second sidelink radio bearer is used to determine a receiver that receives the first RLC status report or the second sidelink service data.

Step 111: The network device receives, from the second terminal, the at least one of the following information: the source address information of the second sidelink radio bearer, the destination address information of the second sidelink radio bearer, and the indication information indicating that the RLC layer working mode of the second sidelink radio bearer is the AM mode.

It should be understood that the information sent by the second terminal to the network device in step 110 may be carried in the third message. Certainly, the information sent by the second terminal to the network device in step 110 may alternatively be carried in a message other than the third message and separately sent to the network device.

It should be understood that the network device may determine, by performing step 110 and step 111, which terminal is the receiver and which terminal is the sender over the second sidelink radio bearer that the second terminal requests to establish. For example, in this embodiment of this application, the source address information of the second sidelink radio bearer may be a layer 2 identifier (Source Layer 2 ID) of the second terminal or an index of a layer 2 identifier of the second terminal. The destination address information of the first sidelink radio bearer may be a layer 2 identifier of the first terminal or an index of a layer 2 identifier of the first terminal.

Step 112: The second terminal receives, from the network device, at least one of the following information: the source address information of the second sidelink radio bearer and the destination address information of the second sidelink radio bearer.

In another possible embodiment, still with reference to FIG. 11A and FIG. 11B, the method provided in this embodiment of this application further includes the following step:

Step 113: The second terminal sends, to the first terminal, at least one of the following information: the source address information of the second sidelink radio bearer, the destination address information of the second sidelink radio bearer, and the third configuration information of the second sidelink radio bearer, where the third configuration information belongs to the first configuration information or the second configuration information.

It should be understood that the information sent by the second terminal to the first terminal in step 113 may be carried in the first message, or certainly may be sent to the first terminal by using a separate message.

It should be understood that the third configuration information may be the first configuration information or the second configuration information. The first configuration information or the second configuration information not only includes configuration information required when the second terminal configures the second sidelink radio bearer, but also includes the configuration information required when the first terminal configures the second sidelink radio bearer. Therefore, the third configuration information may alternatively be the configuration information required when the first terminal configures the second sidelink radio bearer.

Figure 12:
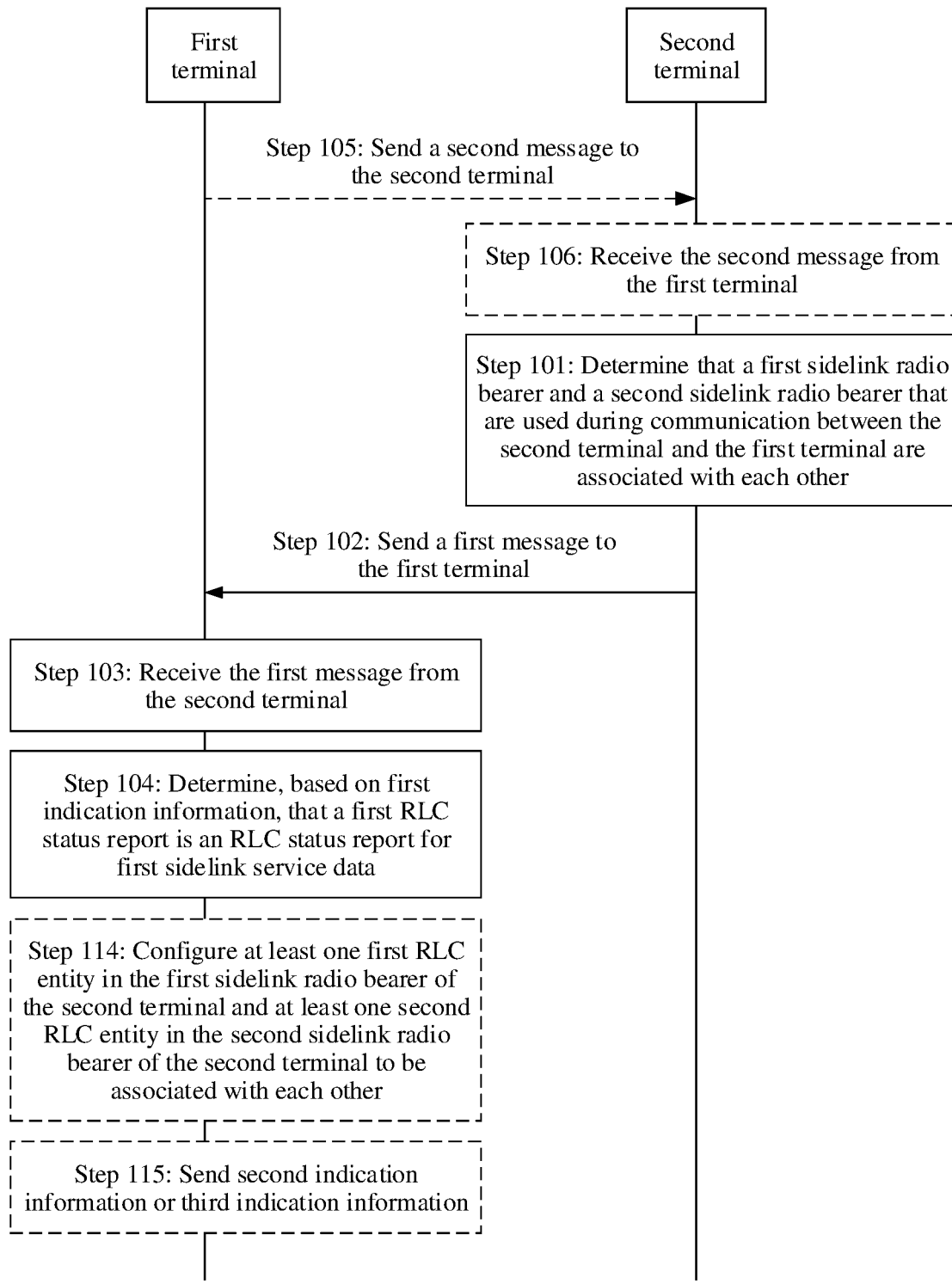
FIG. 12 is a schematic flowchart 7 of a radio bearer configuration method according to an embodiment of this application.

In still another optional embodiment, with reference to FIG. 6, as shown in FIG. 12, the method provided in this embodiment of this application further includes the following step:

Step 114: The second terminal configures the at least one first RLC entity in the first sidelink radio bearer of the second terminal and the at least one second RLC entity in the second sidelink radio bearer of the second terminal to be associated with each other.

Correspondingly, in yet another optional embodiment, as shown in FIG. 12, the method provided in this embodiment of this application may further include the following step:

Step 115: The at least one first RLC entity in the first sidelink radio bearer sends the first RLC status report and second indication information to the at least one second RLC entity in the second sidelink radio bearer. Alternatively, the at least one first RLC entity in the first sidelink radio bearer sends the second RLC status report and third indication information to the at least one second RLC entity in the second sidelink radio bearer.

The second indication information is used to indicate that the first RLC status report is an RLC status report for the first sidelink service data received by the second terminal. The third indication information is used to indicate that the second RLC status report is an RLC status report that is for the second sidelink service data and that is sent by the first terminal.

It should be understood that after the first terminal determines that the first sidelink radio bearer is associated with the second sidelink radio bearer, the first terminal may send the first sidelink service data to the second terminal by using the first sidelink radio bearer, and receive, by using the second sidelink radio bearer, the first RLC status report that is for the first sidelink service data and that is sent by the second terminal. Alternatively, the second terminal may send the second sidelink service data to the first terminal by using the second sidelink radio bearer, and receive, by using the first sidelink radio bearer, the second RLC status report that is for the second sidelink service data and that is sent by the first terminal over the second sidelink radio bearer.

Figure 13:
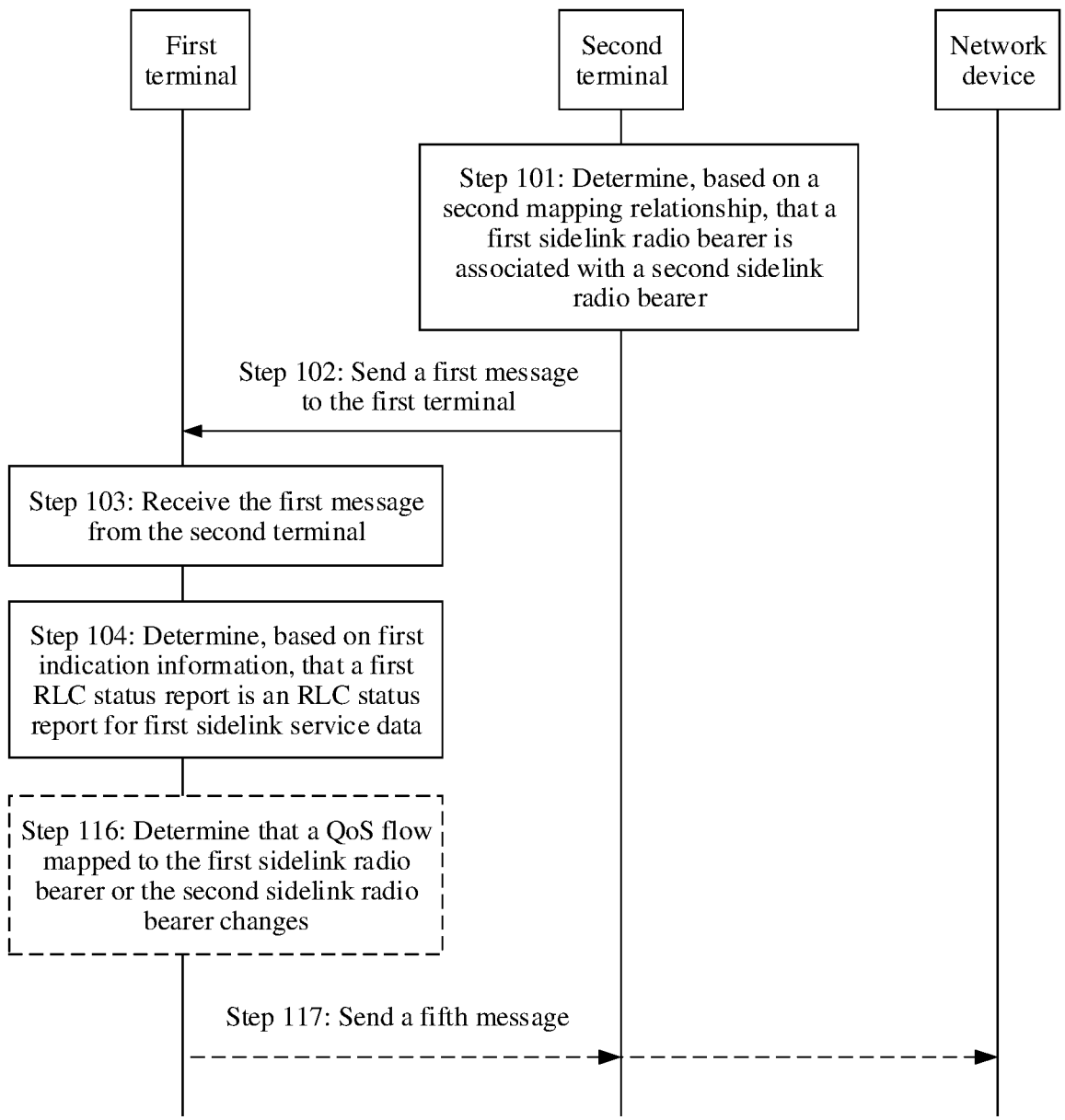
FIG. 13 is a schematic flowchart 8 of a radio bearer configuration method according to an embodiment of this application.

With reference to FIG. 6, as shown in FIG. 13, in an optional embodiment, the method provided in this embodiment of this application further includes the following steps.

Step 116: The second terminal determines that a QoS flow mapped to the first sidelink radio bearer or the second sidelink radio bearer changes.

In this embodiment of this application, that a QoS flow mapped to the first sidelink radio bearer or the second sidelink radio bearer changes means that a quantity of QoS flows mapped to the first sidelink radio bearer or the second sidelink radio bearer increases or decreases. A mapping relationship between a QoS flow and a sidelink radio bearer may be configured by the network device, or may be configured in the preconfiguration information. When a new service of a QoS flow arrives, a quantity of QoS flows mapped to the sidelink radio bearer correspondingly increases. When a service of a QoS flow ends, a quantity of QoS flows mapped to the sidelink radio bearer correspondingly decreases.

In an example, step 116 in this embodiment of this application may be implemented in the following manner: The first terminal sends a sixth message to the second terminal, where the sixth message is used to indicate that the QoS flow mapped to the first sidelink radio bearer changes. The second terminal receives the sixth message from the first terminal. In this way, the second terminal may determine, by using the sixth message, that the QoS flow over the first sidelink radio bearer changes. Because the first sidelink radio bearer is associated with the second sidelink radio bearer, the second terminal may determine that the QoS flow over the second sidelink radio bearer changes.

In another example, step 116 in this embodiment of this application may be implemented in the following manner: The second terminal autonomously increases or decreases a quantity of QoS flows mapped to the second sidelink radio bearer.

Step 117: The second terminal sends a fifth message to the first terminal or the network device, where the fifth message is used to indicate a change of the QoS flow mapped to the first sidelink radio bearer or the second sidelink radio bearer.

It should be understood that in step 117, the first terminal or the network device may increase or decrease, in a timely manner, a quantity of QoS flows mapped to the first sidelink radio bearer or the second sidelink radio bearer.

It should be understood that if the fifth message indicates the first terminal or the network device to increase the quantity of QoS flows mapped to the first sidelink radio bearer or the second sidelink radio bearer, the first terminal or the network device increases the quantity of QoS flows mapped to the first sidelink radio bearer or the second sidelink radio bearer. If the fifth message indicates the first terminal or the network device to decrease the quantity of QoS flows mapped to the first sidelink radio bearer or the second sidelink radio bearer, the first terminal or the network device decreases the quantity of QoS flows mapped to the first sidelink radio bearer or the second sidelink radio bearer.

It should be noted that in this embodiment of this application, a QoS flow that is currently mapped to the sidelink radio bearer is used as a reference for increasing the quantity of QoS flows over the sidelink radio bearer and decreasing the quantity of QoS flows over the sidelink radio bearer.

Embodiment 2

Figure 14:
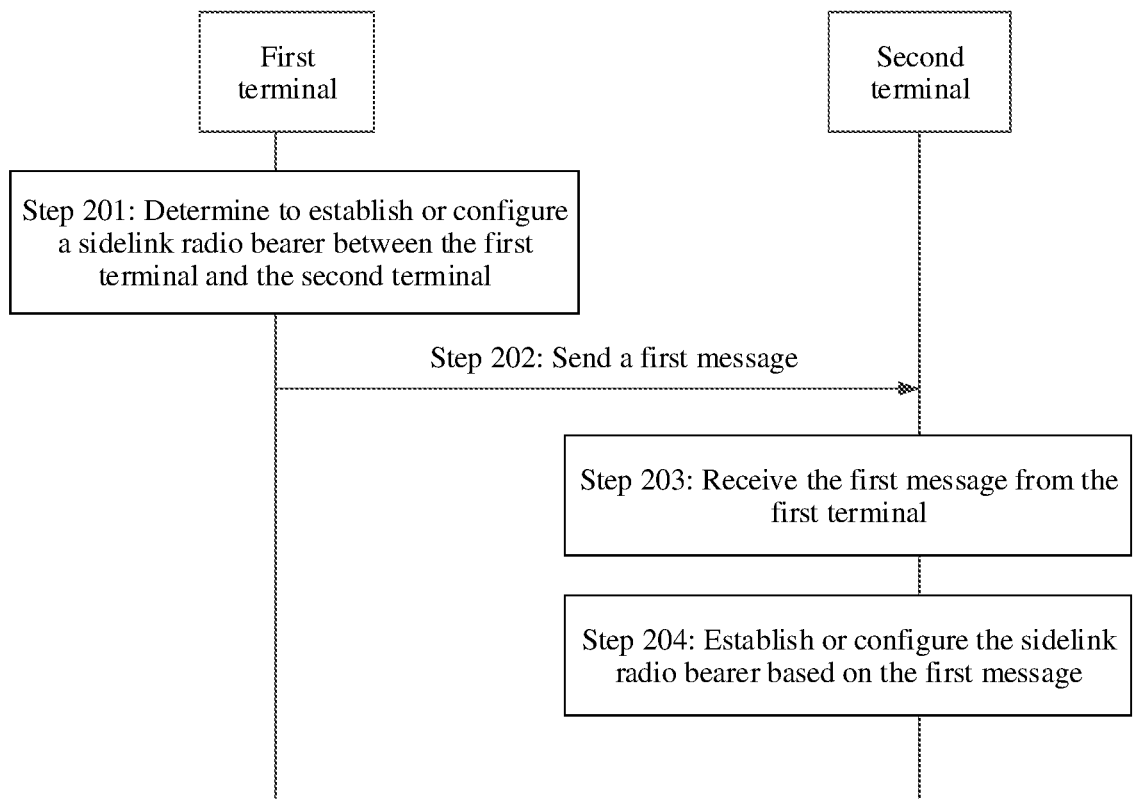
FIG. 14 is a schematic flowchart 9 of a radio bearer configuration method according to an embodiment of this application.

As shown in FIG. 14, an embodiment of this application provides a radio bearer configuration method, including the following steps.

Step 201: A first terminal determines to establish or configure a sidelink radio bearer between the first terminal and a second terminal.

Step 202: The first terminal sends a first message to the second terminal. The first message includes at least one of the following information: quality of service QoS information mapped to the sidelink radio bearer between the second terminal and the first terminal, and first configuration information of the sidelink radio bearer. The first configuration information includes at least one of the following information: first indication information and a bearer type indication. The first indication information is used to indicate a radio link control RLC layer working mode of the sidelink radio bearer, and the bearer type indication is used to indicate that the sidelink radio bearer is a bidirectional bearer.

It should be understood that if the sidelink radio bearer is established between the first terminal and the second terminal, the first terminal needs to configure a sidelink radio bearer of the first terminal side, and the second terminal needs to configure a sidelink radio bearer of the second terminal side. Therefore, when the first terminal sends the first message, the first terminal has completed configuration of the sidelink radio bearer by the first terminal, or when the first terminal sends the first message, the first terminal is configuring the sidelink radio bearer.

For example, the first message may be a sidelink RRC reconfiguration message.

For example, the first configuration information may further include an identifier of the sidelink radio bearer, configuration information of a PDCP entity in the sidelink radio bearer, configuration information of at least one RLC entity or at least two RLC entities in the sidelink radio bearer, and an identifier of a logical channel in the sidelink radio bearer.

Step 203: The second terminal receives the first message from the first terminal.

Step 204: The second terminal establishes or configures the sidelink radio bearer based on the first message.

It should be understood that because the sidelink radio bearer is established between the first terminal and the second terminal, that is, two ends of the sidelink radio bearer are respectively configured by the first terminal and the second terminal, the first terminal configures a part that is of the sidelink radio bearer and that is configured by the first terminal, and the second terminal establishes or configures, based on the first message, a part that is of the sidelink radio bearer and that is configured by the second terminal. The sidelink radio bearer is the bidirectional bearer.

According to the radio bearer configuration method provided in this embodiment of this application, in the method, the first terminal sends the first message to the second terminal, so that the second terminal can establish, based on the first message, a sidelink radio bearer that meets a QoS requirement, to ensure that sidelink service data transmitted over the sidelink radio bearer can meet the QoS requirement, so as to reliably transmit the sidelink service data. In addition, if the sidelink radio bearer is a bidirectional bearer, the second terminal may determine that the sidelink service bearer may be used to send the sidelink service data to the first terminal, and the sidelink service bearer may be further used to receive an RLC status report for the sidelink service data from the first terminal. Alternatively, the second terminal may determine that the sidelink service bearer may be used to receive the sidelink service data from the first terminal, and the sidelink service bearer may be further used to send an RLC status report for the sidelink service data to the first terminal.

Example 1: One RLC entity or two RLC entities included in the sidelink radio bearer are associated with one logical channel.

It may be understood that when the RLC layer working mode of the sidelink radio bearer is an AM, the sidelink radio bearer includes one RLC entity. When the RLC layer working mode of the sidelink radio bearer is a UM, the sidelink radio bearer includes two RLC entities.

If a packet duplication function is configured for the sidelink radio bearer, the sidelink radio bearer includes two RLC entities (if the RLC layer working mode of the sidelink radio bearer is the AM), and each RLC entity is associated with one logical channel, or the sidelink radio bearer includes four RLC entities (if the RLC layer working mode of the sidelink radio bearer is the UM), and one RLC entity used for sending and one RLC entity used for receiving are associated with one logical channel. A quantity of RLC entities included in the sidelink radio bearer may vary with different RLC layer working modes. Details are described below based on different cases.

Case 1: When the RLC layer working mode is an AM, the sidelink radio bearer includes at least one RLC entity, and the at least one RLC entity is associated with one logical channel.

The at least one RLC entity may be configured to send sidelink service data, and may also be configured to receive an RLC status report for the sidelink service data. Alternatively, the at least one RLC entity may be configured to receive sidelink service data, and may also be configured to send an RLC status report for the sidelink service data. The logical channel associated with the at least one RLC entity may be configured to send sidelink service data, and may also be configured to receive an RLC status report for the sidelink service data. Alternatively, the logical channel associated with the at least one RLC entity may be configured to receive sidelink service data, and may also be configured to send an RLC status report for the sidelink service data.

It should be understood that the at least one RLC entity includes an RLC entity that sends original sidelink service data and an RLC entity that sends duplicated sidelink service data. Certainly, the at least one RLC entity may include only an RLC entity that sends original sidelink service data. For example, the at least one RLC entity includes an RLC entity 1 and an RLC entity 2. The RLC entity 1 is configured to send the original sidelink service data, and the RLC entity 2 is configured to send the duplicated sidelink service data.

Case 2: When the RLC layer working mode is an unacknowledged mode (Unacknowledged Mode, UM), the sidelink radio bearer includes at least two RLC entities, and the at least two RLC entities are associated with one logical channel.

It should be understood that the UM means that the receiver may not feed back an RLC status report to the sender.

If the sidelink radio bearer includes at least two RLC entities, at least one of the at least two RLC entities is configured to send sidelink service data, and at least one of the at least two RLC entities is configured to receive the sidelink service data. The sidelink service data may be duplicated regardless of sending the sidelink service data or receiving the sidelink service data. Therefore, the at least two RLC entities further include an RLC entity configured to send the duplicated sidelink service data. Similarly, the at least two RLC entities further include an RLC entity configured to receive the duplicated sidelink service data. One logical channel associated with the at least two RLC entities is configured to send the sidelink service data, and may also be configured to receive the sidelink service data.

For example, the at least two RLC entities include an RLC entity 11, an RLC entity 12, an RLC entity 13, and an RLC entity 14. The RLC entity 11 is configured to send sidelink service data A, and the RLC entity 12 is configured to send duplicated sidelink service data A. The RLC entity 13 is configured to receive sidelink service data B, and the RLC entity 14 is configured to receive duplicated sidelink service data B. In this embodiment of this application, the original sidelink service data is the same as the duplicated sidelink service data.

In this embodiment of this application, the identifier of the sidelink radio bearer and/or the identifier of the logical channel in the sidelink radio bearer are/is unique in a connection between the second terminal and the first terminal. The connection between the second terminal and the first terminal is identified by using a first identifier. For example, the first identifier is a combination of a layer 2 identifier of the first terminal and a layer 2 identifier of the second terminal. In still another example, the first identifier may alternatively be a specially defined ID used to identify a unicast connection between the first terminal and the second terminal.

Figure 15:
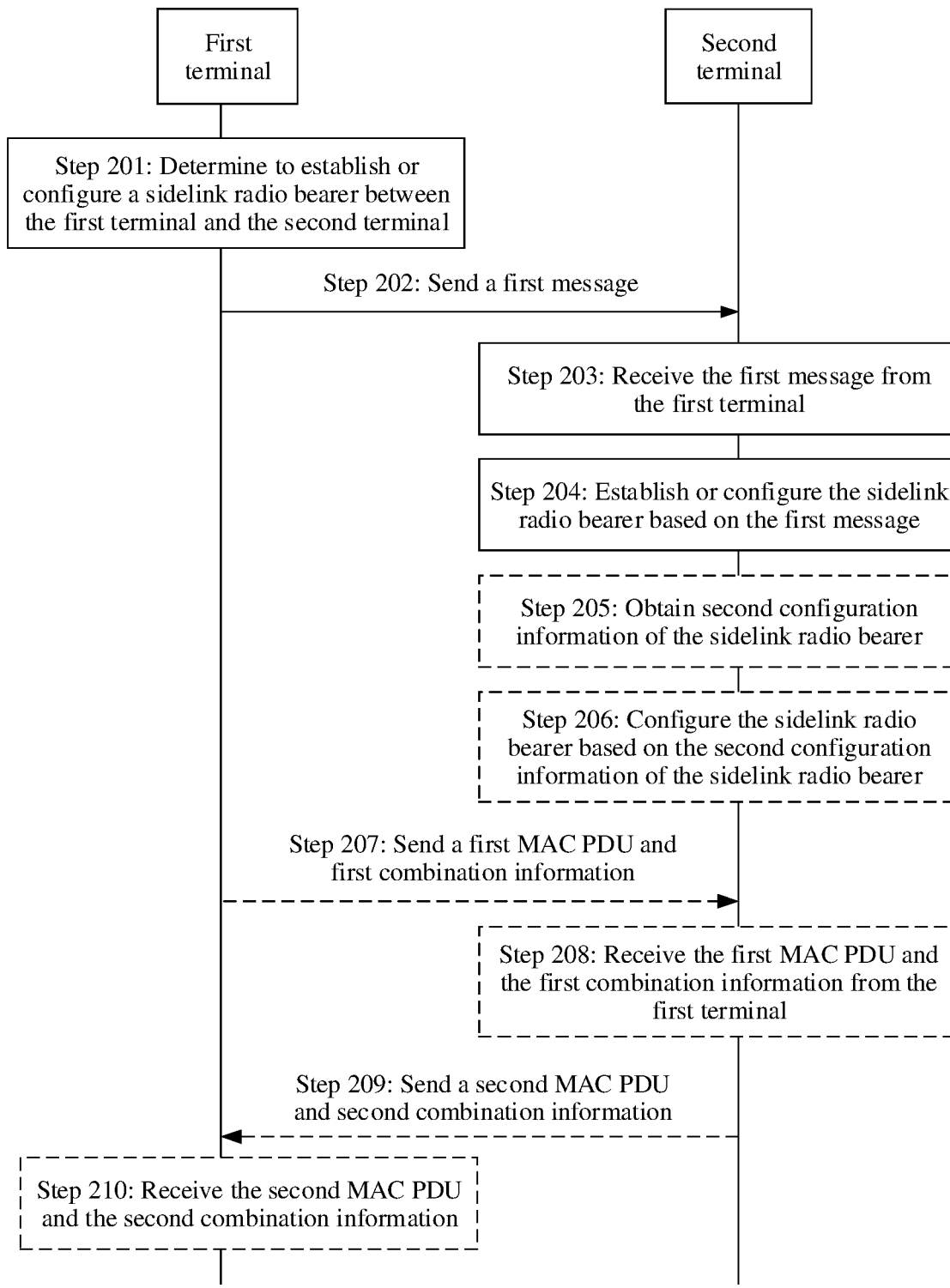
FIG. 15 is a schematic flowchart 10 of a radio bearer configuration method according to an embodiment of this application.

As shown in FIG. 15, in a possible embodiment, the method provided in this embodiment of this application further includes the following steps.

Step 205: The second terminal obtains second configuration information of the sidelink radio bearer.

For example, step 205 in this embodiment of this application may be specifically implemented in the following manner: The second terminal obtains the second configuration information from a network device accessed by the second terminal, or the second terminal may obtain the second configuration information from preconfiguration information. It should be understood that the preconfiguration information includes an association relationship between at least one piece of QoS information and at least one piece of sidelink configuration information.

Specifically, the second terminal may obtain the second configuration information from the network device accessed by the second terminal in the following manner. That the second terminal obtains second configuration information of the sidelink radio bearer includes: The second terminal receives a second message from the network device, where the second message includes the second configuration information that is of the sidelink radio bearer and that is configured for the second terminal. In addition, before the second terminal receives the second message from the network device, the method provided in this embodiment of this application further includes: The second terminal sends a third message to the network device. The third message includes at least one of the following information: an identifier of the sidelink radio bearer, an identifier of one logical channel associated with at least one RLC entity or at least two RLC entities in the sidelink radio bearer, an identifier of one of two logical channels associated with the at least one RLC entity or the at least two RLC entities in the sidelink radio bearer, the QoS information mapped to the sidelink radio bearer, and the first indication information.

In an optional implementation, the second message and the third message each further include the first identifier.

It should be understood that the third message in FIG. 15 includes the identifier of the logical channel associated with the at least one RLC entity or the at least two RLC entities in the sidelink radio bearer. The third message in FIG. 16 includes identifiers of the two logical channels associated with the at least one RLC entity or the at least two RLC entities in the sidelink radio bearer.

Step 206: The second terminal configures the sidelink radio bearer based on the second configuration information of the sidelink radio bearer.

The second configuration information includes at least one of the following information: an identifier of the sidelink radio bearer, configuration information of a PDCP entity in the sidelink radio bearer, configuration information of at least one RLC entity or at least two RLC entities in the sidelink radio bearer, configuration information of a logical channel in the sidelink radio bearer, and an identifier of the logical channel in the sidelink radio bearer.

It should be understood that the identifier of the sidelink radio bearer and/or the identifier of the logical channel associated with the at least one RLC entity or the at least two RLC entities in the sidelink radio bearer may be autonomously allocated by the first terminal or the second terminal.

In a possible embodiment, still with reference to FIG. 15, the method provided in this embodiment of this application further includes the following steps.

Step 207: The first terminal sends a first MAC PDU and first combination information to the second terminal, where the first combination information includes the first identifier and an identifier of one logical channel in the sidelink radio bearer.

The first combination information indicates that a first MAC SDU is a MAC SDU in the sidelink radio bearer. The first MAC SDU is a MAC SDU that is included in the first MAC PDU and that corresponds to the identifier of the logical channel associated with the at least one RLC entity or the at least two RLC entities in the sidelink radio bearer.

Step 208: The second terminal receives the first MAC PDU and the first combination information from the first terminal.

In another possible embodiment, still with reference to FIG. 15, the method provided in this embodiment of this application further includes the following steps.

Step 209: The second terminal sends a second MAC PDU and second combination information to the first terminal, where the second combination information includes the first identifier and an identifier of one logical channel associated with at least one RLC entity or at least two RLC entities in the sidelink radio bearer.

The second combination information indicates that a second MAC SDU is a MAC SDU in the sidelink radio bearer. The second MAC SDU is a MAC SDU that is included in the second MAC PDU and that corresponds to the identifier of the logical channel associated with the at least one RLC entity or the at least two RLC entities in the sidelink radio bearer.

Step 210: The first terminal receives the second MAC PDU and the second combination information.

Example 2: One RLC entity (if the RLC layer working mode of the sidelink radio bearer is an AM) in the sidelink radio bearer is associated with two logical channels, or two RLC entities (if the RLC layer working mode of the sidelink radio bearer is an AM) in the sidelink radio bearer are associated with two logical channels.

It should be understood that one (briefly referred to as a sending logical channel below) of the two logical channels is configured to send sidelink service data, and the other logical channel (briefly referred to as a receiving logical channel below) is configured to receive an RLC status report for the sidelink service data. Alternatively, a sending logical channel is further configured to receive sidelink service data, and a receiving logical channel is further configured to send an RLC status report for the sidelink service data.

It should be understood that if a packet duplication function is configured for the sidelink radio bearer, the sidelink radio bearer includes two RLC entities (if the RLC layer working mode of the sidelink radio bearer is the AM), and each RLC entity is associated with two logical channels, or the sidelink radio bearer includes four RLC entities (if the RLC layer working mode of the sidelink radio bearer is the UM), and one RLC entity used for sending and one RLC entity used for receiving are associated with two logical channels.

Case 3: When the RLC layer working mode is an AM, the sidelink radio bearer includes at least one RLC entity, and the at least one RLC entity is associated with two logical channels. One of the two logical channels is configured to send sidelink service data, and the other logical channel is configured to receive an RLC status report for the sidelink service data. Alternatively, one of the two logical channels is configured to receive sidelink service data, and the other logical channel is configured to send an RLC status report for the received sidelink service data. The at least one RLC entity may be configured to send sidelink service data, and may also be configured to receive an RLC status report for the sidelink service data. Alternatively, the at least one RLC entity receives sidelink service data, and is configured to send an RLC status report for the sidelink service data.

It should be understood that if a packet duplication function is configured for the sidelink radio bearer, the at least one RLC entity includes an RLC entity configured to send original sidelink service data, an RLC entity configured to send duplicated sidelink service data, and an RLC entity configured to receive the duplicated sidelink service data.

Case 4: When the RLC layer working mode is a UM, the sidelink radio bearer includes at least two RLC entities, and any one of the at least two RLC entities is associated with one of two logical channels. One of the at least two RLC entities is configured to send sidelink service data, and another one of the at least two RLC entities is configured to receive the sidelink service data. One of the two logical channels is configured to send sidelink service data, and the other logical channel is configured to receive the sidelink service data. The RLC entity that sends the sidelink service data is associated with the logical channel that sends the sidelink service data, and the RLC entity that receives the sidelink service data is associated with the logical channel that receives the sidelink service data.

It should be understood that if a packet duplication function is configured for the sidelink radio bearer, the at least two RLC entities further include an RLC entity configured to send duplicated sidelink service data, or an RLC entity configured to receive duplicated sidelink service data.

In an optional implementation, an identifier of the sidelink radio bearer and/or an identifier of either of the two logical channels are/is unique in a combination of source information and destination information.

For example, an identifier of one of the two logical channels is unique in a combination of first source information and first destination information, the first source information is a source layer 2 identifier of the first terminal, and the first destination information is a source layer 2 identifier of the second terminal. In other words, the first terminal sends the sidelink service data on the logical channel, and the second terminal receives the sidelink service data on the logical channel.

For example, an identifier of the other one of the two logical channels is unique in a combination of second source information and second destination information, the second source information is a source layer 2 identifier of the second terminal, and the second destination information is a source layer 2 identifier of the first terminal. In other words, the second terminal sends the sidelink service data on the other logical channel, and the first terminal receives the sidelink service data on the other logical channel.

In an optional implementation, the first configuration information further includes an identifier of either of the two logical channels or an identifier of the sidelink radio bearer.

In an optional implementation, the first configuration information is further used by the first terminal to send sidelink service data and/or control signaling by using the sidelink radio bearer, and is used by the second terminal to receive sidelink service data and/or control signaling by using the sidelink radio bearer.

Figure 16:
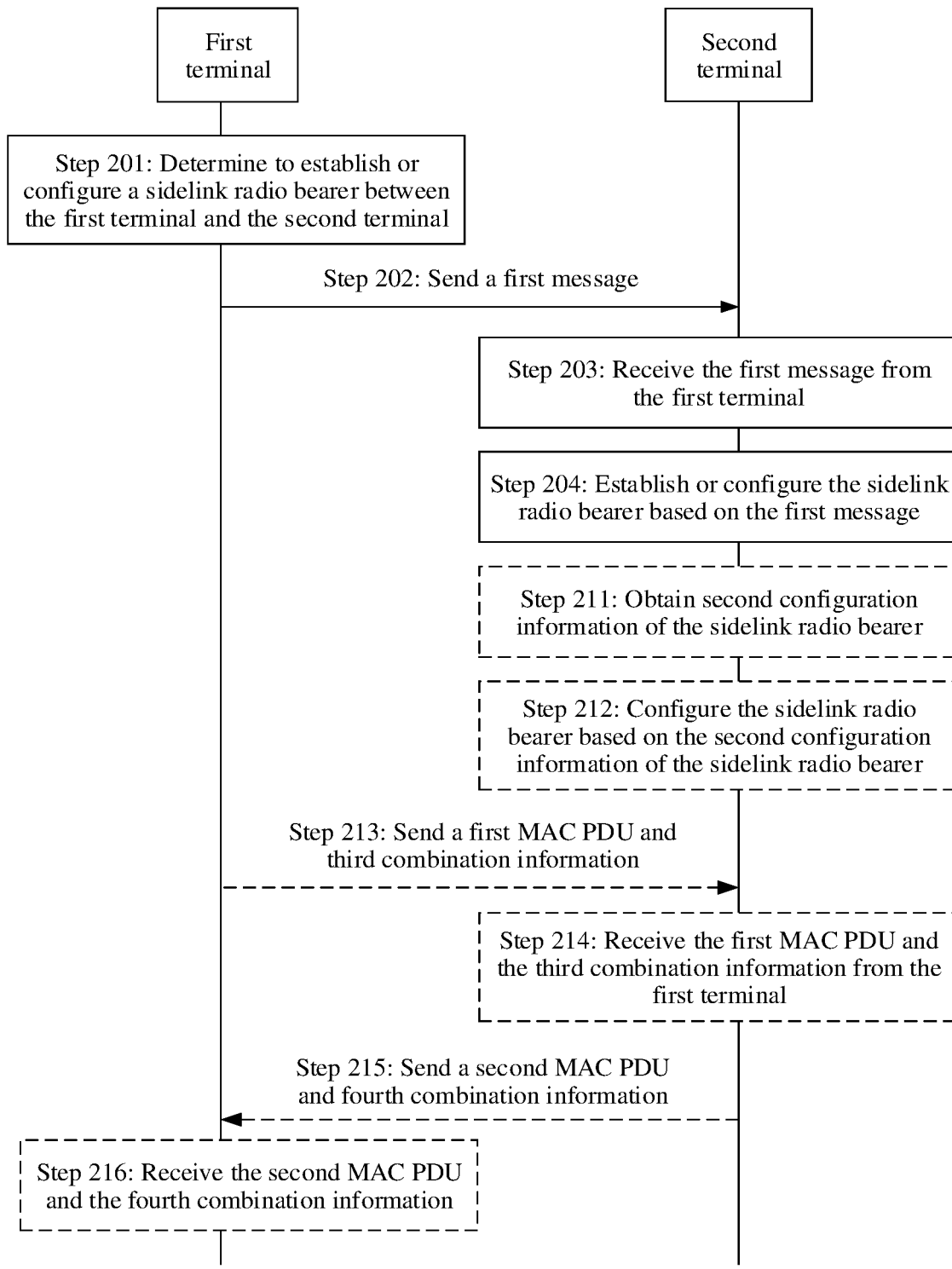
FIG. 16 is a schematic flowchart 11 of a radio bearer configuration method according to an embodiment of this application.

With reference to FIG. 16, in another possible embodiment, the method provided in this embodiment of this application further includes the following steps.

Step 211: The second terminal obtains second configuration information of the sidelink radio bearer.

Specifically, for an implementation process, refer to the descriptions in step 205.

Step 212: The second terminal configures the sidelink radio bearer based on the second configuration information of the sidelink radio bearer.

The second configuration information includes at least one of the following information: an identifier of the sidelink radio bearer, configuration information of a PDCP entity in the sidelink radio bearer, configuration information of at least one RLC entity or at least two RLC entities in the sidelink radio bearer, configuration information of either of two logical channels associated with the at least one RLC entity or the at least two RLC entities in the sidelink radio bearer, and an identifier of the logical channel.

It should be understood that the identifier of the sidelink radio bearer, an identifier of a first logical channel in the two logical channels associated with the at least one RLC entity or the at least two RLC entities in the sidelink radio bearer, and an identifier of a second logical channel in the two logical channels associated with the at least one RLC entity or the at least two RLC entities in the sidelink radio bearer may be separately autonomously allocated by the first terminal or the second terminal, or all of the identifiers are allocated by the first terminal, or all of the identifiers are allocated by the second terminal. In an optional implementation, in this embodiment of this application, the second configuration information is used by the second terminal to send sidelink service data and/or control signaling by using the sidelink radio bearer, and is used by the first terminal to receive sidelink service data and/or control signaling by using the sidelink radio bearer.

It should be understood that if the identifier of the sidelink radio bearer and identifiers of two logical channels in the sidelink radio bearer or an identifier of one logical channel in the sidelink radio bearer are autonomously allocated by the first terminal or the second terminal, the network device may not use the second message to carry the identifier of the sidelink radio bearer and the identifiers of the two logical channels in the sidelink radio bearer or the identifier of the logical channel in the sidelink radio bearer. If the identifier of the sidelink radio bearer is autonomously allocated by the second terminal or the first terminal, the network device may use the second message to carry the identifiers of the two logical channels or the identifier of the logical channel. If the identifiers of the two logical channels or the identifier of the logical channel is autonomously allocated by the second terminal or the first terminal, the network device may use the second message to carry the identifier of the sidelink radio bearer.

It should be understood that if the network device does not use the second message to carry the identifiers of the two logical channels or the identifier of the logical channel and the identifier of the sidelink radio bearer, the terminal may autonomously perform allocation. In this embodiment of this application, when the second terminal or the first terminal autonomously allocates the identifier of the sidelink radio bearer or the identifier of the logical channel in the sidelink radio bearer, the second terminal and the first terminal may further notify respective network devices of the autonomously allocated identifier.

In a possible embodiment, still with reference to FIG. 16, the method provided in this embodiment of this application further includes the following steps.

Step 213: The first terminal sends a first MAC PDU and a third information combination to the second terminal. The third information combination includes source information, destination information, and an identifier of a first logical channel in the two logical channels associated with the at least one RLC entity or the at least two RLC entities in the sidelink radio bearer. The third information combination indicates that a first MAC SDU is a MAC SDU in the sidelink radio bearer.

The first MAC SDU is a MAC SDU that is included in the first MAC PDU and that corresponds to the identifier of the first logical channel in the two logical channels associated with the at least one RLC entity or the at least two RLC entities in the sidelink radio bearer. The source information is a source layer 2 identifier of the first terminal, and the destination information is a source layer 2 identifier of the second terminal.

Step 214: The second terminal receives the first MAC PDU and the third information combination from the first terminal.

In another possible embodiment, still with reference to FIG. 16, the method provided in this embodiment of this application further includes the following steps.

Step 215: The second terminal sends a second MAC PDU and a fourth information combination to the first terminal, where the fourth information combination includes source information, destination information, and an identifier of a second logical channel in the two logical channels associated with the at least one RLC entity or the at least two RLC entities in the sidelink radio bearer.

The fourth information combination indicates that a second media access control service data unit MAC SDU is a MAC SDU in the sidelink radio bearer. The second MAC SDU is a MAC SDU that is included in the second MAC PDU and that corresponds to the identifier of the second logical channel in the two logical channels associated with the at least one RLC entity or the at least two RLC entities in the sidelink radio bearer. The source information is a source layer 2 identifier of the second terminal, and the destination information is a source layer 2 identifier of the first terminal.

Step 216: The first terminal receives the second MAC PDU and the fourth information combination from the second terminal.

Figure 17A:
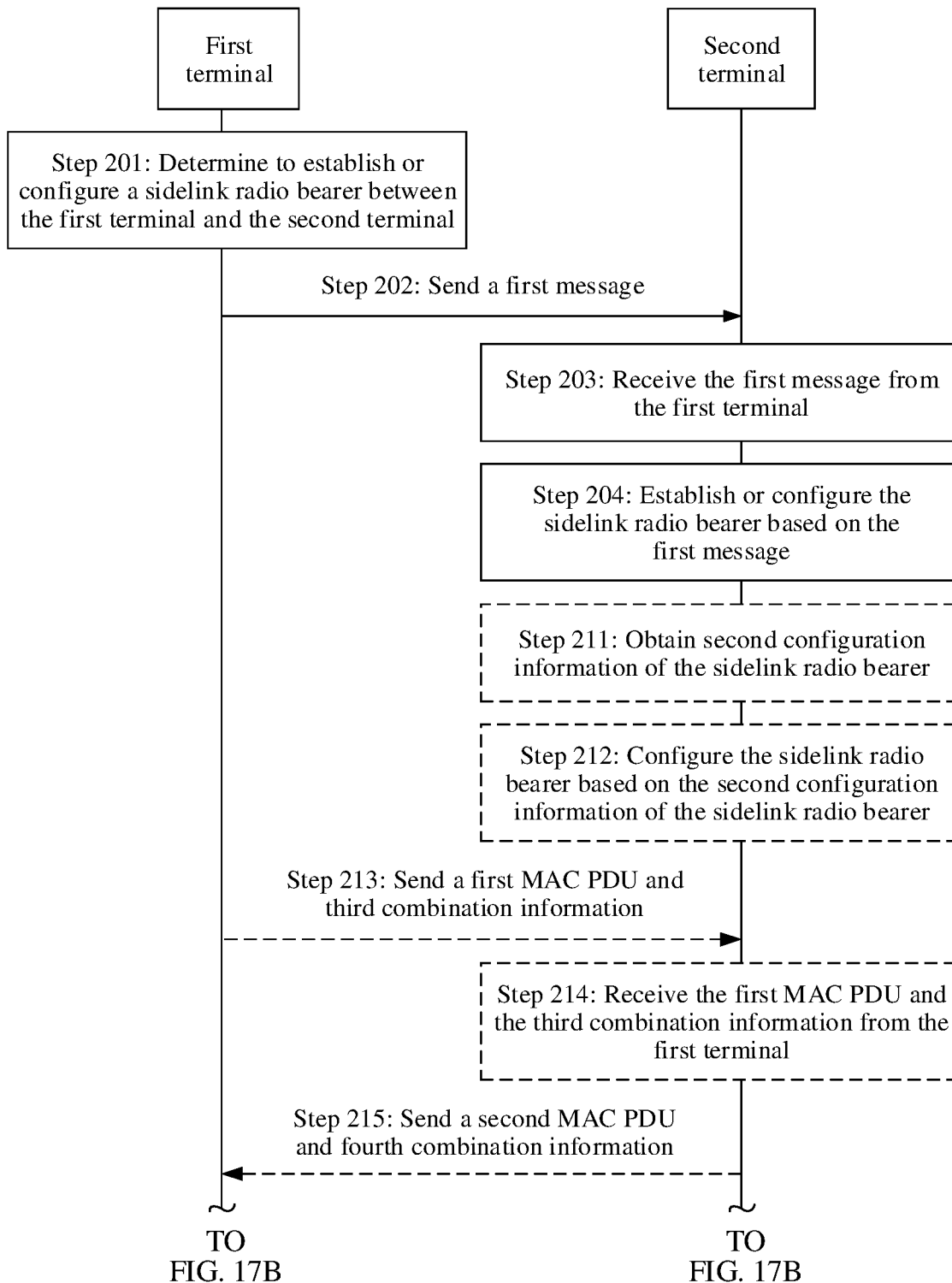
FIG. 17A and FIG. 17B are a schematic flowchart 12 of a radio bearer configuration method according to an embodiment of this application.
Figure 17B:
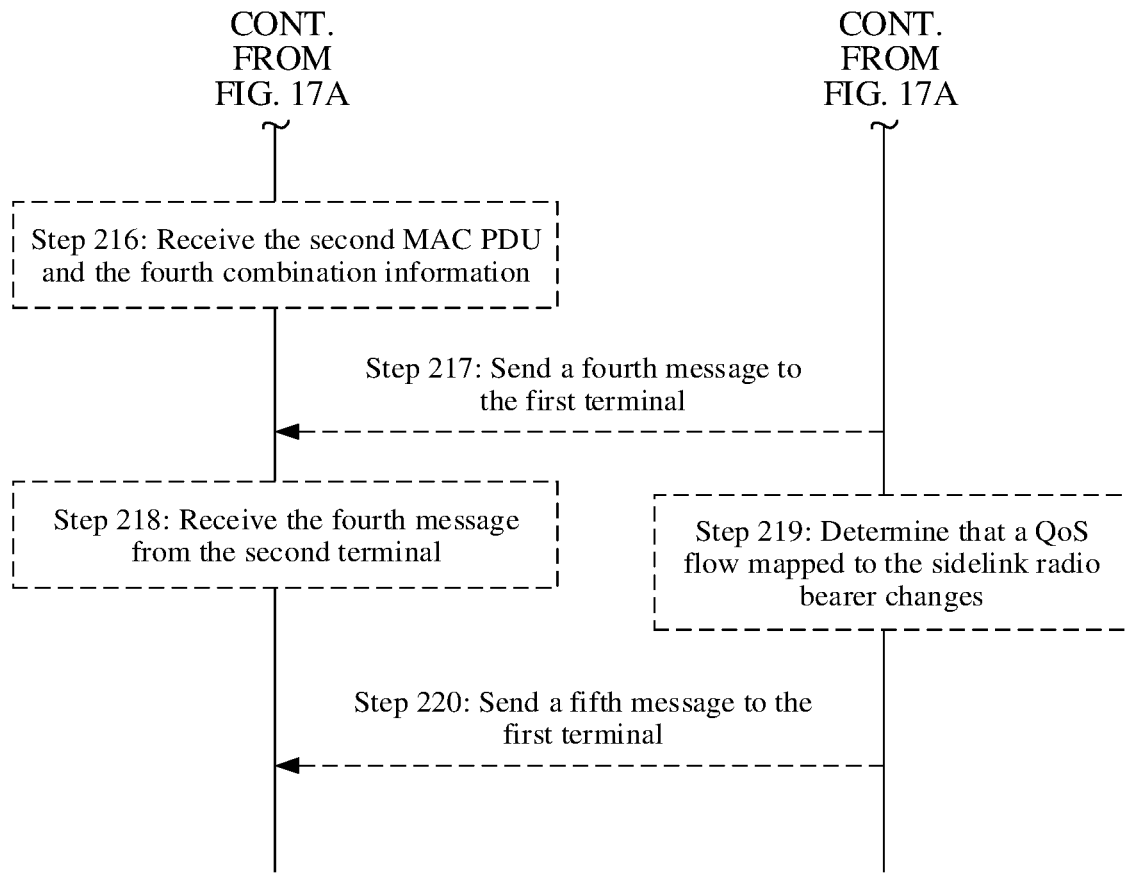

With reference to FIG. 15 or FIG. 16, as shown in FIG. 17B, the method provided in this embodiment of this application further includes the following steps.

Step 217: The second terminal sends a fourth message to the first terminal, where the fourth message includes third configuration information, and the third configuration information may include only a parameter configuration of a PDCP entity in the sidelink radio bearer and a parameter configuration of at least one RLC entity for receiving in the sidelink radio bearer.

Step 218: The first terminal receives the fourth message from the second terminal.

In still another possible embodiment, as shown in FIG. 17B, the method provided in this embodiment of this application further includes the following steps.

Step 219: The second terminal determines that a QoS flow mapped to the sidelink radio bearer changes.

For example, a quantity of QoS flows mapped to the sidelink radio bearer increases or decreases.

For example, in an example, the second terminal may autonomously increase or decrease the quantity of QoS flows mapped to the sidelink radio bearer. In another example, step 219 may be implemented in the following manner: The second terminal determines, based on a sixth message from the first terminal, that the QoS flow mapped to the sidelink radio bearer changes. The sixth message is used to indicate a change of a QoS flow mapped to a first sidelink radio bearer.

Step 220: The second terminal sends a fifth message to the first terminal or the network device, where the fifth message is used to indicate a change of the QoS flow mapped to the sidelink radio bearer.

It should be understood that after step 220, the method may further include: The first terminal or the network device increases or decrease, based on the fifth message, the quantity of QoS flows mapped to the sidelink radio bearer.

It should be noted that the fifth message is sent, so that the first terminal or the network device increases or decreases, in a timely manner, the quantity of QoS flows mapped to the sidelink radio bearer. For example, if the fifth message indicates to increase the quantity of QoS flows mapped to the sidelink radio bearer, the first terminal or the network device increases the quantity of QoS flows mapped to the sidelink radio bearer. If the fifth message indicates to decrease the quantity of QoS flows mapped to the sidelink radio bearer, the first terminal or the network device decreases the quantity of QoS flows mapped to the sidelink radio bearer.

The foregoing mainly describes the solutions in the embodiments of this application from a perspective of interaction between the network elements. It may be understood that to implement the foregoing functions, the network elements such as the first terminal, the second terminal, and the network device each include a corresponding hardware structure and/or software module for performing each function. A person skilled in the art should be easily aware that units, algorithms, and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first terminal, the second terminal, and the network device may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that in the embodiments of this application, division into the units is an example and is merely logical function division, and may be other division in an actual implementation.

The foregoing describes the methods in the embodiments of this application with reference to FIG. 6 to FIG. 17A and FIG. 17B. The following describes radio bearer configuration apparatuses that are provided in the embodiments of this application and that perform the foregoing methods. A person skilled in the art may understand that the method and the apparatus may be mutually combined and referenced. The radio bearer configuration apparatuses provided in the embodiments of this application may perform the steps performed by the first terminal, the second terminal, and the network device in the foregoing radio bearer configuration methods.

An example in which each function module is obtained through division based on each corresponding function is used below for description.

Figure 18:
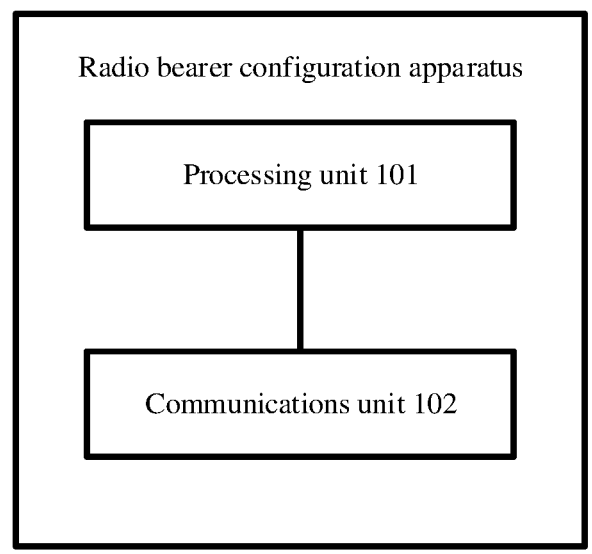
FIG. 18 is a schematic structural diagram of a radio bearer configuration apparatus according to an embodiment of this application.

When an integrated unit is used, FIG. 18 shows a radio bearer configuration apparatus in the foregoing embodiments. The radio bearer configuration apparatus may include a processing unit 101 and a communications unit 102.

In an example, the radio bearer configuration apparatus is a second terminal, or a chip applied to a second terminal. In this case, the communications unit 102 is configured to support the radio bearer configuration apparatus in performing step 102 performed by the second terminal in the foregoing embodiment. The processing unit 101 is configured to support the radio bearer configuration apparatus in performing step 101 performed by the second terminal in the foregoing embodiment.

In a possible embodiment, the communications unit 102 is further configured to support the radio bearer configuration apparatus in performing step 106, step 107, step 109, step 110, step 112, step 113, and step 117 that are performed by the second terminal in the foregoing embodiment. The processing unit 101 is further configured to support the radio bearer configuration apparatus in performing step 114, step 115, and step 116 that are performed by the second terminal in the foregoing embodiment.

In another example, the radio bearer configuration apparatus is a second terminal, or a chip applied to a second terminal. In this case, the communications unit 102 is configured to support the radio bearer configuration apparatus in performing step 203 performed by the second terminal in the foregoing embodiment. The processing unit 101 is configured to support the radio bearer configuration apparatus in performing step 204 performed by the second terminal in the foregoing embodiment.

In a possible embodiment, the communications unit 102 is further configured to support the radio bearer configuration apparatus in performing step 205, step 208, step 209, step 211, step 214, step 215, step 217, and step 220 that are performed by the second terminal in the foregoing embodiment. The processing unit 101 is further configured to support the radio bearer configuration apparatus in performing step 206, step 212, and step 219 that are performed by the second terminal in the foregoing embodiment.

In still another example, the radio bearer configuration apparatus is a first terminal, or a chip applied to a first terminal. In this case, the processing unit 101 is configured to support the radio bearer configuration apparatus in performing step 104 performed by the first terminal in the foregoing embodiment. The communications unit 102 is configured to support the radio bearer configuration apparatus in performing step 103 performed by the first terminal in the foregoing embodiment.

The communications unit 102 is further configured to support the radio bearer configuration apparatus in performing step 105 performed by the first terminal in the foregoing embodiment.

In yet another example, the radio bearer configuration apparatus is a first terminal, or a chip applied to a first terminal. In this case, the processing unit 101 is configured to support the radio bearer configuration apparatus in performing step 201 performed by the first terminal in the foregoing embodiment. The communications unit 102 is configured to support the radio bearer configuration apparatus in performing step 202 performed by the first terminal in the foregoing embodiment.

The communications unit 102 is further configured to support the radio bearer configuration apparatus in performing step 207, step 210, step 213, step 216, and step 218 that are performed by the first terminal in the foregoing embodiment.

In still yet another example, the radio bearer configuration apparatus is a network device, or a chip applied to a network device. In this case, the communications unit 102 is configured to support the radio bearer configuration apparatus in performing step 108 performed by the network device in the foregoing embodiment.

The communications unit 102 is further configured to support the radio bearer configuration apparatus in performing step 111 performed by the network device in the foregoing embodiment.

It should be noted that when the apparatus shown in FIG. 18 is the network device or the chip applied to the network device, the apparatus may not include the processing unit 101.

Figure 19:
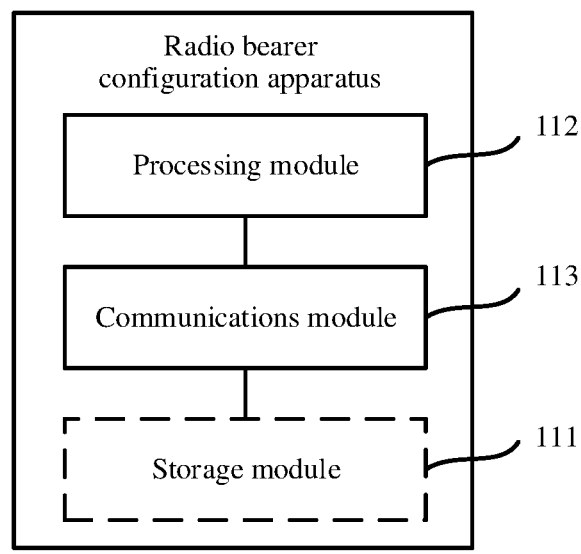
FIG. 19 is a schematic structural diagram of another radio bearer configuration apparatus according to an embodiment of this application.

When an integrated unit is used, FIG. 19 is a possible schematic diagram of a logical structure of a radio bearer configuration apparatus in the foregoing embodiments. The radio bearer configuration apparatus includes a processing module 112 and a communications module 113. The processing module 112 is configured to: control and manage an action of the radio bearer configuration apparatus. For example, the processing module 112 is configured to perform the step of processing information/data by the radio bearer configuration apparatus. The communications module 113 is configured to support the radio bearer configuration apparatus in performing the step of sending or receiving information/data.

In a possible embodiment, the radio bearer configuration apparatus may further include a storage module 111, configured to store program code and data that can be used by the radio bearer configuration apparatus.

In an example, the radio bearer configuration apparatus is a second terminal, or a chip applied to a second terminal. In this case, the communications module 113 is configured to support the radio bearer configuration apparatus in performing step 102 performed by the second terminal in the foregoing embodiment. The processing module 112 is configured to support the radio bearer configuration apparatus in performing step 101 in the foregoing embodiment.

In a possible embodiment, the communications module 113 is further configured to support the radio bearer configuration apparatus in performing step 106, step 107, step 109, step 110, step 112, step 113, and step 117 that are performed by the second terminal in the foregoing embodiment. The processing module 112 is further configured to support the radio bearer configuration apparatus in performing step 114, step 115, and step 116 that are performed by the second terminal in the foregoing embodiment.

In another example, the radio bearer configuration apparatus is a second terminal, or a chip applied to a second terminal. In this case, the communications module 113 is configured to support the radio bearer configuration apparatus in performing step 203 performed by the second terminal in the foregoing embodiment. The processing module 112 is configured to support the radio bearer configuration apparatus in performing step 204 in the foregoing embodiment.

In a possible embodiment, the communications module 113 is further configured to support the radio bearer configuration apparatus in performing step 205, step 208, step 209, step 211, step 214, step 215, step 217, and step 220 that are performed by the second terminal in the foregoing embodiment. The processing module 112 is further configured to support the radio bearer configuration apparatus in performing step 206, step 212, and step 219 that are performed by the second terminal in the foregoing embodiment.

In still another example, the radio bearer configuration apparatus is a first terminal, or a chip applied to a first terminal. In this case, the processing module 112 is configured to support the radio bearer configuration apparatus in performing step 104 performed by the first terminal in the foregoing embodiment. The communications module 113 is configured to support the radio bearer configuration apparatus in performing step 103 performed by the first terminal in the foregoing embodiment.

The communications module 113 is further configured to support the radio bearer configuration apparatus in performing step 105 performed by the first terminal in the foregoing embodiment.

In yet another example, the radio bearer configuration apparatus is a first terminal, or a chip applied to a first terminal. In this case, the processing module 112 is configured to support the radio bearer configuration apparatus in performing step 201 performed by the first terminal in the foregoing embodiment. The communications module 113 is configured to support the radio bearer configuration apparatus in performing step 202 performed by the first terminal in the foregoing embodiment.

The communications module 113 is further configured to support the radio bearer configuration apparatus in performing step 207, step 210, step 213, step 216, and step 218 that are performed by the first terminal in the foregoing embodiment.

In still yet another example, the radio bearer configuration apparatus is a network device, or a chip applied to a network device. In this case, the communications module 113 is configured to support the radio bearer configuration apparatus in performing step 108 performed by the network device in the foregoing embodiment.

The communications module 113 is further configured to support the radio bearer configuration apparatus in performing step 111 performed by the network device in the foregoing embodiment.

It should be noted that when the apparatus shown in FIG. 19 is the network device or the chip applied to the network device, the apparatus may not include the processing module 112.

The processing module 112 may be a processor or a controller. For example, the processing module 112 may be a central processing unit, a general-purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

When the processing module 112 is the processor 41 or the processor 45, the communications module 113 is the transceiver 43, and the storage module 111 is the memory 42, the radio bearer configuration apparatus in this application may be the communications device shown in FIG. 5.

Figure 20:
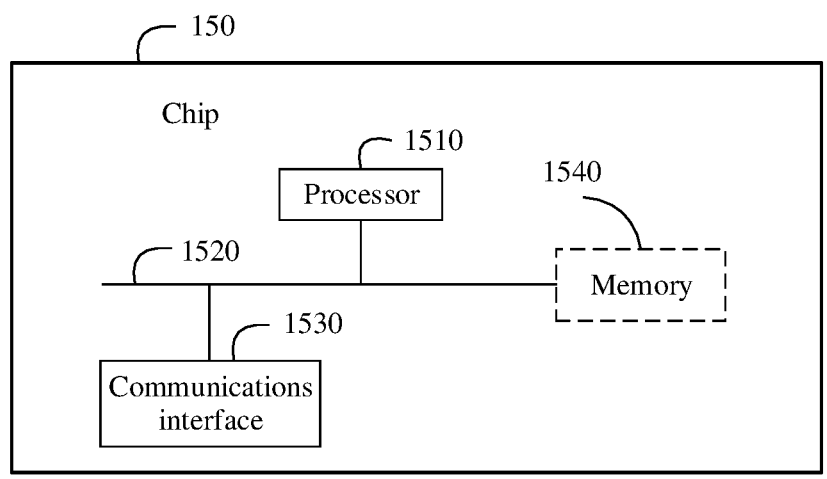
FIG. 20 is a schematic structural diagram of a chip according to an embodiment of this application.

FIG. 20 is a schematic structural diagram of a chip 150 according to an embodiment of this application. The chip 150 includes one or more (including two) processors 1510 and a communications interface 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (NVRAM).

In some implementations, the memory 1540 stores the following elements, an execution module or a data structure, or a subset thereof, or an extended set thereof.

In this embodiment of this application, a corresponding operation is performed by invoking the operation instruction (where the operation instruction may be stored in an operating system) stored in the memory 1540.

In a possible implementation, a first terminal, a second terminal, and a network device use a similar chip structure, and different apparatuses may use different chips to implement respective functions.

The processor 1510 controls a processing operation of any one of the first terminal, the second terminal, and the network device, and the processor 1510 may also be referred to as a central processing unit (CPU).

The memory 1540 may include a read-only memory and a random access memory, and provide an instruction and data for the processor 1510. A part of the memory 1540 may further include a non-volatile random access memory (NVRAM). For example, in an application, the memory 1540, the communications interface 1530, and the memory 1540 are coupled together through a bus system 1520. The bus system 1520 may further include a power bus, a control bus, a status signal bus, and the like in addition to a data bus. However, for clear description, various buses are marked as the bus system 1520 in FIG. 20.

The methods disclosed in the foregoing embodiments of this application may be applied to the processor 1510, or may be implemented by the processor 1510. The processor 1510 may be an integrated circuit chip and has a signal processing capability. In an implementation process, steps in the foregoing method may be implemented by using a hardware integrated logical circuit in the processor 1510, or by using instructions in a form of software. The processor 1510 may be a general-purpose processor, a digital signal processor (DSP), an application-specific integrated circuit (application specific integrated circuit, ASIC), a field-programmable gate array (FPGA) or another programmable logic device, a discrete gate or transistor logic device, or a discrete hardware component. The processor 1510 may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and completed by a hardware decoding processor, or may be executed and completed by a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communications interface 1530 is configured to perform the receiving and sending steps of the first terminal, the second terminal, and the network device in the embodiments shown in FIG. 6 to FIG. 17A and FIG. 17B. The processor 1510 is configured to perform the processing steps of the first terminal, the second terminal, and the network device in the embodiments shown in FIG. 6 to FIG. 17A and FIG. 17B.

The foregoing communications unit may be an interface circuit or a communications interface of the apparatus, and is configured to receive a signal from another apparatus. For example, when the apparatus is implemented as a chip, the communications unit is an interface circuit or a communications interface that is of the chip and that is configured to receive a signal from another chip or apparatus or send a signal.

In the foregoing embodiment, the instruction that is stored in the memory and that is to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

According to one aspect, a computer readable storage medium is provided. The computer readable storage medium stores an instruction, and when the instruction is run, a second terminal or a chip applied to a second terminal is enabled to perform step 101, step 102, step 106, step 107, step 109, step 110, step 112, step 113, step 114, step 115, step 116, and step 117 in the embodiment.

According to another aspect, a computer readable storage medium is provided. The computer readable storage medium stores an instruction, and when the instruction is run, a second terminal or a chip applied to a second terminal is enabled to perform step 203, step 204, step 205, step 206, step 208, step 209, step 211, step 212, step 214, step 215, step 217, step 219, and step 220 in the embodiment.

According to still another aspect, a computer readable storage medium is provided. The computer readable storage medium stores an instruction, and when the instruction is run, a first terminal or a chip applied to a first terminal is enabled to perform step 103, step 104, and step 105 in the embodiment.

According to yet another aspect, a computer readable storage medium is provided. The computer readable storage medium stores an instruction, and when the instruction is run, a first terminal or a chip applied to a first terminal is enabled to perform step 201, step 202, step 207, step 210, step 213, step 216, and step 218 in the embodiment.

According to still yet another aspect, a computer readable storage medium is provided. The computer readable storage medium stores an instruction, and when the instruction is run, a network device or a chip applied to a network device is enabled to perform step 108 and step 111 in the embodiments.

The foregoing readable storage medium may include any medium that can store program code, such as a USB flash drive, a removable hard disk, a read-only memory, a random access memory, a magnetic disk, or an optical disc.

According to one aspect, a computer program product including an instruction is provided. The computer program product stores the instruction, and when the instruction is run, a second terminal or a chip applied to a second terminal is enabled to perform step 101, step 102, step 106, step 107, step 109, step 110, step 112, step 113, step 114, step 115, step 116, and step 117 in the embodiment.

According to another aspect, a computer program product including an instruction is provided. The computer program product stores the instruction, and when the instruction is run, a second terminal or a chip applied to a second terminal is enabled to perform step 203, step 204, step 205, step 206, step 208, step 209, step 211, step 212, step 214, step 215, step 217, step 219, and step 220 in the embodiment.

According to still another aspect, a computer program product including an instruction is provided. The computer program product stores the instruction, and when the instruction is run, a first terminal or a chip applied to a first terminal is enabled to perform step 103, step 104, and step 105 in the embodiment.

According to yet another aspect, a computer program product including an instruction is provided. The computer program product stores the instruction, and when the instruction is run, a first terminal or a chip applied to a first terminal is enabled to perform step 201, step 202, step 207, step 210, step 213, step 216, and step 218 in the embodiment.

According to still yet another aspect, a computer program product including an instruction is provided. The computer program product stores the instruction, and when the instruction is run, a network device or a chip applied to a network device is enabled to perform step 108 and step 111 in the embodiment.

According to one aspect, a chip is provided. The chip is applied to a second terminal, the chip includes at least one processor and a communications interface, the communications interface is coupled to the at least one processor, and the processor is configured to run an instruction, to perform step 101, step 102, step 106, step 107, step 109, step 110, step 112, step 113, step 114, step 115, step 116, and step 117 in the embodiment.

According to another aspect, a chip is provided. The chip is applied to a second terminal, the chip includes at least one processor and a communications interface, the communications interface is coupled to the at least one processor, and the processor is configured to run an instruction, to perform step 203, step 204, step 205, step 206, step 208, step 209, step 211, step 212, step 214, step 215, step 217, step 219, and step 220 in the embodiment.

According to one aspect, a chip is provided. The chip is applied to a first terminal, the chip includes at least one processor and a communications interface, the communications interface is coupled to the at least one processor, and the processor is configured to run an instruction, to perform step 103, step 104, and step 105 in the embodiment.

According to another aspect, a chip is provided. The chip is applied to a first terminal, the chip includes at least one processor and a communications interface, the communications interface is coupled to the at least one processor, and the processor is configured to run an instruction, to perform step 201, step 202, step 207, step 210, step 213, step 216, and step 218 in the embodiment.

According to still another aspect, a chip is provided. The chip is applied to a network device, the chip includes at least one processor and a communications interface, the communications interface is coupled to the at least one processor, and the processor is configured to run an instruction, to perform step 108 and step 111 in the embodiment.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD for short)), or the like.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions listed in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A radio bearer configuration method, comprising:
   receiving, by a second terminal, a first message from a first terminal, wherein the first message comprises first configuration information of a sidelink radio bearer between the second terminal and the first terminal, and the first configuration information comprises first indication information, or comprises the first indication information and a bearer type indication; wherein the first indication information is used to indicate a radio link control (RLC) layer working mode of the sidelink radio bearer, and the bearer type indication is used to indicate a type of the sidelink radio bearer;
   establishing or configuring, by the second terminal, the sidelink radio bearer based on the first message; and
   sending, by the second terminal, a second message to a network device, wherein the second message comprises the first indication information.

2. The method according to claim 1, wherein the first configuration information comprises the first indication information and the bearer type indication, and wherein the first indication information indicates that the RLC layer working mode of the sidelink radio bearer is an unacknowledged mode (UM) and the bearer type indication is used to indicate that the sidelink radio bearer is a bidirectional bearer.

3. The method according to claim 1, wherein the first configuration information comprises the first indication information, wherein the first indication information indicates that the RLC layer working mode of the sidelink radio bearer is an acknowledged mode (AM).

4. The method according to claim 1, wherein sending, by the second terminal, the second message to the network device comprises:
   sending, by the second terminal, the second message to the network device when the sidelink radio bearer is a bidirectional bearer.

5. The method according to claim 1, wherein the second message further comprises quality of service (QoS) information mapped to the sidelink radio bearer.

6. The method according to claim 5, wherein the QoS information comprises a QoS parameter and a quality of service flow identifier, and the QoS parameter comprises at least any one of the following parameters: a guaranteed transmission rate, a maximum transmission rate, a delay requirement, a reliability requirement, a priority, or a communication distance.

7. The method according to claim 1, wherein the method further comprises:
receiving, by the second terminal, second configuration information from the network device after sending the second message.

8. The method according to claim 1, wherein the first message further comprises:
quality of service (QoS) information mapped to the sidelink radio bearer.

9. The method according to claim 8, wherein the QoS information comprises a quality of service flow identifier.

10. The method according to claim 1, wherein communications interfaces of the first terminal and the second terminal are PC5 ports.

11. The method according to claim 1, wherein the first configuration information further comprises
an identifier of a logical channel in the sidelink radio bearer, and the identifier of the logical channel is allocated by the first terminal.

12. The method according to claim 1, wherein the first configuration information further comprises at least any one of the following:
an identifier of the sidelink radio bearer, configuration information of a packet data convergence protocol (PDCP) entity in the sidelink radio bearer, and configuration information of a RLC entity in the sidelink radio bearer.

13. The method according to claim 1, wherein the first message is a sidelink radio resource control reconfiguration message.

14. A second terminal, comprising a memory, a processor, and a computer program that is stored in the memory and that are run on the processor, wherein the processor executes the computer program to implement steps of:
receiving, a first message from a first terminal, wherein the first message comprises first configuration information of a sidelink radio bearer between the second terminal and the first terminal, and the first configuration information comprises first indication information, or comprises the first indication information and a bearer type indication; wherein the first indication information is used to indicate a radio link control (RLC) layer working mode of the sidelink radio bearer, and the bearer type indication is used to indicate a type of the sidelink radio bearer;
establishing or configuring, the sidelink radio bearer based on the first message; and
sending a second message to a network device, wherein the second message comprises the first indication information.

15. The second terminal according to claim 14, wherein the first configuration information comprises the first indication information and the bearer type indication, and wherein the first indication information indicates that the RLC layer working mode of the sidelink radio bearer is an unacknowledged mode (UM) and the bearer type indication is used to indicate that the sidelink radio bearer is a bidirectional bearer.

16. The second terminal according to claim 14, wherein the first configuration information comprises the first indication information, wherein the first indication information indicates that the RLC layer working mode of the sidelink radio bearer is an acknowledged mode (AM).

17. The second terminal according to claim 14, wherein sending the second message to the network device comprises:
sending the second message to the network device when the sidelink radio bearer is a bidirectional bearer.

18. A non-transitory computer readable storage medium, comprising instructions, wherein when the instructions are run on a computer, the computer is enabled to perform the steps of:
receiving, a first message from a first terminal, wherein the first message comprises first configuration information of a sidelink radio bearer between a second terminal and the first terminal, and the first configuration information comprises first indication information, or comprises the first indication information and a bearer type indication; wherein the first indication information is used to indicate a radio link control (RLC) layer working mode of the sidelink radio bearer, and the bearer type indication is used to indicate a type of the sidelink radio bearer;
establishing or configuring, the sidelink radio bearer based on the first message; and
sending a second message to a network device, wherein the second message comprises the first indication information.

19. The non-transitory computer readable storage medium according to claim 18, wherein the first configuration information comprises the first indication information and the bearer type indication, and wherein the first indication information indicates that the RLC layer working mode of the sidelink radio bearer is an unacknowledged mode (UM) and the bearer type indication is used to indicate that the sidelink radio bearer is a bidirectional bearer.

20. The non-transitory computer readable storage medium according to claim 18, wherein the first configuration information comprises the first indication information, wherein the first indication information indicates that the RLC layer working mode of the sidelink radio bearer is an acknowledged mode (AM).

* * * * *